United States Patent
Naveen et al.

(10) Patent No.: US 11,074,097 B2
(45) Date of Patent: *Jul. 27, 2021

(54) SPECIFYING SERVICE CHAINS

(71) Applicant: VMware, Inc., Palo Alto, CA (US)

(72) Inventors: Akhila Naveen, Palo Alto, CA (US);
Fenil Kavathia, Sunnyvale, CA (US);
Yong Feng, Sunnyvale, CA (US);
Pierluigi Rolando, Santa Clara, CA (US); Jayant Jain, Cupertino, CA (US);
Raju Koganty, San Jose, CA (US)

(73) Assignee: VMWARE, INC., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/444,935

(22) Filed: Jun. 18, 2019

(65) Prior Publication Data

US 2020/0274944 A1 Aug. 27, 2020

Related U.S. Application Data

(60) Provisional application No. 62/809,464, filed on Feb. 22, 2019.

(30) Foreign Application Priority Data

Feb. 28, 2019 (IN) .............................. 201941007860

(51) Int. Cl.
*G06F 9/455* (2018.01)
*H04L 12/721* (2013.01)
(Continued)

(52) U.S. Cl.
CPC .......... *G06F 9/45558* (2013.01); *G06F 9/546* (2013.01); *H04L 12/4633* (2013.01);
(Continued)

(58) Field of Classification Search
CPC . H04L 67/16; H04L 12/4633; H04L 2212/00; H04L 41/0803; H04L 41/0806;
(Continued)

(56) References Cited

U.S. PATENT DOCUMENTS 6,006,264 A 12/1999 Colby et al.
6,104,700 A 8/2000 Haddock et al.
(Continued)

FOREIGN PATENT DOCUMENTS

CN 1689369 A 10/2005
CN 101729412 A 6/2010
(Continued)

OTHER PUBLICATIONS

Casado, Martin, et al., "Virtualizing the Network Forwarding Plane," Dec. 2010, 6 pages.
(Continued)

*Primary Examiner* — Ninos Donabed
(74) *Attorney, Agent, or Firm* — Adeli LLP

(57) ABSTRACT

Some embodiments provide novel methods for performing services for machines operating in one or more datacenters. For instance, for a group of related guest machines (e.g., a group of tenant machines), some embodiments define two different forwarding planes: (1) a guest forwarding plane and (2) a service forwarding plane. The guest forwarding plane connects to the machines in the group and performs L2 and/or L3 forwarding for these machines. The service forwarding plane (1) connects to the service nodes that perform services on data messages sent to and from these machines, and (2) forwards these data messages to the service nodes. In some embodiments, the guest machines do not connect directly with the service forwarding plane. For instance, in some embodiments, each forwarding plane connects to a machine or service node through a port that receives data
(Continued)

messages from, or supplies data messages to, the machine or service node. In such embodiments, the service forwarding plane does not have a port that directly receives data messages from, or supplies data messages to, any guest machine. Instead, in some such embodiments, data associated with a guest machine is routed to a port proxy module executing on the same host computer, and this other module has a service plane port. This port proxy module in some embodiments indirectly can connect more than one guest machine on the same host to the service plane (i.e., can serve as the port proxy module for more than one guest machine on the same host).

16 Claims, 29 Drawing Sheets

(51) Int. Cl.

| | | |
|---|---|---|
| *H04L 12/803* | (2013.01) | |
| *H04L 29/08* | (2006.01) | |
| *H04L 12/947* | (2013.01) | |
| *G06F 9/54* | (2006.01) | |
| *H04L 12/741* | (2013.01) | |
| *H04L 12/46* | (2006.01) | |
| *H04L 12/801* | (2013.01) | |
| *H04L 29/12* | (2006.01) | |
| *H04L 12/24* | (2006.01) | |
| *H04L 12/713* | (2013.01) | |
| *H04L 12/725* | (2013.01) | |
| *H04L 12/851* | (2013.01) | |
| *H04L 12/935* | (2013.01) | |

(52) U.S. Cl.
CPC ...... *H04L 41/0803* (2013.01); *H04L 41/0806* (2013.01); *H04L 41/0816* (2013.01); *H04L 41/0893* (2013.01); *H04L 41/5003* (2013.01); *H04L 41/5054* (2013.01); *H04L 45/26* (2013.01); *H04L 45/308* (2013.01); *H04L 45/38* (2013.01); *H04L 45/586* (2013.01); *H04L 45/66* (2013.01); *H04L 45/74* (2013.01); *H04L 45/745* (2013.01); *H04L 47/125* (2013.01); *H04L 47/17* (2013.01); *H04L 47/19* (2013.01); *H04L 47/2425* (2013.01); *H04L 49/252* (2013.01); *H04L 49/3009* (2013.01); *H04L 61/2592* (2013.01); *H04L 61/6022* (2013.01); *H04L 67/10* (2013.01); *H04L 67/101* (2013.01); *H04L 67/1002* (2013.01); *H04L 67/16* (2013.01); *H04L 67/28* (2013.01); *H04L 67/2814* (2013.01); *H04L 67/32* (2013.01); *H04L 69/321* (2013.01); *H04L 69/324* (2013.01); *H04L 69/325* (2013.01); *G06F 2009/4557* (2013.01); *G06F 2009/45595* (2013.01); *H04L 2212/00* (2013.01)

(58) Field of Classification Search
CPC ............. H04L 41/0816; H04L 41/0893; H04L 41/5003; H04L 41/5054; H04L 45/26; H04L 45/308; H04L 45/586; H04L 45/74; H04L 45/745; H04L 47/125; H04L 47/17; H04L 47/2425; H04L 49/252; H04L 67/1002; H04L 67/10; H04L 67/32; H04L 45/38; H04L 45/66; H04L 47/19; H04L 49/3009; H04L 61/2592; H04L 61/6022; H04L 67/101; H04L 67/28; H04L 67/2814; H04L 69/321; H04L 69/324; H04L 69/325; G06F 2009/4557; G06F 2009/45595; G06F 9/45558; G06F 9/546
See application file for complete search history.

(56) References Cited

U.S. PATENT DOCUMENTS

| | | | |
|---|---|---|---|
| 6,154,448 | A | 11/2000 | Petersen et al. |
| 6,772,211 | B2 | 8/2004 | Lu et al. |
| 6,779,030 | B1 | 8/2004 | Dugan et al. |
| 6,880,089 | B1 | 4/2005 | Bommareddy et al. |
| 6,985,956 | B2 | 1/2006 | Luke et al. |
| 7,013,389 | B1 | 3/2006 | Srivastava et al. |
| 7,209,977 | B2 | 4/2007 | Acharya et al. |
| 7,239,639 | B2 | 7/2007 | Cox et al. |
| 7,379,465 | B2 | 5/2008 | Aysan et al. |
| 7,406,540 | B2 | 7/2008 | Acharya et al. |
| 7,447,775 | B1 | 11/2008 | Zhu et al. |
| 7,480,737 | B2 | 1/2009 | Chauffour et al. |
| 7,487,250 | B2 | 2/2009 | Siegel |
| 7,649,890 | B2 | 1/2010 | Mizutani et al. |
| 7,818,452 | B2 | 10/2010 | Matthews et al. |
| 7,898,959 | B1 | 3/2011 | Arad |
| 7,948,986 | B1 | 5/2011 | Ghosh et al. |
| 8,078,903 | B1 | 12/2011 | Parthasarathy et al. |
| 8,094,575 | B1 * | 1/2012 | Vadlakonda .......... H04L 45/123 370/252 |
| 8,175,863 | B1 | 5/2012 | Ostermeyer et al. |
| 8,190,767 | B1 | 5/2012 | Maufer et al. |
| 8,201,219 | B2 | 6/2012 | Jones |
| 8,223,634 | B2 | 7/2012 | Tanaka et al. |
| 8,230,493 | B2 | 7/2012 | Davidson et al. |
| 8,266,261 | B2 | 9/2012 | Akagi |
| 8,339,959 | B1 * | 12/2012 | Moisand ............. H04L 63/1408 370/235 |
| 8,451,735 | B2 | 5/2013 | Li |
| 8,484,348 | B2 | 7/2013 | Subramanian et al. |
| 8,488,577 | B1 | 7/2013 | MacPherson |
| 8,521,879 | B1 | 8/2013 | Pena et al. |
| 8,615,009 | B1 | 12/2013 | Ramamoorthi et al. |
| 8,707,383 | B2 | 4/2014 | Bade et al. |
| 8,743,885 | B2 | 6/2014 | Khan et al. |
| 8,804,720 | B1 | 8/2014 | Rainovic et al. |
| 8,804,746 | B2 | 8/2014 | Wu et al. |
| 8,811,412 | B2 | 8/2014 | Shippy |
| 8,830,834 | B2 | 9/2014 | Sharma et al. |
| 8,832,683 | B2 | 9/2014 | Heim |
| 8,849,746 | B2 | 9/2014 | Candea et al. |
| 8,856,518 | B2 | 10/2014 | Sridharan et al. |
| 8,862,883 | B2 | 10/2014 | Cherukuri et al. |
| 8,868,711 | B2 | 10/2014 | Skjolsvold et al. |
| 8,873,399 | B2 | 10/2014 | Bothos et al. |
| 8,874,789 | B1 | 10/2014 | Zhu |
| 8,892,706 | B1 | 11/2014 | Dalal |
| 8,914,406 | B1 | 12/2014 | Haugsnes et al. |
| 8,971,345 | B1 | 3/2015 | McCanne et al. |
| 8,989,192 | B2 | 3/2015 | Foo et al. |
| 8,996,610 | B1 | 3/2015 | Sureshchandra et al. |
| 9,094,464 | B1 | 7/2015 | Scharber et al. |
| 9,104,497 | B2 | 8/2015 | Mortazavi |
| 9,148,367 | B2 | 9/2015 | Kandaswamy et al. |
| 9,191,293 | B2 | 11/2015 | Iovene et al. |
| 9,203,748 | B2 | 12/2015 | Jiang et al. |
| 9,225,638 | B2 | 12/2015 | Jain et al. |
| 9,225,659 | B2 | 12/2015 | McCanne et al. |
| 9,232,342 | B2 | 1/2016 | Seed et al. |
| 9,258,742 | B1 * | 2/2016 | Pianigiani ............. H04L 45/38 |
| 9,264,313 | B1 | 2/2016 | Manuguri et al. |
| 9,277,412 | B2 | 3/2016 | Freda et al. |
| 9,397,946 | B1 | 7/2016 | Yadav |
| 9,407,540 | B2 | 8/2016 | Kumar et al. |
| 9,407,599 | B2 | 8/2016 | Koponen et al. |
| 9,479,358 | B2 | 10/2016 | Klosowski et al. |
| 9,503,530 | B1 | 11/2016 | Niedzielski |
| 9,531,590 | B2 | 12/2016 | Jain et al. |
| 9,577,845 | B2 | 2/2017 | Thakkar et al. |
| 9,602,380 | B2 | 3/2017 | Strassner |

(56) References Cited

U.S. PATENT DOCUMENTS

| | | |
|---|---|---|
| 9,686,192 B2 | 6/2017 | Sengupta et al. |
| 9,686,200 B2 | 6/2017 | Pettit et al. |
| 9,705,702 B2 | 7/2017 | Foo et al. |
| 9,705,775 B2 | 7/2017 | Zhang et al. |
| 9,755,898 B2 | 9/2017 | Jain et al. |
| 9,755,971 B2 | 9/2017 | Wang et al. |
| 9,774,537 B2 | 9/2017 | Jain et al. |
| 9,787,605 B2 | 10/2017 | Zhang et al. |
| 9,804,797 B1 | 10/2017 | Ng et al. |
| 9,825,810 B2 | 11/2017 | Jain et al. |
| 9,860,079 B2 | 1/2018 | Cohn et al. |
| 9,900,410 B2 | 2/2018 | Dalal |
| 9,935,827 B2 | 4/2018 | Jain et al. |
| 9,979,641 B2 | 5/2018 | Jain et al. |
| 9,985,896 B2 | 5/2018 | Koponen et al. |
| 10,013,276 B2 | 7/2018 | Fahs et al. |
| 10,075,470 B2 | 9/2018 | Vaidya et al. |
| 10,079,779 B2 | 9/2018 | Zhang et al. |
| 10,084,703 B2 | 9/2018 | Kumar et al. |
| 10,091,276 B2 | 10/2018 | Bloomquist et al. |
| 10,104,169 B1 | 10/2018 | Moniz et al. |
| 10,129,077 B2 | 11/2018 | Jain et al. |
| 10,129,180 B2 | 11/2018 | Zhang et al. |
| 10,135,636 B2 | 11/2018 | Jiang et al. |
| 10,135,737 B2 | 11/2018 | Jain et al. |
| 10,187,306 B2 | 1/2019 | Nainar et al. |
| 10,200,493 B2 | 2/2019 | Bendapudi et al. |
| 10,212,071 B2 | 2/2019 | Kancherla et al. |
| 10,225,137 B2 | 3/2019 | Jain et al. |
| 10,237,379 B2 | 3/2019 | Kumar et al. |
| 10,250,501 B2 | 4/2019 | Ni |
| 10,257,095 B2 | 4/2019 | Jain et al. |
| 10,284,390 B2 | 5/2019 | Kumar et al. |
| 10,320,679 B2 | 6/2019 | Jain et al. |
| 10,333,822 B1 | 6/2019 | Jeuk et al. |
| 10,341,233 B2 | 7/2019 | Jain et al. |
| 10,341,427 B2 | 7/2019 | Jalan et al. |
| 10,375,155 B1 | 8/2019 | Cai et al. |
| 10,397,275 B2 | 8/2019 | Jain et al. |
| 10,516,568 B2 | 12/2019 | Jain et al. |
| 10,594,743 B2 | 3/2020 | Hong et al. |
| 10,609,091 B2 | 3/2020 | Hong et al. |
| 10,623,309 B1 | 4/2020 | Gampel et al. |
| 10,659,252 B2 | 5/2020 | Boutros et al. |
| 10,693,782 B2 | 6/2020 | Jain et al. |
| 10,708,229 B2 | 7/2020 | Sevinc et al. |
| 10,728,174 B2 | 7/2020 | Boutros et al. |
| 10,757,077 B2 | 8/2020 | Rajahalme et al. |
| 10,797,910 B2 | 10/2020 | Boutros et al. |
| 10,797,966 B2 | 10/2020 | Boutros et al. |
| 10,805,181 B2 | 10/2020 | Boutros et al. |
| 10,805,192 B2 | 10/2020 | Boutros et al. |
| 10,812,378 B2 | 10/2020 | Nainar et al. |
| 2002/0078370 A1 | 6/2002 | Tahan |
| 2002/0097724 A1 | 7/2002 | Halme et al. |
| 2002/0194350 A1 | 12/2002 | Lu et al. |
| 2003/0065711 A1 | 4/2003 | Acharya et al. |
| 2003/0093481 A1 | 5/2003 | Mitchell et al. |
| 2003/0097429 A1 | 5/2003 | Wu et al. |
| 2003/0105812 A1 | 6/2003 | Flowers et al. |
| 2003/0236813 A1 | 12/2003 | Abjanic |
| 2004/0066769 A1 | 4/2004 | Ahmavaara et al. |
| 2004/0210670 A1 | 10/2004 | Anerousis et al. |
| 2004/0215703 A1 | 10/2004 | Song et al. |
| 2005/0021713 A1 | 1/2005 | Dugan et al. |
| 2005/0089327 A1 | 4/2005 | Ovadia et al. |
| 2005/0091396 A1 | 4/2005 | Nilakantan et al. |
| 2005/0114429 A1 | 5/2005 | Caccavale |
| 2005/0114648 A1 | 5/2005 | Akundi et al. |
| 2005/0132030 A1 | 6/2005 | Hopen et al. |
| 2005/0198200 A1 | 9/2005 | Subramanian et al. |
| 2005/0249199 A1 | 11/2005 | Albert et al. |
| 2006/0069776 A1 | 3/2006 | Shim et al. |
| 2006/0112297 A1 | 5/2006 | Davidson |
| 2006/0130133 A1 | 6/2006 | Andreev et al. |
| 2006/0155862 A1 | 7/2006 | Kathi et al. |
| 2006/0195896 A1 | 8/2006 | Fulp et al. |
| 2006/0233155 A1 | 10/2006 | Srivastava |
| 2007/0061492 A1 | 3/2007 | Riel |
| 2007/0121615 A1 | 5/2007 | Weill et al. |
| 2007/0214282 A1 | 9/2007 | Sen |
| 2007/0260750 A1 | 11/2007 | Feied et al. |
| 2007/0288615 A1 | 12/2007 | Keohane et al. |
| 2007/0291773 A1 | 12/2007 | Khan et al. |
| 2008/0005293 A1 | 1/2008 | Bhargava et al. |
| 2008/0031263 A1 | 2/2008 | Ervin et al. |
| 2008/0046400 A1 | 2/2008 | Shi et al. |
| 2008/0049614 A1 | 2/2008 | Briscoe et al. |
| 2008/0049619 A1 | 2/2008 | Twiss |
| 2008/0049786 A1 | 2/2008 | Ram et al. |
| 2008/0072305 A1 | 3/2008 | Casado et al. |
| 2008/0084819 A1 | 4/2008 | Parizhsky et al. |
| 2008/0095153 A1 | 4/2008 | Fukunaga et al. |
| 2008/0104608 A1 | 5/2008 | Hyser et al. |
| 2008/0195755 A1 | 8/2008 | Lu et al. |
| 2008/0225714 A1 | 9/2008 | Denis |
| 2008/0239991 A1 | 10/2008 | Applegate et al. |
| 2008/0247396 A1 | 10/2008 | Hazard |
| 2008/0276085 A1 | 11/2008 | Davidson et al. |
| 2008/0279196 A1 | 11/2008 | Friskney et al. |
| 2009/0003349 A1* | 1/2009 | Havemann ............... H04L 45/56 370/392 |
| 2009/0003364 A1* | 1/2009 | Fendick ................. H04L 45/00 370/401 |
| 2009/0003375 A1* | 1/2009 | Havemann ............... H04L 45/60 370/463 |
| 2009/0019135 A1 | 1/2009 | Eswaran et al. |
| 2009/0063706 A1 | 3/2009 | Goldman et al. |
| 2009/0129271 A1 | 5/2009 | Ramankutty et al. |
| 2009/0172666 A1 | 7/2009 | Yahalom et al. |
| 2009/0199268 A1 | 8/2009 | Ahmavaara et al. |
| 2009/0235325 A1 | 9/2009 | Dimitrakos et al. |
| 2009/0238084 A1 | 9/2009 | Nadeau et al. |
| 2009/0249472 A1 | 10/2009 | Litvin et al. |
| 2009/0265467 A1 | 10/2009 | Peles et al. |
| 2009/0271586 A1 | 10/2009 | Shaath |
| 2009/0299791 A1 | 12/2009 | Blake et al. |
| 2009/0300210 A1 | 12/2009 | Ferris |
| 2009/0303880 A1 | 12/2009 | Maltz et al. |
| 2009/0307334 A1 | 12/2009 | Maltz et al. |
| 2009/0327464 A1 | 12/2009 | Archer et al. |
| 2010/0031360 A1 | 2/2010 | Seshadri et al. |
| 2010/0036903 A1 | 2/2010 | Ahmad et al. |
| 2010/0100616 A1 | 4/2010 | Bryson et al. |
| 2010/0131638 A1 | 5/2010 | Kondamuru |
| 2010/0165985 A1 | 7/2010 | Sharma et al. |
| 2010/0223364 A1 | 9/2010 | Wei |
| 2010/0223621 A1 | 9/2010 | Joshi et al. |
| 2010/0235915 A1 | 9/2010 | Memon et al. |
| 2010/0265824 A1 | 10/2010 | Chao et al. |
| 2010/0281482 A1 | 11/2010 | Pike et al. |
| 2010/0332595 A1 | 12/2010 | Fullagar et al. |
| 2011/0010578 A1 | 1/2011 | Dominguez et al. |
| 2011/0016348 A1 | 1/2011 | Pace et al. |
| 2011/0022695 A1 | 1/2011 | Dalai et al. |
| 2011/0022812 A1 | 1/2011 | Van Der Linden et al. |
| 2011/0035494 A1 | 2/2011 | Pandey et al. |
| 2011/0040893 A1 | 2/2011 | Karaoguz et al. |
| 2011/0055845 A1 | 3/2011 | Nandagopal et al. |
| 2011/0058563 A1 | 3/2011 | Saraph et al. |
| 2011/0090912 A1 | 4/2011 | Shippy |
| 2011/0164504 A1 | 7/2011 | Bothos et al. |
| 2011/0194563 A1 | 8/2011 | Shen et al. |
| 2011/0211463 A1 | 9/2011 | Matityahu et al. |
| 2011/0225293 A1 | 9/2011 | Rathod |
| 2011/0235508 A1 | 9/2011 | Goel et al. |
| 2011/0261811 A1 | 10/2011 | Battestilli et al. |
| 2011/0268118 A1 | 11/2011 | Schlansker et al. |
| 2011/0271007 A1* | 11/2011 | Wang ..................... H04L 45/64 709/238 |
| 2011/0276695 A1 | 11/2011 | Maldaner |
| 2011/0283013 A1 | 11/2011 | Grosser et al. |
| 2011/0295991 A1 | 12/2011 | Aida |
| 2011/0317708 A1 | 12/2011 | Clark |

(56) References Cited

U.S. PATENT DOCUMENTS

| | | |
|---|---|---|
| 2012/0005265 A1 | 1/2012 | Ushioda et al. |
| 2012/0014386 A1 | 1/2012 | Xiong et al. |
| 2012/0023231 A1 | 1/2012 | Ueno |
| 2012/0054266 A1 | 3/2012 | Kazerani et al. |
| 2012/0089664 A1 | 4/2012 | Igelka |
| 2012/0137004 A1 | 5/2012 | Smith |
| 2012/0140719 A1 | 6/2012 | Hui et al. |
| 2012/0144014 A1 | 6/2012 | Natham et al. |
| 2012/0147894 A1 | 6/2012 | Mulligan et al. |
| 2012/0155266 A1 | 6/2012 | Patel et al. |
| 2012/0176932 A1 | 7/2012 | Wu et al. |
| 2012/0185588 A1 | 7/2012 | Error |
| 2012/0195196 A1 | 8/2012 | Ghai et al. |
| 2012/0207174 A1 | 8/2012 | Shieh |
| 2012/0213074 A1 | 8/2012 | Goldfarb et al. |
| 2012/0230187 A1 | 9/2012 | Tremblay et al. |
| 2012/0239804 A1 | 9/2012 | Liu et al. |
| 2012/0246637 A1 | 9/2012 | Kreeger et al. |
| 2012/0281540 A1 | 11/2012 | Khan et al. |
| 2012/0287789 A1 | 11/2012 | Aybay et al. |
| 2012/0303784 A1 | 11/2012 | Zisapel et al. |
| 2012/0303809 A1 | 11/2012 | Patel et al. |
| 2012/0311568 A1 | 12/2012 | Jansen |
| 2012/0317260 A1 | 12/2012 | Husain et al. |
| 2012/0317570 A1 | 12/2012 | Dalcher et al. |
| 2012/0331188 A1 | 12/2012 | Riordan et al. |
| 2013/0003735 A1 | 1/2013 | Chao et al. |
| 2013/0031544 A1 | 1/2013 | Sridharan et al. |
| 2013/0039218 A1 | 2/2013 | Narasimhan et al. |
| 2013/0044636 A1 | 2/2013 | Koponen et al. |
| 2013/0058346 A1 | 3/2013 | Sridharan et al. |
| 2013/0073743 A1 | 3/2013 | Ramasamy et al. |
| 2013/0125120 A1 | 5/2013 | Zhang et al. |
| 2013/0136126 A1 | 5/2013 | Wang et al. |
| 2013/0142048 A1 | 6/2013 | Gross, IV et al. |
| 2013/0148505 A1 | 6/2013 | Koponen et al. |
| 2013/0151661 A1 | 6/2013 | Koponen et al. |
| 2013/0159487 A1 | 6/2013 | Patel et al. |
| 2013/0160024 A1 | 6/2013 | Shtilman et al. |
| 2013/0163594 A1 | 6/2013 | Sharma et al. |
| 2013/0166703 A1 | 6/2013 | Hammer et al. |
| 2013/0170501 A1 | 7/2013 | Egi et al. |
| 2013/0201989 A1 | 8/2013 | Hu et al. |
| 2013/0227097 A1 | 8/2013 | Yasuda et al. |
| 2013/0227550 A1 | 8/2013 | Weinstein et al. |
| 2013/0287026 A1 | 10/2013 | Davie |
| 2013/0311637 A1 | 11/2013 | Kamath et al. |
| 2013/0318219 A1 | 11/2013 | Kancherla |
| 2013/0332983 A1 | 12/2013 | Koorevaar et al. |
| 2013/0343378 A1 | 12/2013 | Veteikis et al. |
| 2014/0003232 A1 | 1/2014 | Guichard et al. |
| 2014/0003422 A1 | 1/2014 | Mogul et al. |
| 2014/0010085 A1 | 1/2014 | Kavunder et al. |
| 2014/0046997 A1 | 2/2014 | Dain et al. |
| 2014/0046998 A1 | 2/2014 | Dain et al. |
| 2014/0052844 A1 | 2/2014 | Nayak et al. |
| 2014/0059204 A1 | 2/2014 | Nguyen et al. |
| 2014/0059544 A1 | 2/2014 | Koganty et al. |
| 2014/0068602 A1 | 3/2014 | Gember et al. |
| 2014/0092738 A1 | 4/2014 | Grandhi et al. |
| 2014/0092914 A1 | 4/2014 | Kondapalli |
| 2014/0096183 A1 | 4/2014 | Jain et al. |
| 2014/0101226 A1 | 4/2014 | Khandekar et al. |
| 2014/0101656 A1 | 4/2014 | Zhu et al. |
| 2014/0115578 A1 | 4/2014 | Cooper et al. |
| 2014/0129715 A1 | 5/2014 | Mortazavi |
| 2014/0164477 A1 | 6/2014 | Springer et al. |
| 2014/0169168 A1 | 6/2014 | Jalan et al. |
| 2014/0169375 A1 | 6/2014 | Khan et al. |
| 2014/0195666 A1 | 7/2014 | Dumitriu et al. |
| 2014/0207968 A1 | 7/2014 | Kumar et al. |
| 2014/0254374 A1* | 9/2014 | Janakiraman et al. |
| 2014/0269724 A1* | 9/2014 | Mehler .................. H04L 45/30 370/392 |
| 2014/0281029 A1 | 9/2014 | Danforth |
| 2014/0282526 A1 | 9/2014 | Basavaiah et al. |
| 2014/0301388 A1 | 10/2014 | Jagadish et al. |
| 2014/0304231 A1 | 10/2014 | Kamath et al. |
| 2014/0307744 A1 | 10/2014 | Dunbar et al. |
| 2014/0310391 A1 | 10/2014 | Sorenson et al. |
| 2014/0310418 A1 | 10/2014 | Sorenson et al. |
| 2014/0317677 A1 | 10/2014 | Vaidya et al. |
| 2014/0321459 A1 | 10/2014 | Kumar et al. |
| 2014/0330983 A1 | 11/2014 | Zisapel et al. |
| 2014/0334485 A1 | 11/2014 | Jain et al. |
| 2014/0334488 A1 | 11/2014 | Guichard et al. |
| 2014/0351452 A1 | 11/2014 | Bosch et al. |
| 2014/0362705 A1 | 12/2014 | Pan |
| 2014/0369204 A1 | 12/2014 | Anand et al. |
| 2014/0372567 A1 | 12/2014 | Ganesh et al. |
| 2014/0372616 A1 | 12/2014 | Arisoylu et al. |
| 2014/0372702 A1 | 12/2014 | Subramanyam et al. |
| 2015/0003453 A1 | 1/2015 | Sengupta et al. |
| 2015/0003455 A1 | 1/2015 | Haddad et al. |
| 2015/0009995 A1 | 1/2015 | Gross, IV et al. |
| 2015/0016279 A1 | 1/2015 | Zhang et al. |
| 2015/0023354 A1 | 1/2015 | Li et al. |
| 2015/0026345 A1 | 1/2015 | Ravinoothala et al. |
| 2015/0026362 A1 | 1/2015 | Guichard et al. |
| 2015/0030024 A1 | 1/2015 | Venkataswami et al. |
| 2015/0052262 A1 | 2/2015 | Chanda et al. |
| 2015/0052522 A1 | 2/2015 | Chanda et al. |
| 2015/0063102 A1 | 3/2015 | Mestery et al. |
| 2015/0063364 A1 | 3/2015 | Thakkar et al. |
| 2015/0071301 A1 | 3/2015 | Dalal |
| 2015/0078384 A1 | 3/2015 | Jackson et al. |
| 2015/0103645 A1 | 4/2015 | Shen et al. |
| 2015/0103679 A1 | 4/2015 | Tessmer et al. |
| 2015/0103827 A1 | 4/2015 | Quinn et al. |
| 2015/0109901 A1 | 4/2015 | Tan et al. |
| 2015/0124608 A1 | 5/2015 | Agarwal et al. |
| 2015/0124622 A1 | 5/2015 | Kovvali et al. |
| 2015/0124840 A1 | 5/2015 | Bergeron |
| 2015/0138973 A1 | 5/2015 | Kumar et al. |
| 2015/0139041 A1 | 5/2015 | Bosch et al. |
| 2015/0146539 A1 | 5/2015 | Mehta et al. |
| 2015/0156035 A1 | 6/2015 | Foo et al. |
| 2015/0188770 A1 | 7/2015 | Naiksatam et al. |
| 2015/0195197 A1* | 7/2015 | Yong .................. H04L 45/306 370/392 |
| 2015/0213087 A1 | 7/2015 | Sikri |
| 2015/0215819 A1 | 7/2015 | Bosch et al. |
| 2015/0222640 A1 | 8/2015 | Kumar et al. |
| 2015/0237013 A1 | 8/2015 | Bansal et al. |
| 2015/0242197 A1 | 8/2015 | Alfonso et al. |
| 2015/0263901 A1 | 9/2015 | Kumar et al. |
| 2015/0271102 A1 | 9/2015 | Antich |
| 2015/0280959 A1 | 10/2015 | Vincent |
| 2015/0281089 A1 | 10/2015 | Marchetti |
| 2015/0281098 A1 | 10/2015 | Pettit et al. |
| 2015/0281125 A1 | 10/2015 | Koponen et al. |
| 2015/0281179 A1 | 10/2015 | Raman et al. |
| 2015/0281180 A1 | 10/2015 | Raman et al. |
| 2015/0288671 A1 | 10/2015 | Chan et al. |
| 2015/0288679 A1 | 10/2015 | Ben-Nun et al. |
| 2015/0295831 A1 | 10/2015 | Kumar et al. |
| 2015/0365322 A1* | 12/2015 | Shatzkamer ............ H04L 45/38 370/392 |
| 2015/0370596 A1 | 12/2015 | Fahs et al. |
| 2015/0372840 A1 | 12/2015 | Benny et al. |
| 2015/0372911 A1 | 12/2015 | Yabusaki et al. |
| 2015/0381493 A1 | 12/2015 | Bansal et al. |
| 2015/0381494 A1 | 12/2015 | Cherian et al. |
| 2015/0381495 A1 | 12/2015 | Cherian et al. |
| 2016/0006654 A1 | 1/2016 | Fernando et al. |
| 2016/0028640 A1 | 1/2016 | Zhang et al. |
| 2016/0043901 A1 | 2/2016 | Sankar et al. |
| 2016/0057050 A1 | 2/2016 | Ostrom et al. |
| 2016/0057687 A1 | 2/2016 | Horn et al. |
| 2016/0080253 A1 | 3/2016 | Wang et al. |
| 2016/0087888 A1 | 3/2016 | Jain et al. |
| 2016/0094384 A1 | 3/2016 | Jain et al. |
| 2016/0094389 A1 | 3/2016 | Jain et al. |
| 2016/0094451 A1 | 3/2016 | Jain et al. |

(56) References Cited

U.S. PATENT DOCUMENTS

| | | |
|---|---|---|
| 2016/0094452 A1 | 3/2016 | Jain et al. |
| 2016/0094453 A1 | 3/2016 | Jain et al. |
| 2016/0094454 A1 | 3/2016 | Jain et al. |
| 2016/0094455 A1 | 3/2016 | Jain et al. |
| 2016/0094456 A1 | 3/2016 | Jain et al. |
| 2016/0094457 A1 | 3/2016 | Jain et al. |
| 2016/0094631 A1 | 3/2016 | Jain et al. |
| 2016/0094632 A1 | 3/2016 | Jain et al. |
| 2016/0094633 A1 | 3/2016 | Jain et al. |
| 2016/0094642 A1 | 3/2016 | Jain et al. |
| 2016/0094643 A1 | 3/2016 | Jain et al. |
| 2016/0094661 A1 | 3/2016 | Jain et al. |
| 2016/0105333 A1 | 4/2016 | Lenglet et al. |
| 2016/0119226 A1 | 4/2016 | Guichard et al. |
| 2016/0127564 A1* | 5/2016 | Sharma ............... H04W 4/24 455/406 |
| 2016/0134528 A1 | 5/2016 | Lin et al. |
| 2016/0149816 A1 | 5/2016 | Roach et al. |
| 2016/0164776 A1 | 6/2016 | Biancaniello |
| 2016/0164787 A1 | 6/2016 | Roach et al. |
| 2016/0164826 A1 | 6/2016 | Riedel |
| 2016/0173373 A1 | 6/2016 | Guichard et al. |
| 2016/0182684 A1 | 6/2016 | Connor et al. |
| 2016/0197839 A1 | 7/2016 | Li et al. |
| 2016/0205015 A1* | 7/2016 | Halligan ............... H04L 45/04 370/400 |
| 2016/0226700 A1 | 8/2016 | Zhang et al. |
| 2016/0226754 A1 | 8/2016 | Zhang et al. |
| 2016/0226762 A1 | 8/2016 | Zhang et al. |
| 2016/0248685 A1 | 8/2016 | Pignataro et al. |
| 2016/0277210 A1 | 9/2016 | Lin et al. |
| 2016/0277294 A1 | 9/2016 | Akiyoshi |
| 2016/0294612 A1 | 10/2016 | Ravinoothala et al. |
| 2016/0294933 A1 | 10/2016 | Hong et al. |
| 2016/0294935 A1 | 10/2016 | Hong et al. |
| 2016/0308758 A1 | 10/2016 | Li et al. |
| 2016/0308961 A1 | 10/2016 | Rao |
| 2016/0337189 A1* | 11/2016 | Liebhart ............... H04L 47/20 |
| 2016/0337249 A1 | 11/2016 | Zhang et al. |
| 2016/0344565 A1 | 11/2016 | Batz et al. |
| 2016/0344621 A1* | 11/2016 | Roeland ............... H04L 45/38 |
| 2016/0352866 A1 | 12/2016 | Gupta et al. |
| 2016/0366046 A1 | 12/2016 | Anantharam et al. |
| 2016/0373364 A1 | 12/2016 | Yokota |
| 2016/0378537 A1 | 12/2016 | Zou |
| 2017/0005920 A1 | 1/2017 | Previdi et al. |
| 2017/0005923 A1 | 1/2017 | Babakian |
| 2017/0005988 A1 | 1/2017 | Bansal et al. |
| 2017/0019329 A1 | 1/2017 | Kozat et al. |
| 2017/0033939 A1* | 2/2017 | Bragg .................. H04L 12/18 |
| 2017/0063683 A1 | 3/2017 | Li et al. |
| 2017/0063928 A1 | 3/2017 | Jain et al. |
| 2017/0064749 A1 | 3/2017 | Jain et al. |
| 2017/0078176 A1 | 3/2017 | Lakshmikantha et al. |
| 2017/0093698 A1 | 3/2017 | Farmanbar |
| 2017/0126497 A1 | 5/2017 | Dubey et al. |
| 2017/0126522 A1 | 5/2017 | McCann et al. |
| 2017/0134538 A1 | 5/2017 | Mahkonen et al. |
| 2017/0142012 A1 | 5/2017 | Thakkar et al. |
| 2017/0149582 A1 | 5/2017 | Cohn et al. |
| 2017/0149675 A1 | 5/2017 | Yang |
| 2017/0163531 A1 | 6/2017 | Kumar et al. |
| 2017/0195255 A1 | 7/2017 | Pham et al. |
| 2017/0208000 A1 | 7/2017 | Bosch et al. |
| 2017/0208011 A1 | 7/2017 | Bosch et al. |
| 2017/0208532 A1 | 7/2017 | Zhou |
| 2017/0214627 A1 | 7/2017 | Zhang et al. |
| 2017/0230333 A1 | 8/2017 | Glazemakers et al. |
| 2017/0230467 A1 | 8/2017 | Salgueiro et al. |
| 2017/0237656 A1 | 8/2017 | Gage |
| 2017/0250902 A1* | 8/2017 | Rasanen ............... H04L 47/20 |
| 2017/0250917 A1* | 8/2017 | Ruckstuhl ............ H04L 45/306 |
| 2017/0264677 A1* | 9/2017 | Li ......................... H04L 41/50 |
| 2017/0273099 A1 | 9/2017 | Zhang et al. |
| 2017/0279938 A1 | 9/2017 | You et al. |
| 2017/0295021 A1 | 10/2017 | Gutiérrez et al. |
| 2017/0295100 A1 | 10/2017 | Hira et al. |
| 2017/0310588 A1 | 10/2017 | Zuo |
| 2017/0310611 A1 | 10/2017 | Kumar et al. |
| 2017/0317926 A1 | 11/2017 | Penno et al. |
| 2017/0317954 A1 | 11/2017 | Masurekar et al. |
| 2017/0324651 A1 | 11/2017 | Penno et al. |
| 2017/0331672 A1 | 11/2017 | Fedyk et al. |
| 2017/0339110 A1 | 11/2017 | Ni |
| 2017/0339600 A1* | 11/2017 | Roeland ............... H04L 47/76 |
| 2017/0346764 A1 | 11/2017 | Tan et al. |
| 2017/0353387 A1 | 12/2017 | Kwak et al. |
| 2017/0364794 A1 | 12/2017 | Mahkonen et al. |
| 2017/0373990 A1 | 12/2017 | Jeuk et al. |
| 2018/0027101 A1 | 1/2018 | Kumar et al. |
| 2018/0041524 A1 | 2/2018 | Reddy et al. |
| 2018/0063018 A1 | 3/2018 | Bosch et al. |
| 2018/0091420 A1 | 3/2018 | Drake et al. |
| 2018/0102919 A1 | 4/2018 | Hao et al. |
| 2018/0115471 A1 | 4/2018 | Curcio et al. |
| 2018/0124061 A1* | 5/2018 | Raman ................. G06F 9/5011 |
| 2018/0139098 A1 | 5/2018 | Sunavala et al. |
| 2018/0145899 A1 | 5/2018 | Rao |
| 2018/0159733 A1 | 6/2018 | Poon et al. |
| 2018/0159943 A1 | 6/2018 | Poon et al. |
| 2018/0176177 A1 | 6/2018 | Bichot et al. |
| 2018/0176294 A1 | 6/2018 | Vacaro et al. |
| 2018/0184281 A1 | 6/2018 | Tamagawa et al. |
| 2018/0198692 A1 | 7/2018 | Ansari et al. |
| 2018/0198705 A1 | 7/2018 | Wang et al. |
| 2018/0198791 A1 | 7/2018 | Desai et al. |
| 2018/0205637 A1 | 7/2018 | Li |
| 2018/0213040 A1 | 7/2018 | Pak et al. |
| 2018/0219762 A1 | 8/2018 | Wang et al. |
| 2018/0227216 A1 | 8/2018 | Hughes |
| 2018/0234360 A1 | 8/2018 | Narayana et al. |
| 2018/0248755 A1 | 8/2018 | Hecker et al. |
| 2018/0248986 A1 | 8/2018 | Dalal |
| 2018/0262427 A1 | 9/2018 | Jain et al. |
| 2018/0262434 A1 | 9/2018 | Koponen et al. |
| 2018/0278530 A1 | 9/2018 | Connor et al. |
| 2018/0295053 A1 | 10/2018 | Leung et al. |
| 2018/0302242 A1 | 10/2018 | Hao et al. |
| 2018/0337849 A1 | 11/2018 | Sharma et al. |
| 2018/0349212 A1 | 12/2018 | Liu et al. |
| 2018/0351874 A1* | 12/2018 | Abhigyan ............ H04L 12/4641 |
| 2019/0020580 A1 | 1/2019 | Boutros et al. |
| 2019/0020600 A1 | 1/2019 | Zhang et al. |
| 2019/0020684 A1 | 1/2019 | Qian et al. |
| 2019/0028384 A1 | 1/2019 | Penno et al. |
| 2019/0036819 A1 | 1/2019 | Kancherla et al. |
| 2019/0068500 A1 | 2/2019 | Hira |
| 2019/0089679 A1 | 3/2019 | Kahalon et al. |
| 2019/0097838 A1 | 3/2019 | Sahoo et al. |
| 2019/0132220 A1 | 5/2019 | Boutros et al. |
| 2019/0132221 A1 | 5/2019 | Boutros et al. |
| 2019/0140947 A1 | 5/2019 | Zhuang et al. |
| 2019/0149512 A1 | 5/2019 | Sevinc et al. |
| 2019/0149516 A1 | 5/2019 | Rajahalme et al. |
| 2019/0149518 A1 | 5/2019 | Sevinc et al. |
| 2019/0166045 A1 | 5/2019 | Peng et al. |
| 2019/0173778 A1 | 6/2019 | Faseela et al. |
| 2019/0229937 A1 | 7/2019 | Nagarajan et al. |
| 2019/0238363 A1 | 8/2019 | Boutros et al. |
| 2019/0238364 A1 | 8/2019 | Boutros et al. |
| 2019/0288947 A1 | 9/2019 | Jain et al. |
| 2019/0306036 A1 | 10/2019 | Boutros et al. |
| 2019/0306086 A1 | 10/2019 | Boutros et al. |
| 2019/0342175 A1 | 11/2019 | Wan et al. |
| 2019/0379578 A1 | 12/2019 | Mishra et al. |
| 2019/0379579 A1 | 12/2019 | Mishra et al. |
| 2020/0007388 A1 | 1/2020 | Johnston et al. |
| 2020/0036629 A1 | 1/2020 | Roeland et al. |
| 2020/0076684 A1 | 3/2020 | Naveen et al. |
| 2020/0076734 A1 | 3/2020 | Naveen et al. |
| 2020/0084141 A1 | 3/2020 | Bengough et al. |
| 2020/0136960 A1 | 4/2020 | Jeuk et al. |
| 2020/0145331 A1 | 5/2020 | Bhandari et al. |
| 2020/0162318 A1 | 5/2020 | Patil et al. |

(56) References Cited

U.S. PATENT DOCUMENTS

| | | |
|---|---|---|
| 2020/0204492 A1 | 6/2020 | Sarva et al. |
| 2020/0213366 A1 | 7/2020 | Hong et al. |
| 2020/0272493 A1 | 8/2020 | Lecuyer et al. |
| 2020/0272494 A1 | 8/2020 | Gokhale et al. |
| 2020/0272495 A1 | 8/2020 | Rolando et al. |
| 2020/0272496 A1 | 8/2020 | Mundaragi et al. |
| 2020/0272497 A1 | 8/2020 | Kavathia et al. |
| 2020/0272498 A1 | 8/2020 | Mishra et al. |
| 2020/0272499 A1 | 8/2020 | Feng et al. |
| 2020/0272500 A1 | 8/2020 | Feng et al. |
| 2020/0272501 A1 | 8/2020 | Chalvadi et al. |
| 2020/0274757 A1 | 8/2020 | Rolando et al. |
| 2020/0274769 A1 | 8/2020 | Naveen et al. |
| 2020/0274778 A1 | 8/2020 | Lecuyer et al. |
| 2020/0274779 A1 | 8/2020 | Rolando et al. |
| 2020/0274795 A1 | 8/2020 | Rolando et al. |
| 2020/0274808 A1 | 8/2020 | Mundaragi et al. |
| 2020/0274809 A1 | 8/2020 | Rolando et al. |
| 2020/0274810 A1 | 8/2020 | Gokhale et al. |
| 2020/0274826 A1 | 8/2020 | Mishra et al. |
| 2020/0274945 A1 | 8/2020 | Rolando et al. |
| 2020/0322271 A1 | 10/2020 | Jain et al. |
| 2020/0358696 A1 | 11/2020 | Hu et al. |
| 2020/0366526 A1 | 11/2020 | Boutros et al. |
| 2020/0366584 A1 | 11/2020 | Boutros et al. |
| 2020/0382420 A1 | 12/2020 | Suryanarayana et al. |

FOREIGN PATENT DOCUMENTS

| | | |
|---|---|---|
| CN | 103516807 A | 1/2014 |
| CN | 103795805 A | 5/2014 |
| EP | 2426956 A1 | 3/2012 |
| JP | 2005311863 A | 11/2005 |
| WO | 9918534 A2 | 4/1999 |
| WO | 2008095010 A1 | 8/2008 |
| WO | 2014182529 A1 | 11/2014 |
| WO | 2016053373 A1 | 4/2016 |
| WO | 2016054272 A1 | 4/2016 |
| WO | 2019084066 A1 | 5/2019 |
| WO | 2019147316 A1 | 8/2019 |
| WO | 2020046686 A1 | 3/2020 |
| WO | 2020171937 A1 | 8/2020 |

OTHER PUBLICATIONS

Karakus, Murat, et al., "Quality of Service (QoS) in Software Defined Networking (SDN): A Survey," Journal of Network and Computer Applications, Dec. 9, 2016, 19 pages, vol. 80, Elsevier, Ltd.
Non-Published Commonly Owned U.S. Appl. No. 16/905,909, filed Jun. 18, 2020, 36 pages, Nicira, Inc.
Non-Published Commonly Owned U.S. Appl. No. 16/945,675, filed Jul. 31, 2020, 51 pages, Nicira, Inc.
Non-Published Commonly Owned U.S. Appl. No. 16/945,868, filed Aug. 1, 2020, 48 pages, Nicira, Inc.
Author Unknown, "Datagram," Jun. 22, 2012, 2 pages, retrieved from https://web.archive.org/web/20120622031055/https://en.wikipedia.org/wiki/datagram.
Author Unknown, "AppLogic Features," Jul. 2007, 2 pages. 3TERA, Inc.
Author Unknown, "Enabling Service Chaining on Cisco Nexus 1000V Series," Month Unknown, 2012, 25 pages, CISCO.
Dixon, Colin, et al., "An End to the Middle," Proceedings of the 12th Conference on Hot Topics in Operating Systems, May 2009, 5 pages, USENIX Association, Berkeley, CA, USA.
Dumitriu, Dan Mihai, et al., (U.S. Appl. No. 61/514,990), filed Aug. 4, 2011.
Greenberg, Albert, et al., "VL2: A Scalable and Flexible Data Center Network," SIGCOMM '09, Aug. 17-21, 2009, 12 pages, ACM, Barcelona, Spain.
Guichard, J., et al., "Network Service Chaining Problem Statement," Network Working Group, Jun. 13, 2013, 14 pages, Cisco Systems, Inc.
Halpern, J., et al., "Service Function Chaining (SFC) Architecture," draft-ietf-sfc-architecture-02, Sep. 20, 2014, 26 pages, IETF.
Joseph, Dilip Anthony, et al., "A Policy-aware Switching Layer for Data Centers," Jun. 24, 2008, 26 pages, Electrical Engineering and Computer Sciences, University of California, Berkeley, CA, USA.
Kumar, S., et al., "Service Function Chaining Use Cases in Data Centers," draft-ietf-sfc-dc-use-cases-01, Jul. 21, 2014, 23 pages, IETF.
Liu, W., et al., "Service Function Chaining (SFC) Use Cases," draft-liu-sfc-use-cases-02, Feb. 13, 2014, 17 pages, IETF.
Non-Published Commonly Owned U.S. Appl. No. 15/937,621, filed Mar. 27, 2018, 42 pages, Nicira, Inc.
Non-Published Commonly Owned U.S. Appl. No. 16/005,628, filed Jun. 11, 2018, 44 pages, Nicira, Inc.
Non-Published Commonly Owned U.S. Appl. No. 16/005,636, filed Jun. 11, 2018, 45 pages, Nicira, Inc.
Non-Published Commonly Owned U.S. Appl. No. 16/120,281, filed Sep. 2, 2018, 45 pages, VMware, Inc.
Non-Published Commonly Owned U.S. Appl. No. 16/120,283, filed Sep. 2, 2018, 46 pages, VMware, Inc.
Non-Published Commonly Owned U.S. Appl. No. 16/427,294, filed May 30, 2019, 73 pages, Nicira, Inc.
Non-Published Commonly Owned U.S. Appl. No. 16/444,826, filed Jun. 18, 2019, 125 pages, VMware, Inc.
Non-Published Commonly Owned U.S. Appl. No. 16/444,845, filed Jun. 18, 2019, 124 pages, VMware, Inc.
Non-Published Commonly Owned U.S. Appl. No. 16/444,884, filed Jun. 18, 2019, 98 pages, VMware, Inc.
Non-Published Commonly Owned U.S. Appl. No. 16/444,907, filed Jun. 18, 2019, 98 pages, VMware, Inc.
Non-Published Commonly Owned U.S. Appl. No. 16/444,927, filed Jun. 18, 2019, 99 pages, VMware, Inc.
Non-Published Commonly Owned U.S. Appl. No. 16/444,956, filed Jun. 18, 2019, 98 pages, VMware, Inc.
Non-Published Commonly Owned U.S. Appl. No. 16/444,964, filed Jun. 18, 2019, 98 pages, VMware, Inc.
Non-Published Commonly Owned U.S. Appl. No. 16/444,978, filed Jun. 18, 2019, 98 pages, VMware, Inc.
Non-Published Commonly Owned U.S. Appl. No. 16/444,989, filed Jun. 18, 2019, 98 pages, VMware, Inc.
Non-Published Commonly Owned U.S. Appl. No. 16/445,004, filed Jun. 18, 2019, 98 pages, VMware, Inc.
Non-Published Commonly Owned U.S. Appl. No. 16/445,016, filed Jun. 18, 2019, 99 pages, VMware, Inc.
Non-Published Commonly Owned U.S. Appl. No. 16/445,023, filed Jun. 18, 2019, 99 pages, VMware, Inc.
Non-Published Commonly Owned U.S. Appl. No. 16/445,031, filed Jun. 18, 2019, 99 pages, VMware, Inc.
Non-Published Commonly Owned U.S. Appl. No. 16/445,035, filed Jun. 18, 2019, 98 pages, VMware, Inc.
Non-Published Commonly Owned U.S. Appl. No. 16/445,044, filed Jun. 18, 2019, 98 pages, VMware, Inc.
Non-Published Commonly Owned U.S. Appl. No. 16/445,051, filed Jun. 18, 2019, 99 pages, VMware, Inc.
Non-Published Commonly Owned U.S. Appl. No. 16/445,058, filed Jun. 18, 2019, 99 pages, VMware, Inc.
Non-Published Commonly Owned U.S. Appl. No. 16/445,062, filed Jun. 18, 2019, 98 pages, VMware, Inc.
Non-Published Commonly Owned U.S. Appl. No. 16/445,064, filed Jun. 18, 2019, 99 pages, VMware, Inc.
Salsano, Stefano, et al., "Generalized Virtual Networking: An Enabler for Service Centric Networking and Network Function Virtualization," 2014 16th International Telecommunications Network Strategy and Planning Symposium, Sep. 17-19, 2014, 7 pages, IEEE, Funchal, Portugal.
Sekar, Vyas, et al., "Design and Implementation of a Consolidated Middlebox Architecture," 9th USENIX Symposium on Networked Systems Design and Implementation, Apr. 25-27, 2012, 14 pages, USENIX, San Jose, CA, USA.
Sherry, Justine, et al., "Making Middleboxes Someone Else's Problem: Network Processing as a Cloud Service," In Proc. of SIGCOMM '12, Aug. 13-17, 2012, 12 pages, Helsinki, Finland.

(56) References Cited

OTHER PUBLICATIONS

Non-Published Commonly Owned U.S. Appl. No. 16/816,067, filed Mar. 11, 2020, 55 pages, Nicira, Inc.
Non-Published Commonly Owned U.S. Appl. No. 17/067,635, filed Oct. 9, 2020, 65 pages, Nicira, Inc.
PCT International Search Report and Written Opinion of Commonly Owned International Patent Application PCT/US2020/016457, dated Jun. 23, 2020, 15 pages, International Searching Authority (EPO).
Siasi, N., et al., "Container-Based Service Function Chain Mapping," 2019 SoutheastCon, Apr. 11-14, 2019, 6 pages, IEEE, Huntsville, AL, USA.
Lin, Po-Ching, et al., "Balanced Service Chaining in Software-Defined Networks with Network Function Virtualization," Computer: Research Feature, Nov. 2016, 9 pages, vol. 49, No. 11, IEEE.

\* cited by examiner

SPECIFYING SERVICE CHAINS

BACKGROUND

Datacenters today use static, configuration intensive ways to distribute data messages between different application layers and to different service layers. A common approach today is to configure the virtual machines to send packets to virtual IP (VIP) addresses, and then configure the forwarding elements and load balancers in the datacenter with forwarding rules that direct them to forward VIP addressed packets to appropriate application and/or service layers. Another problem with existing message distribution schemes is that today's load balancers often are chokepoints for the distributed traffic. Accordingly, there is a need in the art for a new approach to seamlessly distribute data messages in the datacenter between different application and/or service layers. Ideally, this new approach would allow the distribution scheme to be easily modified without reconfiguring the servers that transmit the data messages.

BRIEF SUMMARY

Some embodiments provide novel methods for performing services for machines operating in one or more datacenters. For instance, for a group of related guest machines (e.g., a group of tenant machines), some embodiments define two different forwarding planes: (1) a guest forwarding plane and (2) a service forwarding plane. The guest forwarding plane connects to the machines in the group and performs L2 and/or L3 forwarding for these machines. The service forwarding plane (1) connects to the service nodes that perform services on data messages sent to and from these machines, and (2) forwards these data messages to the service nodes.

In some embodiments, the guest machines do not connect directly with the service forwarding plane. For instance, in some embodiments, each forwarding plane connects to a machine or service node through a port that receives data messages from, or supplies data messages to, the machine or service node. In such embodiments, the service forwarding plane does not have a port that directly receives data messages from, or supplies data messages to, any guest machine. Instead, in some such embodiments, data associated with a guest machine is routed to a port proxy module executing on the same host computer, and this port proxy module has a service plane port. This port proxy module in some embodiments indirectly can connect more than one guest machine on the same host to the service plane (i.e., can serve as the port proxy module for more than one guest machine on the same host).

In some embodiments, a guest machine is any machine that is not a service machine or node. A guest machine can be a tenant's machine in a multi-tenant datacenter, but it does not have to be. A guest machine in some embodiments is a guest virtual machine or guest container. A service node in some embodiments is a service virtual machine, a service container or a service appliance. In some embodiments, a service node performs a middlebox service operation, such as a firewall, an intrusion detection system, an intrusion prevention system, a load balancer, an encryptor, a message monitor, a message collector, or any number of other middlebox services. As such, a service as used in this document is any type of middlebox service operation in some embodiments.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, the Drawings and the Claims is needed. Moreover, the claimed subject matters are not to be limited by the illustrative details in the Summary, Detailed Description and the Drawing.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments provide novel methods for performing services for machines operating in one or more datacenters. For instance, for a group of related guest machines (e.g., a group of tenant machines), some embodiments define two different forwarding planes: (1) a guest forwarding plane and (2) a service forwarding plane. The guest forwarding plane connects to the machines in the group and performs L2 and/or L3 forwarding for these machines. The service forwarding plane (1) connects to the service nodes that perform services on data messages sent to and from these machines, and (2) forwards these data messages to the service nodes.

In some embodiments, the guest machines do not connect directly with the service forwarding plane. For instance, in some embodiments, each forwarding plane connects to a machine or service node through a port that receives data messages from, or supplies data messages to, the machine or service node. In such embodiments, the service forwarding plane does not have a port that directly receives data messages from, or supplies data messages to, any guest machine. Instead, in some such embodiments, data associated with a guest machine is routed to a port proxy module executing on the same host computer, and this other module has a service plane port. This port proxy module in some embodiments indirectly can connect more than one guest machine on the same host to the service plane (i.e., can serve as the port proxy module for more than one guest machine on the same host).

In some embodiments, a guest machine is any machine that is not a service machine or node. A guest machine can be a tenant's machine in a multi-tenant datacenter, but it does not have to be. A guest machine in some embodiments is a guest virtual machine or guest container. A service node in some embodiments is a service virtual machine, a service container or a service appliance. In some embodiments, a service node performs a middlebox service operation, such as a firewall, an intrusion detection system, an intrusion prevention system, a load balancer, an encryptor, a message monitor, a message collector, or any number of other middlebox services. As such, a service as used in this document is any type of middlebox service operation in some embodiments.

Figure 1:
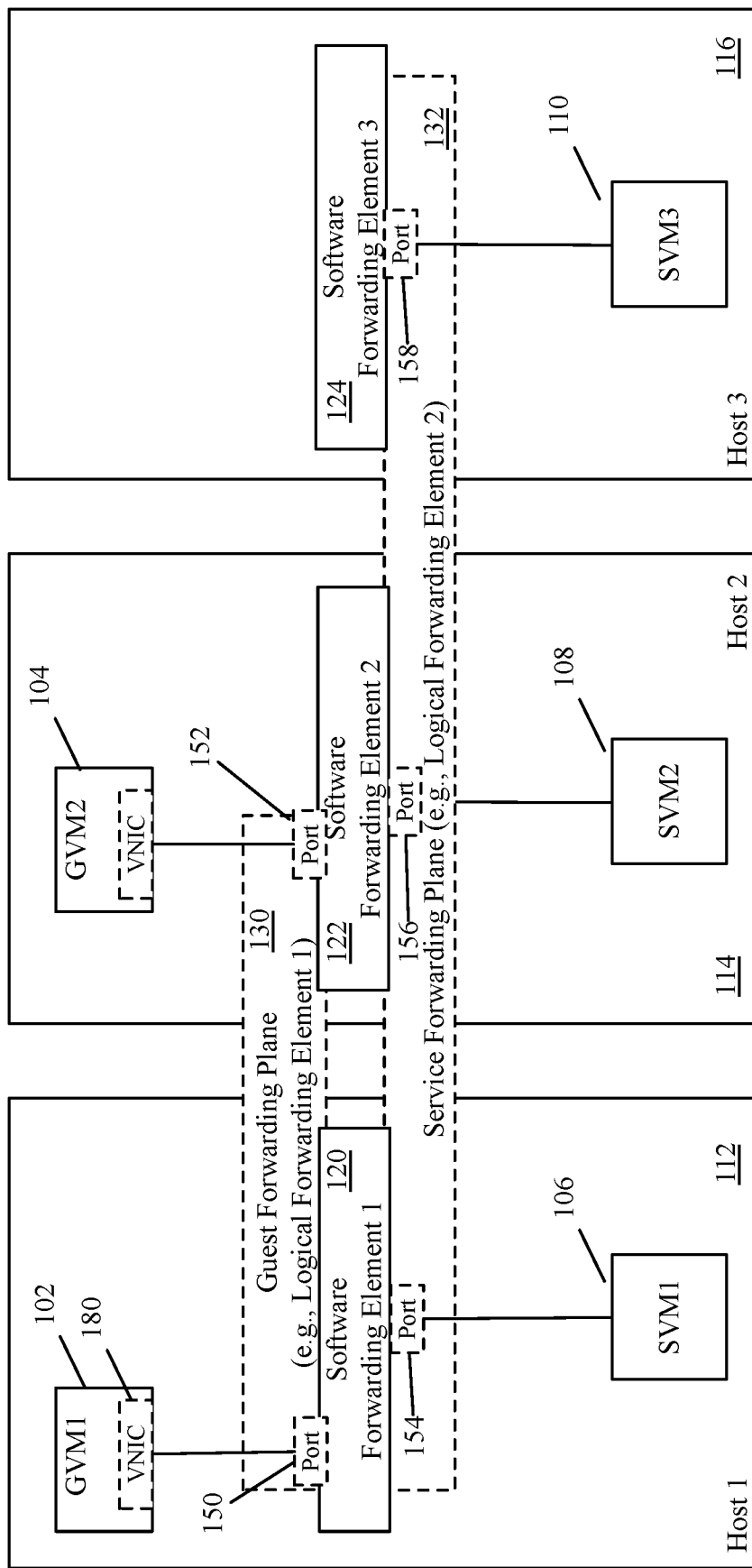
FIG. 1 illustrates an example of segregated guest and service planes that are implemented in some embodiments by two logical forwarding elements.

Also, as used in this document, data messages refer to a collection of bits in a particular format sent across a network. One of ordinary skill in the art will recognize that the term data message is used in this document to refer to various formatted collections of bits that are sent across a network. The formatting of these bits can be specified by standardized protocols or non-standardized protocols. Examples of data messages following standardized protocols include Ethernet frames, IP packets, TCP segments, UDP datagrams, etc. Also, as used in this document, references to L2, L3, L4, and L7 layers (or layer 2, layer 3, layer 4, and layer 7) are references respectively to the second data link layer, the third network layer, the fourth transport layer, and the seventh application layer of the OSI (Open System Interconnection) layer mod FIG. 1 illustrates an example of segregated guest and service planes that are implemented in some embodiments by two logical forwarding elements (LFEs) 130 and 132. As shown, two guest machines 102 and 104 and three service machines 106, 108 and 110 execute on three host computers 112, 114 and 116 along with three software forwarding elements 120, 122 and 124. In this example, the guest machines and service machines are guest virtual machines (GVMs) and service virtual machines (SVMs), but in other embodiments these machines can be other types of machines, such as containers.

Also, in this example, each logical forwarding element is a distributed forwarding element that is implemented by configuring multiple software forwarding elements (SFEs) on multiple host computers. To do this, each SFE or a module associated with the SFE in some embodiments is configured to encapsulate the data messages of the LFE with an overlay network header that contains a virtual network identifier (VNI) associated with the overlay network. As such, the LFEs are said to be overlay network constructs that span multiple host computers in the discussion below.

The LFEs also span in some embodiments configured hardware forwarding elements (e.g., top of rack switches). In some embodiments, each LFE is a logical switch that is implemented by configuring multiple software switches (called virtual switches or vswitches) or related modules on multiple host computers. In other embodiments, the LFEs can be other types of forwarding elements (e.g., logical routers), or any combination of forwarding elements (e.g., logical switches and/or logical routers) that form logical networks or portions thereof. Many examples of LFEs, logical switches, logical routers and logical networks exist today, including those provided by VMware's NSX network and service virtualization platform.

As shown, the LFE 130 defines the guest forwarding plane that connects the GVMs 102 and 104 in order to forward data messages between these GVMs. In some embodiments, this LFE is a logical switch that connects to a logical router, which connects the GVMs directly or through a logical gateway to networks outside of the logical switch's logical network. The LFE 130 is implemented in some embodiments by configuring software switches 120 and 122 and/or their related modules (e.g., related port/ VNIC filter modules) on the host computers 112 and 114 to implement a first distributed logical switch.

FIG. 1 and other figures discussed below show the source and destination GVMs being on the same logical network and being connected to the same LFE. One of ordinary skill will realize that the service operations of some embodiments do not require the source and destination machines to be connected to the same LFE, or to even be in the same network or the same datacenter. These service operations are performed on data messages that exit the source machine's network or enter a source machine's network. The figures depict the source and destination machines as connected to the same LFE to emphasize that the service plane 132 is implemented by a separate logical network than the logical network that forwards the data messages associated with the guest machines.

The LFE 132 defines the service forwarding plane that connects the SVMs 106, 108 and 110 in order to forward data messages associated with the GVMs through service paths that include the SVMs. In some embodiments, the LFE 132 is also a logical switch that is implemented by configuring software switches 120, 122 and 124 and/or their related modules on the host computers 112, 114 and 116 to implement a second distributed logical switch. Instead of configuring the same set of SFEs to implement both the guest and service forwarding planes (i.e., the guest and service LFEs), other embodiments configure one set of SFEs on a set of host computers to implement the guest forwarding plane and another set of SFEs on the set of host computers to implement the service forwarding plane. For instance, in some embodiments, each host computer executes a guest software switch and a service software switch, and these two switches and/or their related modules can be configured to implement a guest logical switch and a service logical switch.

In some embodiments, the software switches 120, 122 and 124 and/or their related modules can be configured to implement multiple guest forwarding planes (e.g., guest LFEs) and multiple service forwarding planes (e.g., service LFEs) for multiple groups of machines. For instance, for a multi-tenant datacenter, some such embodiments define a guest LFE and a service LFE for each tenant for which at least one chain of services needs to be implemented. For each group of related machines (e.g., for each tenant's machines), some embodiments define two virtual network identifiers (VNIs) to configure a shared set of software forwarding elements (e.g., software switches) to implement the two different forwarding planes, i.e., the guest forwarding plane and the service forwarding plane. These two VNIs are referred to below as the guest VNI (GVNI) and the service VNI (SVNI). In FIG. 1, the guest LFE ports 150 and 152 are associated with the GVNI, while the service LFE ports 154, 156, and 158 are associated with the SVNI, as shown.

In some embodiments, the service plane 132 is also implemented by inserting modules in input/output (TO) chains of a GVM's egress and ingress datapaths to and from an SFE 120 or 122. In this implementation, the service plane 132 can identify a data message sent from the GVM or received for the GVM, forward the data message to a set of SVMs to perform a chain of services on the data message, and then to return the data message back to the GVM's datapath so that the data message can be proceed along its datapath to the software switch or to the GVM (i.e., so that the data message can be processed based on the destination network addresses specified by the source GVM). Such a GVM is referred to below as the source GVM as the data message being processed by the service nodes is a data message identified on the GVM's egress or ingress path. In some embodiments, a GVM's egress/ingress IO chain is implemented as a set of hooks (function calls) in the GVM's VNIC (virtual network interface card) 180 or the SFE port associated with the GVM's VNIC (e.g., the SFE port communicating with the GVM's VNIC).

Figure 2:
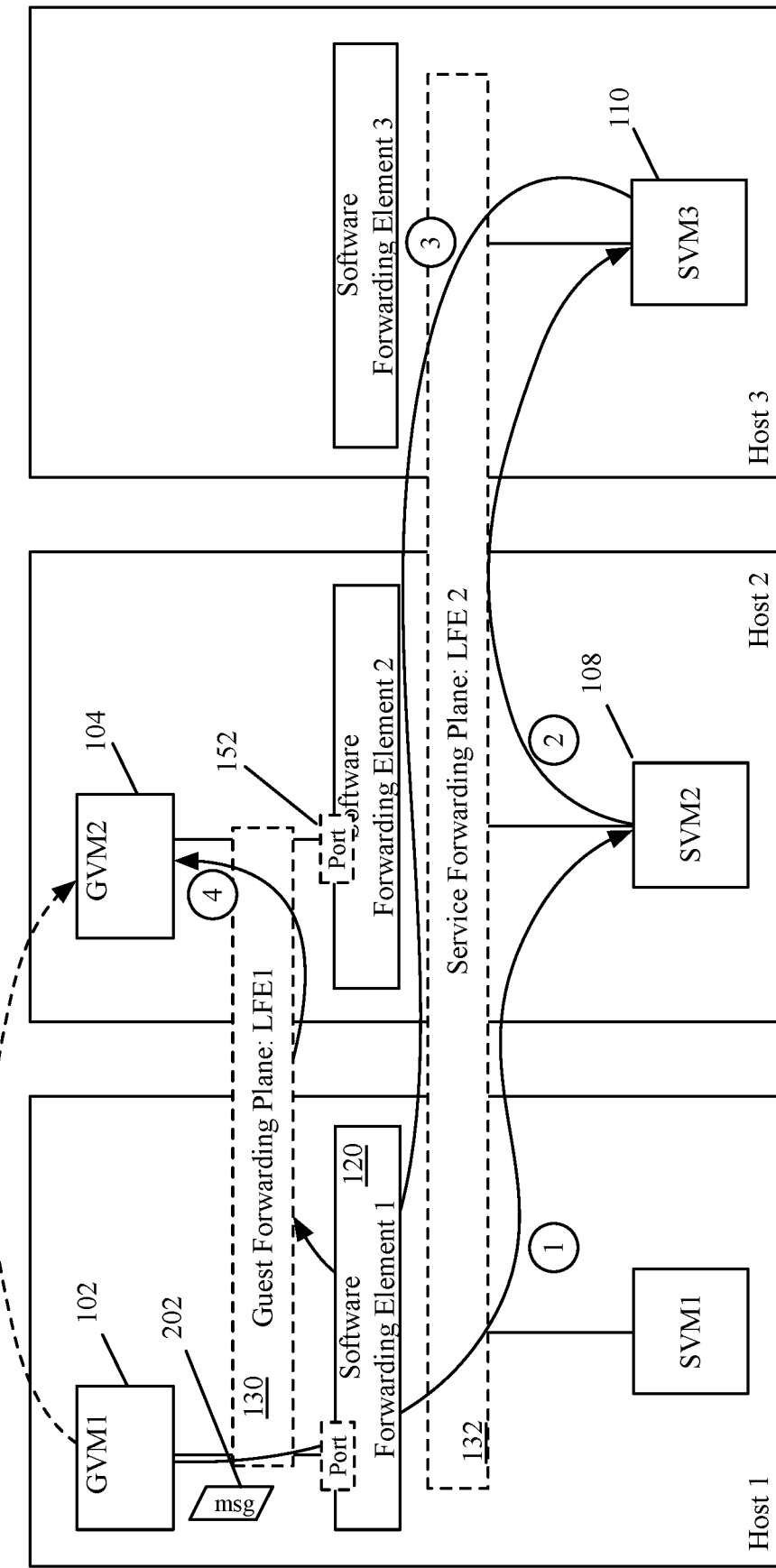
FIG. 2 illustrates a data message between two guest virtual machines (GVMs) being redirected along a service path to be processed by service virtual machines (SVMs) of some embodiments.

Before providing an example of the IO chain components of some embodiments that implement the service plane, FIG. 2 illustrates an example of a data message 202 from the GVM 102 to GVM 104 being redirected along the service plane 132 so that the data message can be processed by SVMs 108 and 110 that perform a chain of two service operations. As shown, the service LFE 132 first forwards the data message to SVM 108, and then forwards the data message to SVM 110, before returning the data message back to the egress path of GVM 102 so that the data message can be processed based on the destination network addresses specified by the source GVM 102.

The service LFE in some embodiments forwards the data message between hosts 112, 114 and 116 by using an overlay encapsulation header that stores the SVNI for the service LFE. Also, when the service LFE is a service logical switch, the service forwarding plane in some embodiments uses the MAC addresses associated with the SVMs (e.g., MAC addresses of SVM VNICs) to forward the data message between ports of the service logical switch. In some embodiments, the MAC forwarding also uses service plane MAC address associated with the source GVM, even though this GVM does not directly connect to the service plane but instead connects to the service plane through a port proxy, as further described below.

Once the data message 202 returns to the egress path of the GVM 102, the guest LFE 130 forwards the data message to its destination (e.g., as specified by the destination network address in the data message's header), which is GVM 104. The guest LFE 130 in some embodiments forwards the data message between hosts 112 and 114 by using an overlay encapsulation header that stores the GVNI for the guest LFE. Also, when the guest LFE is a logical switch, the guest forwarding plane in some embodiments uses the guest plane MAC addresses associated with the GVMs 102 and 104 to forward the data message (e.g., by using the guest plane MAC address of GVM 104 to forward the data message to the guest forwarding port 152 associated with this GVM). While the service plane of FIG. 2 captures a data message passing through a GVM's egress path, the service plane in some embodiments can also capture a data message as it is passing through a GVM's ingress path before it reaches the GVM's VNIC.

In some embodiments, a chain of service operations is referred to as a service chain. A service chain in some embodiments can be implemented with one or more sets of service nodes (e.g., service machines or appliances), with each set of service nodes defining a service path. Hence, in some embodiments, a service chain can be implemented by each of one or more service paths. Each service path in some embodiments includes one or more service nodes for performing the set of one or more services of the service chain and a particular order through these nodes.

Figure 3:
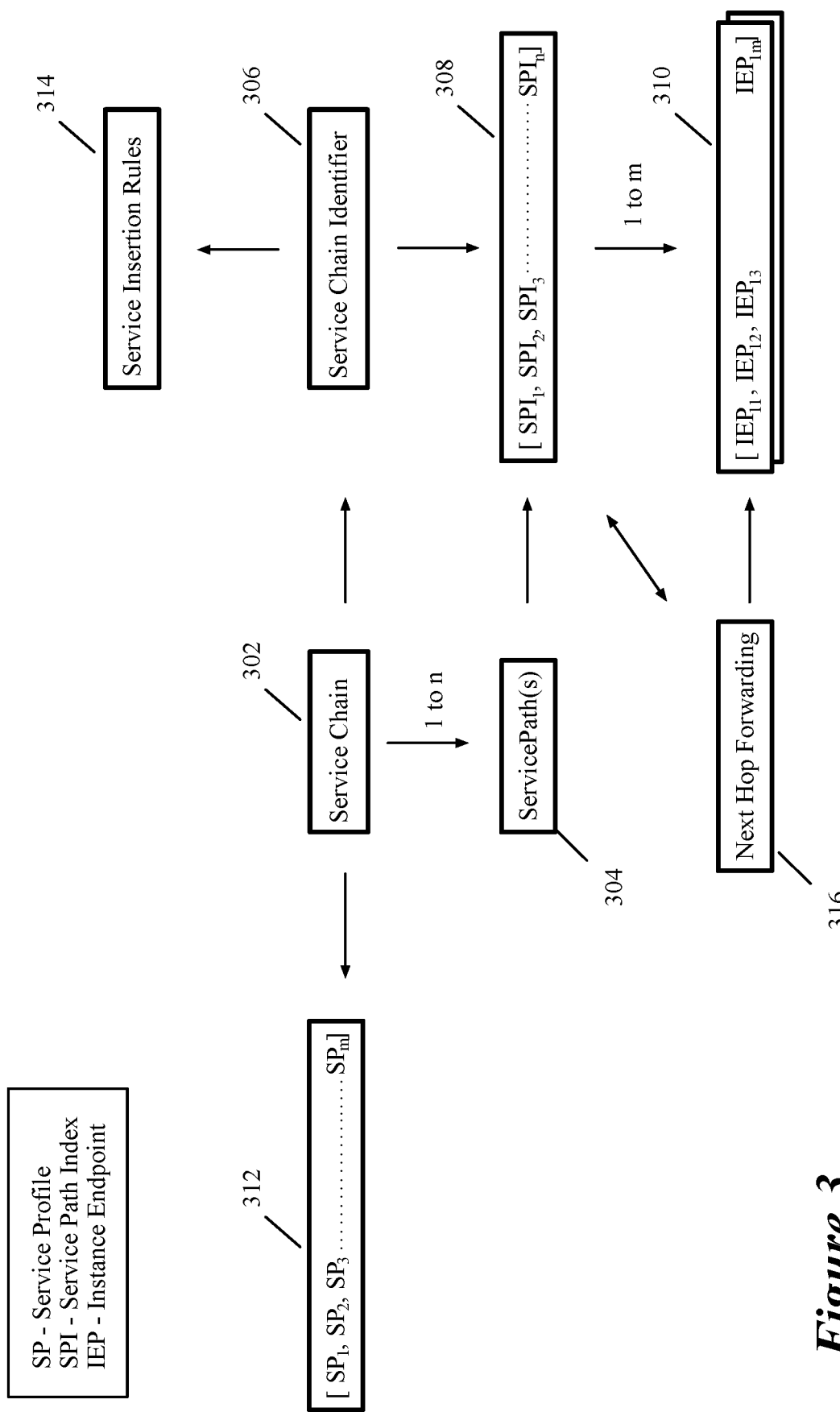
FIG. 3 conceptually illustrates a relationship between a service chain and a set of one or more service paths that implement the service chain in some embodiments.

FIG. 3 presents an object diagram that illustrates the relationship between a service chain 302 and a set of one or more service paths 304 that implement the service chain. Each service chain has a service chain (SC) identifier 306, while each service path has a service path identifier (SPI) 308. Each service path is associated with a set of m service nodes, which, as shown, are identified in terms of service instance endpoints 310. Service instance endpoints in some embodiments are logical locations in the network where traffic can go or come from a service node connected to the service plane. In some embodiments, a service instance endpoint is one LFE port (e.g., an SFE port) associated with a service node (e.g., a VNIC of an SVM). In these or other embodiments, a service instance endpoint can be associated with two LFE ports used for a service node as further described below for embodiments that use GRE encapsulation. Also, the service endpoints in some embodiments are addressable through MAC addresses associated with the LFE ports or with the SVM VNICs associated with (e.g., communicating with these LFE ports).

In some embodiments, each service chain 302 is defined by references to one or more service profiles 312, with each service profile associated with a service operation in the chain. As described below, a service node in some embodiments (1) receives, from a service manager, a mapping of a service chain identifier to a service profile that it has to implement, and (2) receives, with a data message, a service chain identifier that it maps to the service profile to determine the service operation that it has to perform. In some embodiments, the received mapping is not only based on the service chain identifier (SCI) but is also based on a service index value (that specifies the location of the service node in a service path) and a direction through a service chain (that specifies an order for performing the sequence of services specified by the service chain). The service profile in some embodiments describes the service operation that the service node has to perform. In some embodiments, a service profile can identify a set of rules for a service node to examine.

Also, in some embodiments, service insertion rules 314 are defined by reference to service chain identifies 306 for service insertion modules associated with GVMs. Such service insertion modules use these service insertion rules 314 to identify service chains to use to process data messages associated with a source GVM. As mentioned above, the data messages are referred to below as being from a source GVM as the data messages that are processed by the service chains are identified on the egress paths from or ingress paths to the GVMs.

As further described below, the service insertion (SI) rules associate flow identifiers with service chain identifiers. In other words, some embodiments try to match a data message's flow attributes to the flow identifiers (referred to below as rule identifiers of the SI rules) of the service insertion rules, in order to identify a matching service insertion rule (i.e., a rule with a set of flow identifiers that matches the data message's flow attributes) and to assign this matching rule's specified service chain as the service chain of the data message. A specific flow identifier (e.g., one defined by reference to a five-tuple identifier) could identify one specific data message flow, while a more general flow identifier (e.g., one defined by reference to less than the five tuples) can identify a set of several different data message flows that match the more general flow identifier. As such, a matching data message flow is any set of data messages that have a common set of attributes that matches a rule identifier of a service insertion rule.

As further described below, other embodiments use contextual attributes associated with a data message flow to associate the data message with a service insertion rule. Numerous techniques for capturing and using contextual attributes for performing forwarding and service operations are described in U.S. patent application Ser. No. 15/650,251, filed Jul. 14, 2017, now issued as U.S. Pat. No. 10,802,857, which is incorporated herein. Any of these techniques can be used in conjunction with the embodiments described herein.

Next hop forwarding rules 316 in some embodiments are defined by reference to the SPI values 308 and service instance endpoints 310. Specifically, in some embodiments, a service path is selected for a service chain that has been identified for a data message. At each hop, these embodiments use the forwarding rules 314 to identify the next service instance endpoint based on the SPI value for this service path along with a current service index (SI) value, which identifies the location of the hop in the service path. In other words, each forwarding rule in some embodiments has a set of matching criteria defined in terms of the SPI/SI values, and specifies a network address of the next hop service instance endpoint that is associated with these SPI/SI values. To optimize the next hop lookup for the first hop, some embodiments provide to the source GVM's service insertion module the next hop network address with the SPI, as part of a service path selection process.

Figure 4:
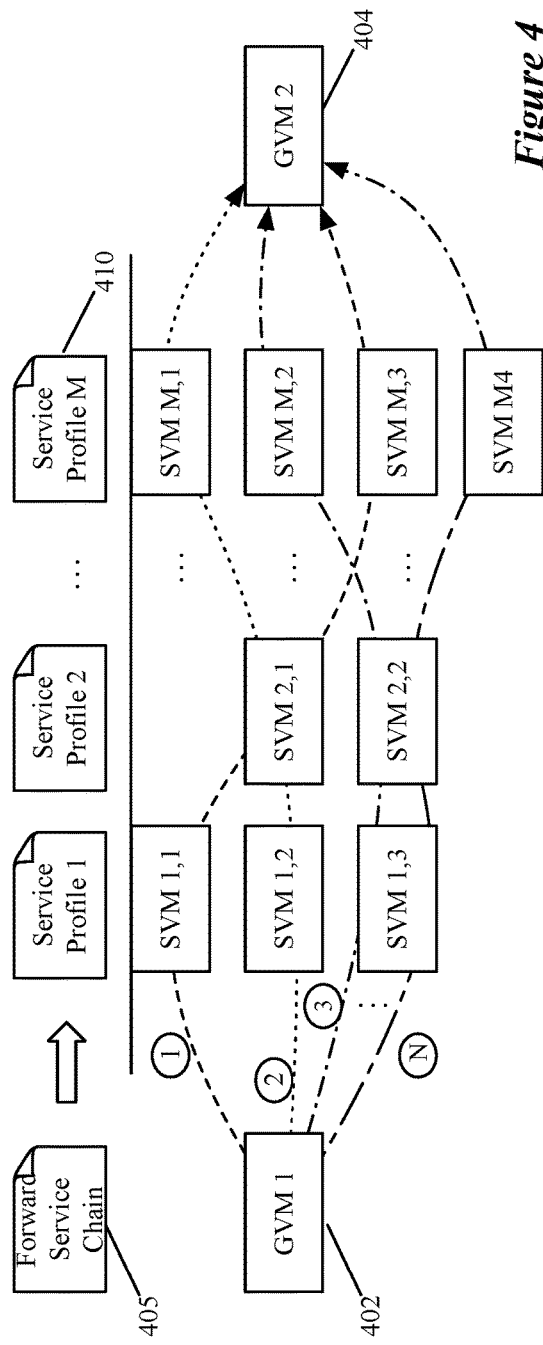
FIG. 4 illustrates an example of a service chain and its associated service paths.

FIG. 4 illustrates an example of a service chain and its associated service path. As shown, each service chain 405 in some embodiments is defined as a sequential list of service profiles 410, with each profile in this example related to a different middlebox service (such as firewall, load balancer, intrusion detector, data message monitor, etc.). Also, in this example, each of the M profiles can be implemented by one SVM in a cluster m of VMs. As shown, different clusters for different profiles can have different numbers of SVMs. Also, in some embodiments, one service profile is implemented by one service node (i.e., a cluster of several service nodes is not required to implement a service profile).

Since multiple SVMs in a cluster can provide a particular service, some embodiments define for a given service chain, multiple service paths through multiple different combinations of SVMs, with one SVM of each cluster being used in each combination. In the example of FIG. 4, there are N service paths associated with the service chain 405, traversed by data messages originating at a GVM 402 on their way to a GVM 404. Each service path is identified by a different set of dashed lines in this figure.

Specifically, the first service path passes through first SVM 1,1 of the first service profile's cluster to implement the first service of the forward service chain 405, the first SVM 2,1 of the second service profile's cluster to implement the second service of the forward service chain 405, and third SVM M,3 of the Mth service profile's cluster to implement the Mth service of the forward service chain 405. The second service path passes through second SVM 1,2 of the first service profile's cluster to implement the first service of the forward service chain 405, the first SVM 2,1 of the second service profile's cluster to implement the second service of the forward service chain 405, and first SVM M,1 of the Mth service profile's cluster to implement the Mth service of the forward service chain 405.

The third service path passes through third SVM 1,3 of the first service profile's cluster to implement the first service of the forward service chain 405, the second SVM 2,2 of the second service profile's cluster to implement the second service of the forward service chain 405, and second SVM M,2 of the Mth service profile's cluster to implement the Mth service of the forward service chain 405. The Nth service path passes through third SVM 1,3 of the first service profile's cluster to implement the first service of the forward service chain 405, the second SVM 2,2 of the second service profile's cluster to implement the second service of the forward service chain 405, and fourth SVM M,4 of the Mth service profile's cluster to implement the Mth service of the forward service chain 405. As the example illustrates, different service paths may use the same SVM for a given service operation. However, regardless of the service path that a given data message traverses, the same set of service operations is performed in the same sequence, for paths that are associated with the same service chain and the same service direction.

In some embodiments, a service chain has to be performed in a forward direction for data messages from a first GVM to a second GVM, and then in the reverse direction for data messages from the second GVM to the first GVM. In some such embodiments, the service plane selects both the service path for the forward direction and the service path for the reverse direction when it processes the first data message in the flow from the first GVM to the second GVM. Also, in some of these embodiments, the forward and reverse service paths are implemented by the same sets of service nodes but in the reverse order.

Figure 5:
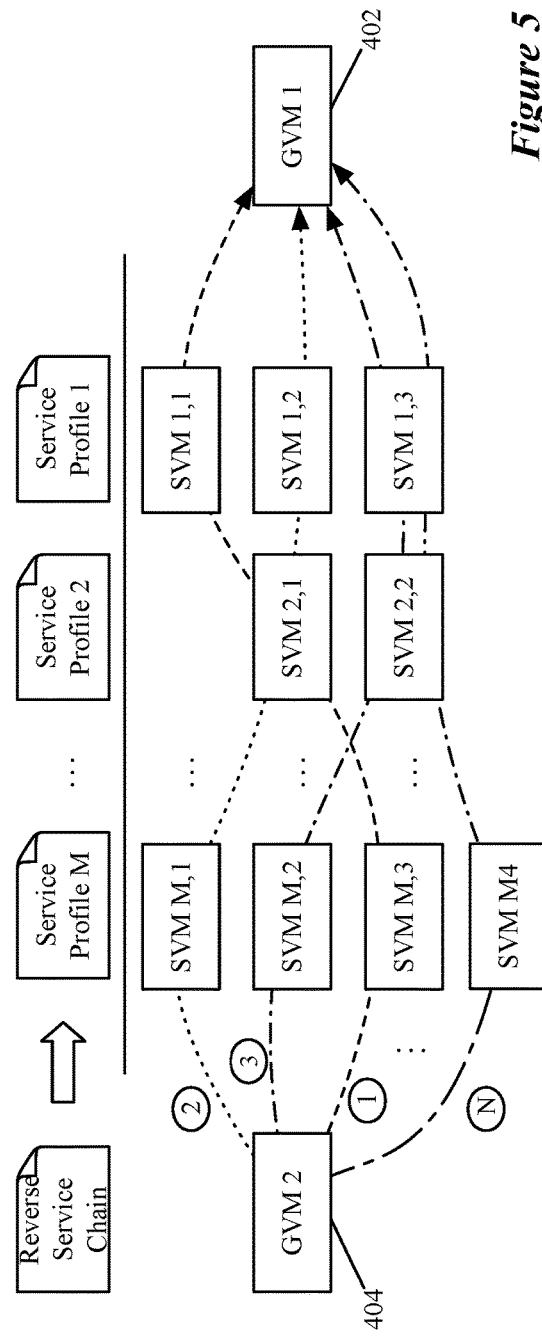
FIG. 5 illustrates examples of reverse service paths for the forward service paths illustrated in FIG. 4.

FIG. 5 illustrates examples of reverse service paths for the forward service paths illustrated in FIG. 4. While the forward service paths are for performing M services on data messages from GVM 402 to GVM 404, the reverse service paths are for performing M services on data messages from GVM 404 to GVM 402. Also, the order of these services is reversed with the service paths in FIG. 5 performing service profiles M to 1, while the service paths in FIG. 4 perform service profile 1 to M.

Also, in the examples of FIGS. 4 and 5, each reverse service path has one corresponding forward service path that is implemented by the same exact set of SVMs but in the reverse order, as indicated by the service path legends and the similar dashed lines in these figures. For example, the forward, second service path passes through SVM 1,2 for the first service associated with the first profile, SVM 2,1 for the second service associated with the second profile, and SVM M,1 for the Mth service associated with the Mth service profile, while the associated reverse, second service path passes through SVM M,1 for the first service associated with the Mth service profile, SVM 2,1 for the second service associated with the second profile, and SVM 1,2 for the second service associated with the first profile.

In some embodiments, the same service nodes are used for the forward and reverse paths because at least one of the service nodes (e.g., a firewall SVM) that implements one of the service profiles needs to see the data traffic in both directions between two data endpoints (e.g., two GYMS). In other embodiments, the same service nodes do not need to be used for both directions of data message flows between two data endpoints so long as the same set of service operations are performed in opposite orders.

Figure 6:
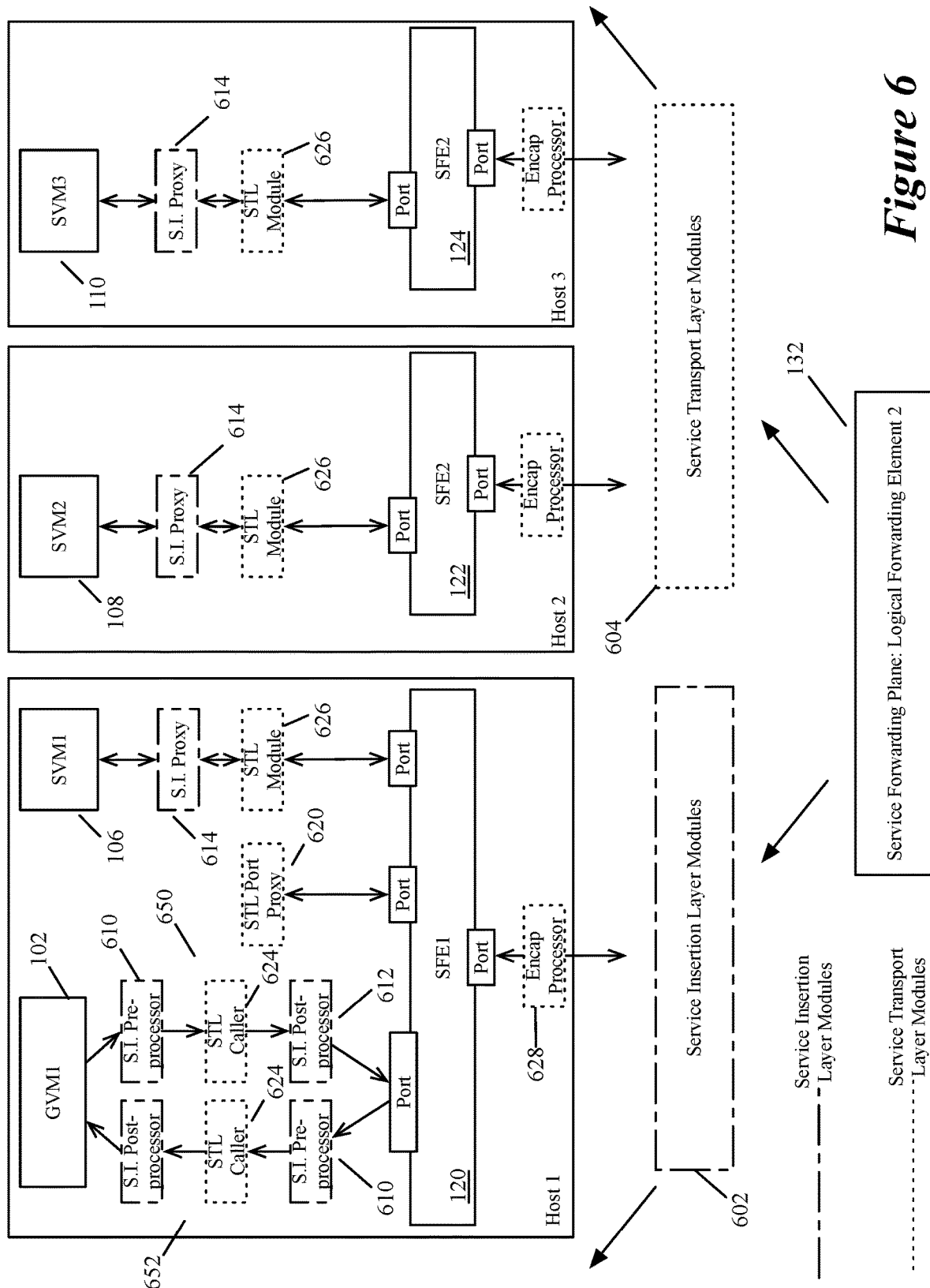
FIG. 6 illustrates an example of input/output (TO) chain components that implement a service plane in some embodiments.

FIG. 6 illustrates an example of the IO chain components that implement the service plane in some embodiments. As shown, the service plane 132 is implemented by software switches 120, 122, and 124 executing on the host computers and two sets of modules 610, 612, 614, 620, 624, 626, and 628 on these computers. The implemented service plane in this example as well some of the other examples illustrated in some of the subsequent figures is an overlay logical L2 service plane. One of ordinary skill will realize that other embodiments are implemented by other types of service planes, such as overlay L3 service planes, or overlay networks with multiple L2 logical switches and one or more logical L3 routers.

In FIG. 6, the software switches 120, 122, and 124 and modules 610, 612, 614, 620, 624, 626, and 628 implement two different layers of the service plane, which are the service insertion layer 602 and the service transport layer 604. The service insertion layer 602 (1) identifies the service chain for a data message, (2) selects the service path to use to perform the service operations of the service chain, (3) identifies the next-hop service nodes at each hop in the selected service path (including the identification of the source host computer to which the data message should be returned upon the completion of the service chain), and (4) for the service path, specifies the service metadata (SMD) header attributes for the data message. The SMD attributes in some embodiments include the network service header (NSH) attributes per RFC (Request for Comments) 8300 of IETF (Internet Engineering Task Force).

The service transport layer 604, on the other hand, formulates the service overlay encapsulation header and encapsulates the data message with this header so that it can pass between service hops. In some embodiments, the service transport layer 604 modifies the SMD header to produce the service overlay encapsulation header. For instance, in some of these embodiments, the overlay encapsulation header is a Geneve header with the SMD attributes stored in a TLV (type, length, value) section of the Geneve header. In other embodiments, the service transport layer 604 adds the service overlay encapsulation header to an SMD header that is first used to encapsulate the data message. Also, when traversing between two hops (e.g., between two service nodes) executing on the same host computer, the service transport layer in several embodiments described below does not encapsulate the data message with an overlay encapsulation header in some embodiments. In other embodiments, even when traversing between two hops on the same host computer, the service transport layer encapsulates the data message with an overlay encapsulation header.

In some embodiments, the service insertion (SI) layer 602 includes an SI pre-processor 610 and an SI post-processor 612, in each the two IO chains 650 and 652 (i.e., the egress IO chain 650 and the ingress IO chain 652) of a GVM for which one or more service chains are defined. The SI layer 602 also includes a service proxy 614 for each service node connected to the service plane (e.g., for each SVM with a VNIC paired with a service plane LFE port). The service transport (ST) layer 604 includes one STL port proxy 620 on each host computer that has one or more possible source GVMs for which one or more service chains are defined. The ST layer 604 also has (1) an STL caller 624 in each IO chain of each source GVM, (2) an STL module 626 in the IO chain of each SVM, and (3) one or more encap processors 628.

For a data message that passes through a GVM's ingress or egress datapath, the SI pre-processor 610 on this datapath performs several operations. It identifies the service chain for the data message and selects the service path for the identified service chain. The pre-processor also identifies the network address for a first hop service node in the selected service path and specifies the SMD attributes for the data message. The SMD attributes include in some embodiments the service chain identifier (SCI), the SPI and SI values, and the direction (e.g., forward or reverse) for processing the service operations of the service chain. In some embodiments, the SPI value identifies the service path while the SI value specifies the number of service nodes.

After the SI pre-processor completes its operation, the STL caller 624 in the same datapath calls the STL port proxy 620 to relay the SMD attributes and first hop's network address that the pre-processor identified, so that the port proxy can forward the SMD attributes through the service plane to the first hop. The port proxy formats the data message for forwarding to the first service node. In some embodiments, this formatting comprises replacing the original source and destination MAC addresses in the data message with a service plane MAC address that is associated with the source GVM 102 and the MAC address of the first hop service node. This formatting also stores a set of attributes for the data message that should be processed by other service transport layer modules (e.g., the other STL modules, etc.) on the same host computer. These data message attributes include the SMD attributes as well as the original source and destination MAC addresses.

The STL port proxy 620 passes the formatted data message along with its stored attributes to the software switch 120. Based on the destination MAC address (i.e., the first hop MAC address) of the formatted data message, the software switch delivers the data message to the switch port associated with the first hop SVM. When the first hop is on the same host computer as the port proxy 620, the data message is provided to the STL module 626 in the ingress IO chain of the first hop's service node on the same host computer. When the first hop is not on the same host computer, the data message is encapsulated with an encapsulating header and forwarded to the next hop, as further described below.

Each hop's STL module 626 re-formats the data message by replacing the service plane source MAC address and service plane destination MAC address (i.e., its service node's MAC address) with the original source and destination MAC addresses of the data message. It then passes this re-formatted data message with its accompanying SMD attributes to its hop's service proxy 614. This service proxy is in the IO chain of the ingress datapath of the GVM. For purposes of preventing the illustration in FIG. 6 from being overcomplicated with unnecessary detail, the ingress and egress paths of each SVM in this example are combined in this figure, unlike the ingress and egress paths 650 and 652 of the GVM 102.

The service proxy 614 encapsulates the received data message with an encapsulating NSH header that stores the data message's SMD attributes and provides this encapsulated data message to its service node when the service node can support NSH headers. When the service node is an SVM, the service proxy in some embodiments supplies the data messages and its NSH header to the SVM's VNIC through a VNIC injection process, as further described below. When the service node cannot process NSH headers, the service proxy 614 stores the SMD attributes into a legacy QinQ encapsulating header or a GRE encapsulating header, and then passes the encapsulated data message to the VNIC of the SVM. These headers will be further described below.

In some embodiments, the service proxy 614 of each service hop segregates the service node for that hop from the service transport layer. This segregation improves the security of both the SVM and the service transport layer. It also allows the service proxy to ensure that the data messages that are provided to its SVM are formatted properly, which is especially important for legacy SVMs that do not support the newer NSH format.

The service proxy 614 in some embodiments also performs liveness detection signaling with its service node to ensure that the service node is operational. In some embodiments, the service proxy sends a data message with a liveness value to its service node at least once in each recurring time period. To do this, the service proxy sets and resets a timer to ensure that it has sent a liveness signal for each time period to its service node. Each liveness value is accompanied with a liveness sequence number to allow the service proxy to keep track of liveness responses provided by the SVM. Each time the service node replies to a liveness signal, it provides to the service proxy the same liveness value in a responsive data message in some embodiments or its corresponding value in the responsive data message in other embodiments. Also, with each liveness responsive data message, the service node provides the same sequence number in some embodiments, or an incremented version of the sequence number provided by the service proxy in other embodiments.

As further described below, the service proxy of some embodiments piggybacks some of its liveness detection signaling on each data message that it passes to its service node from the service forwarding plane. Each time that the service proxy sends a liveness signal to its service node, it resets its liveness timer. Each time the service node processes the data message, it provides the processed data message back to the service node with the responsive liveness value and associated sequence number (incremented in some embodiments, or non-incremented in other embodiments, as mentioned above).

In some embodiments, the service proxy registers a liveness detection failure when the service node does not respond to its liveness signal within a particular time (e.g., within 0.3 seconds). After registering two successive liveness detection failures, the service proxy in some embodiments notifies a local control plane (LCP) module executing on its host the SVM has failed so that the LCP can notify a central control plane (CCP) server. In response to such a notification, the CCP removes the SVM and the service paths on which SVM resides from the forwarding and path selection rules in the data plane, and if needed, generates additional service paths for the failed SVM's associated service chain. Also, in some embodiments, the service proxy sends an in-band data message back to the source GVM to program its classifier to not select the service path on which the failed service node resides.

In some embodiments, the service proxy also performs flow programming at the behest of its service node. This flow programming in some embodiments involves modifying how the source GVM's IO chain selects service chains, service paths, and/or forwards data message flows along service paths. In other embodiments, this flow programming involves other modifications to how a data message flow is processed by the service plane. Flow programming will be further described below.

Upon receiving a data message and its SMD attributes (in an encapsulating NSH header or some other encapsulating header), the SVM performs its service operation. In some embodiments, the SVM uses mapping records that it receives from its service manager to map the SCI, SI and direction values in the SMD attributes to a service profile, and then maps this service profile to one of its rule sets, which it then examines to identify one or more service rules to process. In some embodiments, each service rule has a rule identifier that is defined in terms of data message attributes (e.g., five tuple attributes, which are the source and destination IP address, source and destination port addresses and the protocol). The SVM in some embodiments compares the rule's identifier with the attributes of the data message to identify a matching rule. Upon identifying one or more matching rules, the SVM in some embodiments performs an action specified by the highest priority matching rule. For instance, a firewall SVM might specify that the data message should be allowed to pass, should be dropped and/or should be redirected.

Once the SVM has completed its service operation, the SVM forwards the data message along its egress datapath. The service proxy in the egress datapath's IO chain then captures this data message and for this data message, identifies the network address of the next hop in the service path. To do this, the service proxy in some embodiments decrements the SI value, and then uses this decremented value along with the SPI value in the data message's stored attribute set to identify an exact match forwarding rule that identifies a next hop network address. In some embodiments, the SVM can decrement the SI value. For such cases, the service proxy in some embodiments can be configured not to decrement the SI value when its corresponding SVM decremented it.

In either configuration, the service proxy identifies the next hop network address by using the appropriate SPI/SI values to identify the next-hop forwarding rule applicable to the data message. When the proxy's service node is on multiple service paths, the proxy's forwarding rule storage stores multiple exact match forwarding rules that can specify different next hop network addresses for different SPI/SI values associated with different service paths. Assuming that the decremented SI value is not zero, the next hop in the service path is another service node. Hence, the proxy in some embodiments provides the next hop's MAC address to the proxy's associated STL module 626 in the SVM's egress datapath. This module then re-formats the data message, by specifying the SVM's MAC address and the next hop's MAC address as the source and destination MAC addresses and storing the original source and destination MAC addresses of the data message in the stored set of attributes stored for the data message. The STL module 626 then forward the data message along the egress path, where it reaches the software switch, which then has to forward the data message and its stored attributes to the next hop service node.

When the next hop is on the same host computer, the software switch passes the data message and its attributes to the port that connects to the STL module of the next hop's service node, as described above. On the other hand, when the next hop service node is on another host computer, the software switch provides data message to the uplink port that connects to the VTEP (VXLAN Tunnel Endpoint) that communicates through an overlay network tunnel with a VTEP on the other host computer. An encap processor 628 then captures this data message along the egress path of this port, defines an encapsulating overlay header for this data message and encapsulates the data message with this overlay header. In some embodiments, the overlay header is a single header that stores both SMD and STL attributes. For instance, in some embodiments, the overlay header is a Geneve header that stores the SMD and STL attributes in one or more TLVs.

As mentioned above, the SMD attributes in some embodiments include the SCI value, the SPI value, the SI value, and the service direction. Also, in some embodiments, the STL attributes includes the original L2 source MAC address, the original L2 destination MAC address, the data message direction, and the service-plane source MAC address of the source GVM. In some embodiments, the service direction and the service-plane source MAC address are already part of the SMD attributes. The service transport layer in some embodiments needs these attributes with each processed data message, in order to recreate the original data message and later at the end of the service-path, to return the data message to the original host to resume along its datapath.

When the encapsulated data message is received at the next hop's host computer, the data message is captured by the encap processor 628 of the software switch's downlink port that connects to the VTEP that received the data message from the prior hop's VTEP. This encap processor removes the encapsulation header from the data message and stores the STL and SMD attributes as the set of attributes of the data message. It then passes the decapsulated message to the downlink port, which then passes it to the software switch to forward to the next hop's switch port. From there the data message is processed by the STL module and service proxy before reaching the service node, as described above.

When the service proxy determines that the decremented SI value is zero, the service proxy matches the decremented SI value and the embedded SPI value with a rule that directs the service proxy to identify the next hop as the service plane MAC address of the source GVM. In some embodiments, this determination is not specified by a forwarding entry of a forwarding table, but rather is hard coded into the logic of the service proxy. Hence, when the SI value is zero, the proxy provides the source GVM's service plane MAC address to its associated STL module 626 to use to forward the data message back to the GVM's host computer. The STL module then defines the message's destination MAC (DMAC) address as the source GVM's service plane MAC address while defining the message's source MAC (SMAC) address as the service plane MAC address associated with its service node (e.g., the service plane MAC of the software switch's port associated with the service node). It also stores the original SMAC and DMAC of the data message in the attribute set of the data message.

The STL module then passes the formatted data message and its attributes along the egress path, where it reaches it associated software switch port. The software switch then passes this message to its uplink port. The encap processor 628 of this port then captures this data message, defines an encapsulating overlay header for this data message and encapsulates the data message with this overlay header. As mentioned above, this overlay header is a Geneve header that stores the SMD and STL attributes in one or more TLVs. This encapsulated data message then traverses the overlay network to reach the source GVM's host computer, where this data message is decapsulated by the downlink port's encap processor, and is then provided to the software switch, which then forwards it to the port proxy.

Once the port proxy 620 receives the decapsulated data message, it identifies the GVM associated with this data message from the original source MAC address that is now part of the decapsulated data message's stored attributes. In some embodiments, the port proxy has a record that maps the original source MAC address and service direction in the SMD attributes of a received data to a GVM on its host (e.g., to a software switch port associated with a guest forwarding plane and a GVM on its host). The port proxy then formats the data message to include its original SMAC and DMAC and provides the data message back to the source GVM's IO chain. The SI post-processor 612 in this IO chain then processes this data message, before returning this data message to the egress datapath of the GVM. The operations of this post-processor will be further described below.

One of ordinary skill will realize that the service insertion layer and service transport layer in other embodiments are implemented differently than the exemplary implementations described above. For instance, instead of using an L2 overlay (L2 transport layer) that relies on MAC addresses to traverse the different service hops, other embodiments use an L3 overlay (L3 transport layer) that uses L3 and/or L4 network addresses to identify successive service hops. Also, the above-described service insertion and/or transport modules can be configured to operate differently.

Figure 7:
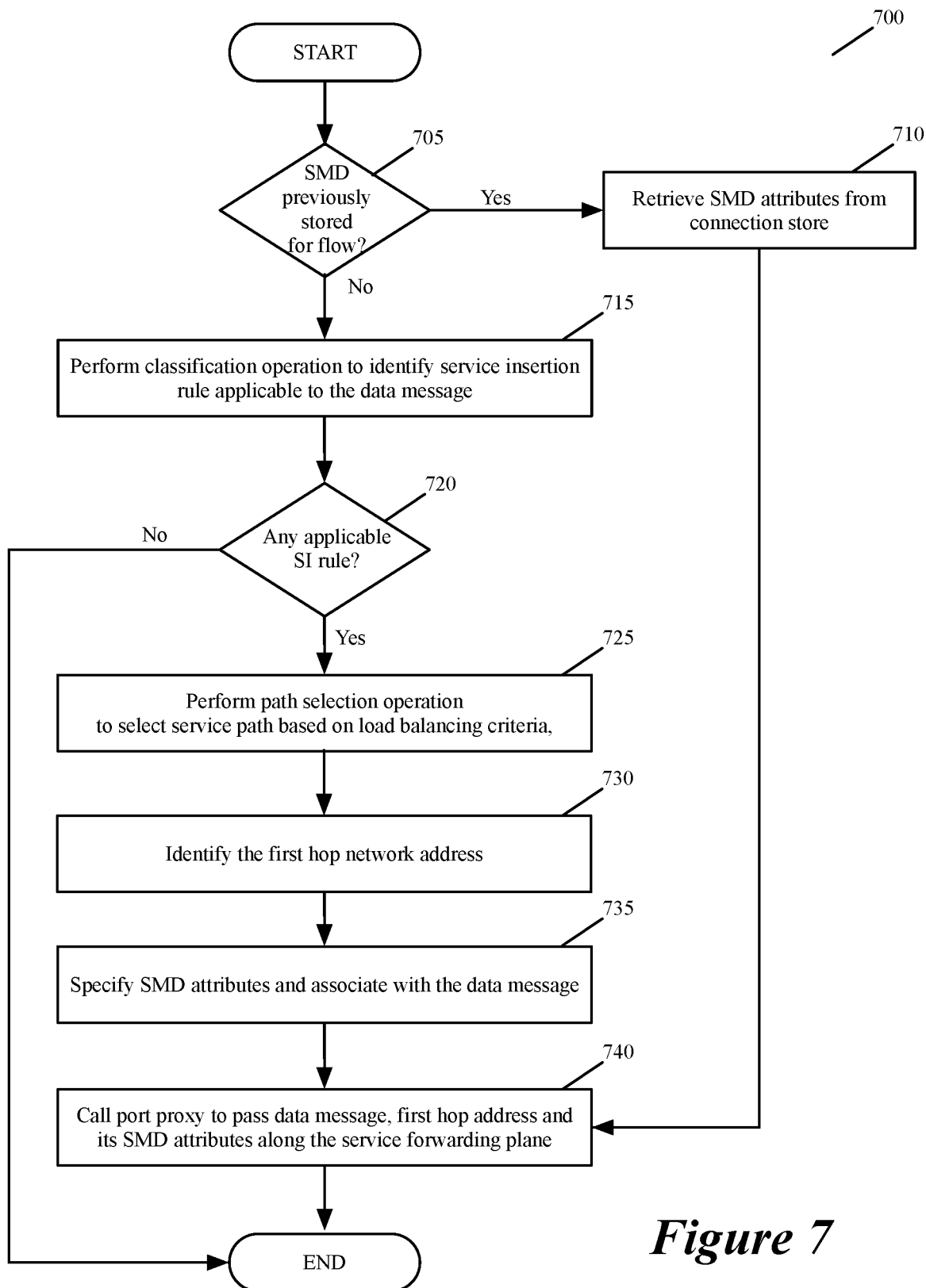
FIG. 7 illustrates a process performed by a service index pre-processor and a service transport layer caller of some embodiments

A more detailed example of the operations of the service insertion and service transport layers will now be described by reference to FIGS. 7-19. FIG. 7 illustrates a process 700 performed by the SI pre-processor 610 and STL caller 624 of some embodiments. This process is described below by reference to the data flow example illustrated in FIG. 8. The process 700 starts when the SI pre-processor 610 is called to analyze a data message that is sent along the ingress or egress datapath of a GVM.

As shown, the process 700 initially determines (at 705) whether the pre-processor 610 has previously selected a service chain and a service path for the data message's flow and stored the SMD attributes for the selected service chain and path. In some embodiments, the process 700 makes this determination by using the data message's attributes (e.g., its five tuple attributes) to try to identify a record for the message's flow in a connection tracker that stores records of message flows for which service chains and paths were previously selected, and SMD attributes were previously stored for these chains and paths in the connection tracker records.

Figure 8:
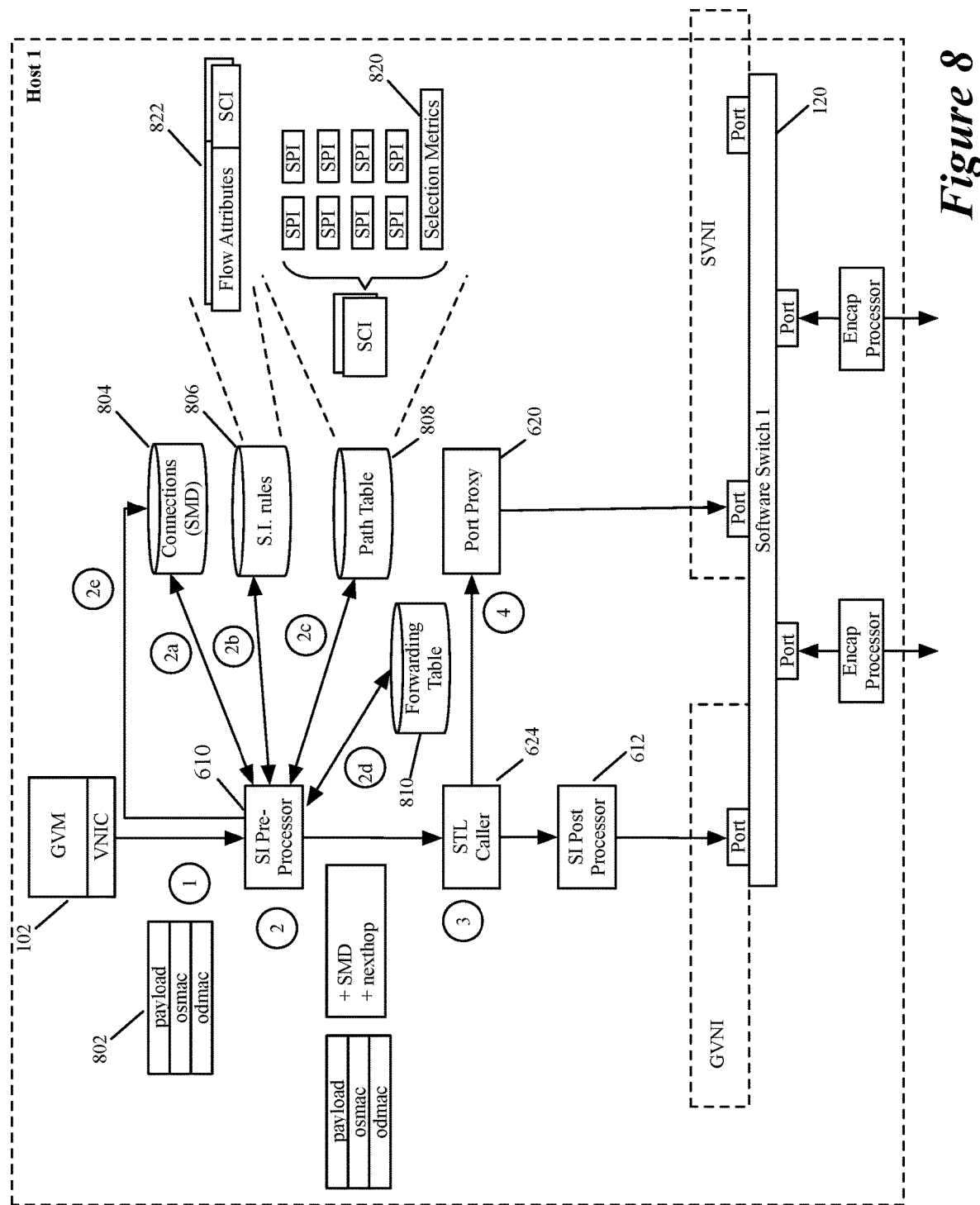
FIG. 8 illustrates a data flow example corresponding to the process described in FIG. 7.

FIG. 8 illustrates the pre-processor 610 receiving a data message 802 along the egress datapath of the GVM 102. It also shows the pre-processor initially checking a connection tracking storage 804 to try to find a connection record that has a flow identifier (e.g., a five-tuple identifier) that matches a set of attributes (e.g., five tuple attributes) of the received data message. In this example, the pre-processor 610 cannot find such a connection record as the received data message is the first data message for its flow.

When the process 700 determines (at 705) that the connection storage 804 has a connection record that matches the received data message, the process retrieves (at 710) the SMD attributes from this record, or from another record referenced by the matching connection record. The SMD attributes in some embodiments include the SCI, SPI, SI and direction values. From 710, the process transitions to 740, which will be described below.

On the other hand, when the process 700 determines (at 705) that the connection storage 804 does not have a connection record that matches the received data message, the process performs (at 715) a classification operation that tries to match the data message to a service insertion rule in a SI rule storage, which is illustrated in FIG. 8 as storage 806. In some embodiments, the SI rule storage 806 stores service insertion rules 822 that have rule identifiers defined in terms of one or more data message flow attributes (e.g., one or more of the five tuple attributes or portions thereof). Each service rule also specifies a SCI that identifies a service chain that is applicable to data message flows that match the rule identifier of the service rule.

At 720, the process determines whether the classification operation matches the data message's attributes to the rule identifier of a service insertion rule that requires a service chain to be performed on the data message. When the classification operation does not identify a service insertion rule that requires a service chain to be performed on the data message, the process 700 ends. In some embodiments, the SI rule storage 806 has a default low priority rule that matches any data message when the data message's attributes do not match any higher priority SI rule, and this default low priority rule specifies that no service chain has been defined for the data message's flow. No service chain is defined for a data message flow in some embodiments when no service operations needs to be performed on the data message flow.

On the other hand, when the classification operation matches the data message's attributes to the rule identifier of a service insertion rule that requires a service chain to be performed on the data message, the process 700 performs (725) a path selection operation to select a service path for the service chain specified by the service insertion rule identified at 715. As shown in FIG. 8, the pre-processor 610 performs a path-selection operation by examining a path storage table 808 that identifies one or more service paths for each service chain identifier.

Each service path is specified in terms of its SPI value. When multiple service paths are specified for a service chain, the path storage 808 stores for each service chain a set of selection metrics 820 for selecting one SPI from the available SPIs. Different embodiments use different selection metrics. For instance, some embodiments use a selection metric that costs a service path based on the number of hosts on which the service nodes of the service path execute. In other embodiments, these selection metrics are weight values that allow the pre-processor to select SPIs for a service chain in a load balanced manner that is dictated by these weight values. For instance, in some embodiments, these weight values are generated by a central control plane based on the load on each of the service nodes in the service path and/or based on other costs (such as number of hosts traversed by the service path, etc.).

In some of these embodiments, the pre-processor maintains a record of previous selections that it has made for a particular service chain, and selects subsequent service paths based on these previous selections. For example, for four service paths, the weight values might be 1, 2, 2, 1, which specify that on six successive SPI selections for a service chain, the first SPI should be selected once, the second and third SPIs should then be selected twice each, and the fourth SPI should be selected one. The next SPI selection for this service chain will then select the first SPI, as the selection mechanism is round robin.

In other embodiments, the weight values are associated with a numerical range (e.g., a range of hash values) and a number is randomly or deterministically generated for each data message flow to map the data message flow to a numerical range and thereby to its associated SPI. In still other embodiments, the hosts LCP selects one service path for each service chain identifier from the pool of available service paths, and hence stores just one SPI for each SCI in the path table 808. The LCP in these embodiments selects the service path for each service chain based on costs (such as the number of hosts traversed by each service path and/or the load on the service nodes of the service paths).

After identifying a service path for the identified service chain, the process 700 next identifies (at 730) the network address for the first hop of the selected service path. In some embodiments, the MAC address for this hop is stored in the same record as the selected path's SPI. Hence, in these embodiments, this MAC address is retrieved from the path selection storage 808 with the selected SPI. In other embodiments, the pre-processor retrieves the first hop's MAC address from an exact match forwarding table 810 that stores next hop network addresses for associated pairs of SPI/SI values, as shown in FIG. 8. In some embodiments, the initial SI values for the service chains are stored in the SI rules of the SI rule storage 806, while in other embodiments, these initial SI values are stored with the SPI values in that path table 808.

At 735, the process 700 specifies the SMD attributes for the data message, and associates these attributes with the data message. As mentioned above, the SMD attributes include in some embodiments the SCI, the SPI, SI and direction values. The service directions for service paths are stored with the SPI values in the path table 808 as the directions through the service chains are dependent on the service paths. Also, as mentioned below, a service chain in some embodiments has to be performed in a forward direction for data messages from a first GVM to a second GVM, and then in the reverse direction for data messages from the second GVM to the first GVM. For such service chains, the pre-processor 610 selects both the service path for the forward direction and the service path for the reverse direction when it processes the first data message in the flow from the first GVM to the second GVM.

After the SI pre-processor completes its operation, the STL caller 624 in the same datapath calls (at 740) the STL port proxy 620 to relay the SMD attributes and first hop's network address that the pre-processor identified, so that the port proxy can forward the SMD attributes through the service plane to the first hop. The operation of the port proxy 620 as well as other modules in the service insertion layers and service transport layers will be described by reference to FIGS. 9-19. These figures describe an example of processing the data message from GVM 102 through a service path that includes the SVM 106, then SVM 108 and then SVM 110.

In these figures, each GVM is a compute machine of a tenant in a multi-tenant datacenter, and connects to the software switch through a switch port that is associated with a guest VNI (GVNI) of the tenant. Also, in these figures, each SVM is a service machine for processing the GVM message traffic, and connects to the software switch through a switch port that is associated with a service VNI (SVNI) of the tenant. As mentioned above and further described below, some embodiments use the GVNI for performing the guest logical forwarding operations (i.e., for establishing a guest logical forwarding element, e.g., a logical switch or router, or a guest logical network) for the tenant, while using the SVNI for performing the service logical forwarding operations for the tenant (i.e., for establishing a service logical forwarding element, e.g., a logical switch or router, or a service logical network).

Both of these logical network identifiers (i.e., the GVNI and SVNI) are generated for the tenant by the management or control plane in some embodiments. The management or control plane of some embodiments generates different GVNIs and SVNIs for different tenants such that no two tenants have the same GVNI or SVNI. In some embodiments, each SVM is dedicated to one tenant, while in other embodiments, an SVM can be used by multiple tenants. In the multi-tenant situation, each SVM can connect to different ports of different service planes (e.g., different logical switches) for different tenants.

Figure 9:
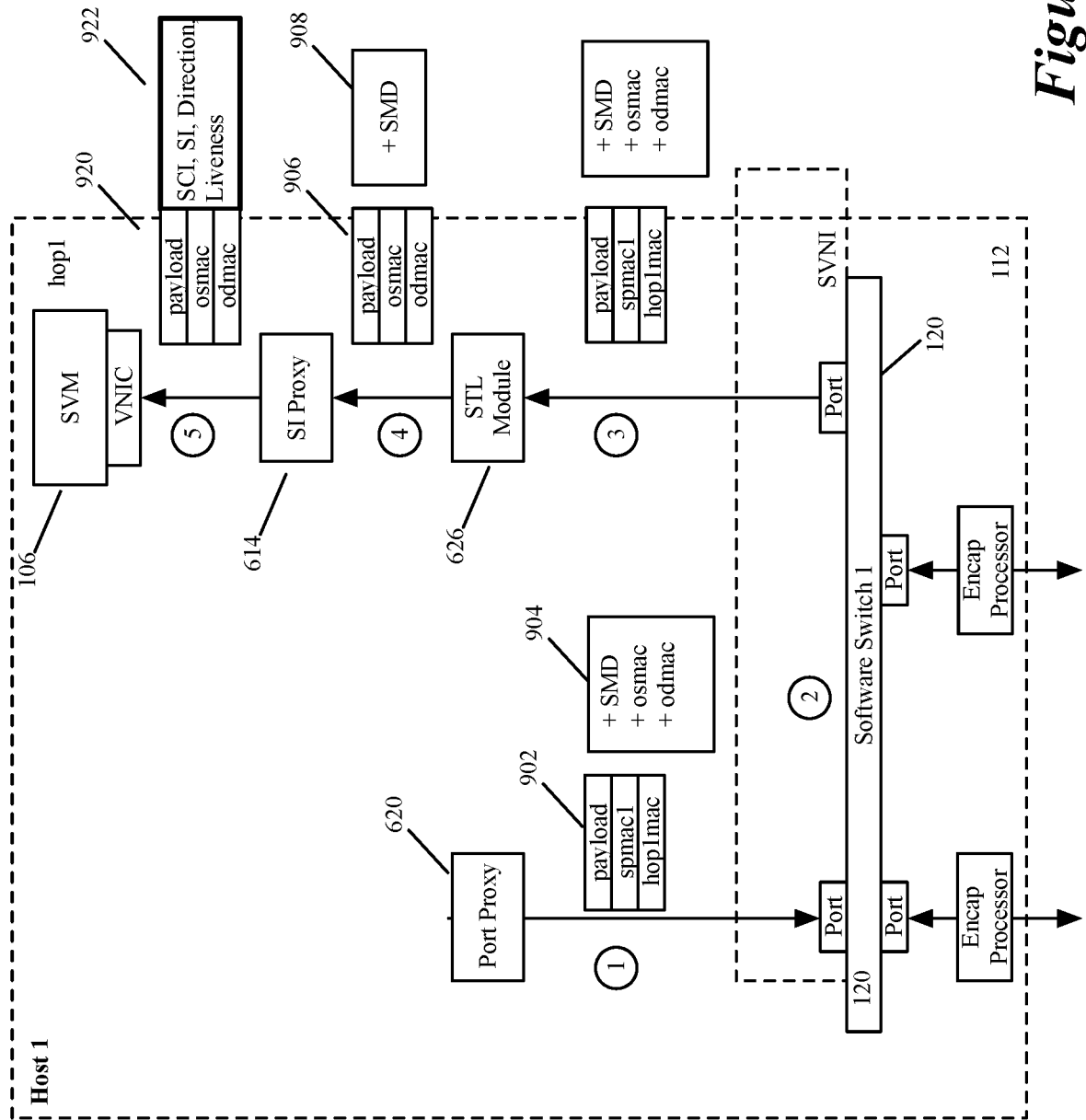
FIG. 9 illustrates an operation of a port proxy of some embodiments for formatting a data message for forwarding by a first service node.

As shown in FIG. 9, the port proxy 620 formats the data message for forwarding to the first service node, by replacing the original source and destination MAC addresses in the data message with a service plane MAC address that is associated with the source GVM 102 and the MAC address of the first hop service node. This operation is depicted as operation 1005 in the process 1000 of FIG. 10. This process 1000 is a process that the port proxy 620 or STL module 626 starts whenever an SI module (such as an SI pre-processor 610 or a SI proxy 614) is done processing a data message.

In this process 1000, the port proxy also adds (at 1010) the original source and destination MAC addresses of the data message to the set of attributes for the data message that should be processed by other service transport layer modules (e.g., the vswitch, other STL modules, the encap processor, etc.) on the same host computer. The reformatted data message 902 and the augmented attributed set 904 are depicted in FIG. 9.

After reformatting the data message and augmenting its attribute set, the port proxy 620 passes (at 1015) the formatted data message along with its stored attribute set along its egress path where it reaches the software switch 120. Based on the destination MAC address (e.g, the first hop MAC address) of the formatted data message, the software switch determines (at 1020) whether the next hop's port is local. This is the case for the example illustrated in FIG. 9. Hence, the software switch delivers (at 1025) the data message to the switch port associated with the first hop SVM 106. This port then sends the data message along the SVM's ingress path, where the data message 902 and its augmented attribute set 904 is identified by the STL module 626 through a function call of the ingress IO chain of the first hop's SVM, as shown in FIG. 9.

This STL module 626 then re-formats (at 1030) the data message by replacing the GVM's service plane MAC address and the first hop MAC address (i.e., the MAC address of SVM 106) with the original source and destination MAC addresses of the data message, which it retrieves from the augmented attribute set 904. In retrieving the original SMAC and DMAC addresses, the STL module 626 modifies the data message's attribute set. The reformatted data message 906 and the modified attributed set 908 are depicted in FIG. 9. The STL module then passes this re-formatted data message with its accompanying SMD attributes along the SVM's ingress path, where it is next processed by this hop's ingress service proxy 614.

Figure 11:
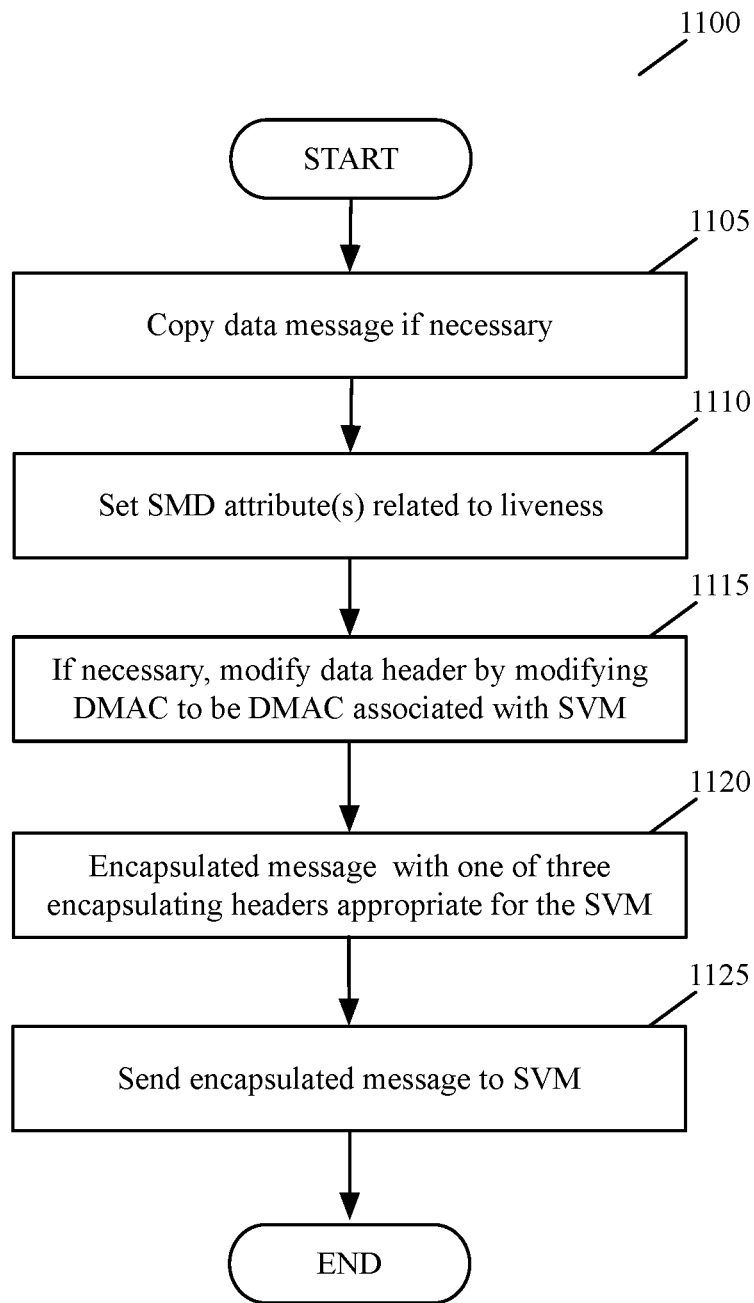
FIG. 11 illustrates a process that the service proxy of FIG. 6 performs in some embodiments each time it receives a data message traversing along an ingress path of a service node.

FIG. 11 illustrates a process 1100 that the service proxy 614 performs in some embodiments each time it receives a data message traversing along the ingress path of a service node. As shown, the service proxy initially makes (at 1105) a copy of the data message if necessary. For instance, in some embodiments, the service node only needs to receive a copy of the data message to perform its operations. One example of such a service node would a monitoring SVM that needs to obtain a data message copy for its message monitoring or mirroring operation.

In these embodiments, the service proxy copies the data messages and performs the remaining operations 1110-1125 with respect to this copy, while passing the original data message to the next service hop or back to the source GVM. To forward the original data message to the next service hop or back to the GVM, the service proxy has to perform a next-hop lookup based on the SPI/SI values and then provide the next-hop address (e.g., the next service hop's address or the service plane MAC of the source GVM) to the STL module to forward. These look up and forwarding operations are similar to those described below by reference to FIGS. 15-17.

Next, at 1110, the service proxy sets a liveness attribute in the stored SMD attribute set of the data message (which, in some embodiments, might be the data message copy at this point). This liveness attribute is a value that directs the service node to provide a responsive liveness value (the same value or related value) with the data message once it has processed the data message. With this liveness attribute, the service proxy also provides a sequence number, which the service node has to return, or increment and then return, with the responsive liveness value, as described above.

At 1115, the service proxy formats the data message, if necessary, to put it in a form that can be processed by the service node. For instance, when the service node does not know the current next hop MAC that is set as the destination MAC of the data message, the service proxy changes the destination MAC of the message to a destination MAC associated with the service node.

After formatting the data message to sanitize it for forwarding to the service node, the service proxy 614 encapsulates (at 1120) the data message with one of three encapsulation headers that it can be configured to use, and passes (at 1125) the encapsulated message along the service node's ingress path so that it can be forwarded to the service node. FIG. 9 illustrates the encapsulated data message 920 passing from the service proxy to the SVM 106 with a native NSH encapsulation header. As shown, the encapsulating header 922 includes the service chain identifier, the service index, service chain direction and liveness signal.

Figure 12:
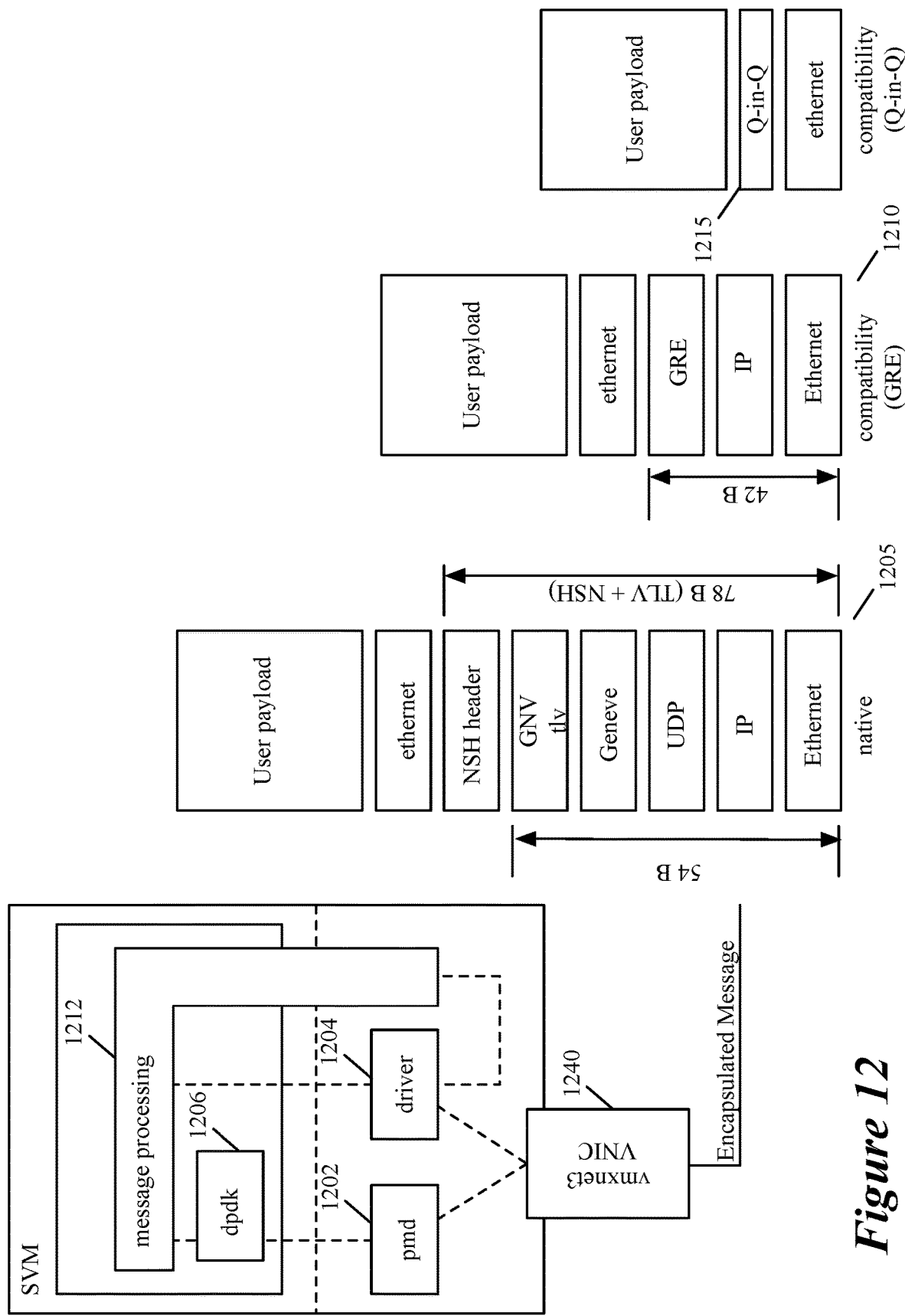
FIG. 12 conceptually illustrates three encapsulation headers of a data message of some embodiments.

FIG. 12 illustrates the three encapsulation headers of some embodiments, which are (1) a native NSH encapsulation header 1205 for a service node that support NSH, (2) a GRE encapsulation header 1210 for a legacy service node that does not support NSH, and (3) a QinQ encapsulation header 1215 for a legacy service node that does not support NSH. The native NSH header stores the service metadata in a format that is described below by reference to FIGS. 21 and 22. The GRE header format will be described further below by reference to FIG. 25-26. In both the GRE and QinQ formats a portion of the service metadata is stored in the GRE and QinQ header fields, but the service metadata cannot be stored as richly as it is stored in the native NSH header. The QinQ header is used for simple legacy service nodes that do not need much service metadata, e.g., just need service chain identifier and service direction, or service chain identifier and service index. This service metadata is stored in the VLAN header field of the QinQ header.

In addition to the three different types of encapsulating headers 1205, 1210 and 1215, FIG. 12 also illustrates a vmxnet3 paravirtualized NIC 1240 of an SVM of some embodiments. As shown, this NIC can provide the encapsulated data message to a poll mode driver 1202 of a DPDK driver 1204 of the SVM, or to an interrupt mode driver 1204. Specifically, the vmxnet3 paravirtualized NIC can be configured to operate in different modes of operation depending on which driver is used inside the SVM. The poll mode driver 1202 can be viewed as the back end of the DPDK (data plane development kit) driver 1206. The poll mode driver regularly polls the VNIC for data messages to retrieve, while the VNIC generates interrupts to cause the interrupt-based driver 1204 to retrieve the data messages.

The poll mode driver passes a data message to the DPDK driver 1206, which then passes it to the message processing module in the user space when a flow is initially received. The interrupt-based driver 1204, on the other hand, provides the data message to the message processing module 1212 either in the kernel or in the user space. The message processing module of the SVM then decapsulates the encapsulated data message and performs the service operation of the SVM. In some embodiments, different SVMs perform different service operations based on the SCI, SI and service direction values that they receive with a data message.

Figure 13:
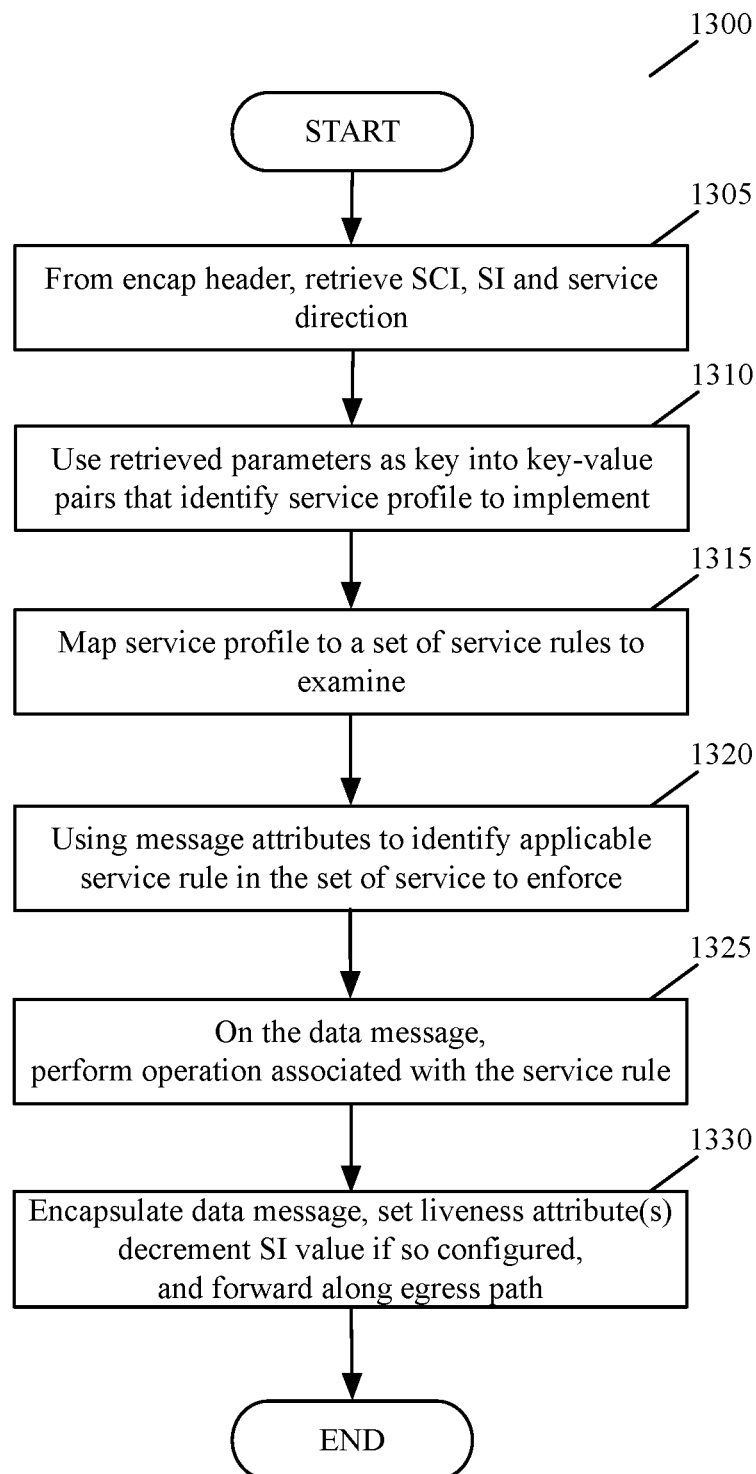
FIG. 13 conceptually illustrates one exemplary process that an SVM performs in some embodiments each time it receives a data message to process from a service proxy.

FIG. 13 illustrates one exemplary process 1300 that an SVM performs in some embodiments each time it receives a data message to process from a service proxy. In other embodiments, an SVM can use the SCI, SI and service direction values differently to perform its operations. As shown, the process 100 initially (at 1305) removes the encapsulating header and from it retrieves the SCI, SI, direction and liveness parameters. The process then uses (at 1310) mapping records that it receives from its service manager to map the SCI, SI and direction values to a service profile, and then maps (at 1315) this service profile to one of its rule sets, which it then examines to identify (at 1320) one or more service rules to process.

Figure 14:
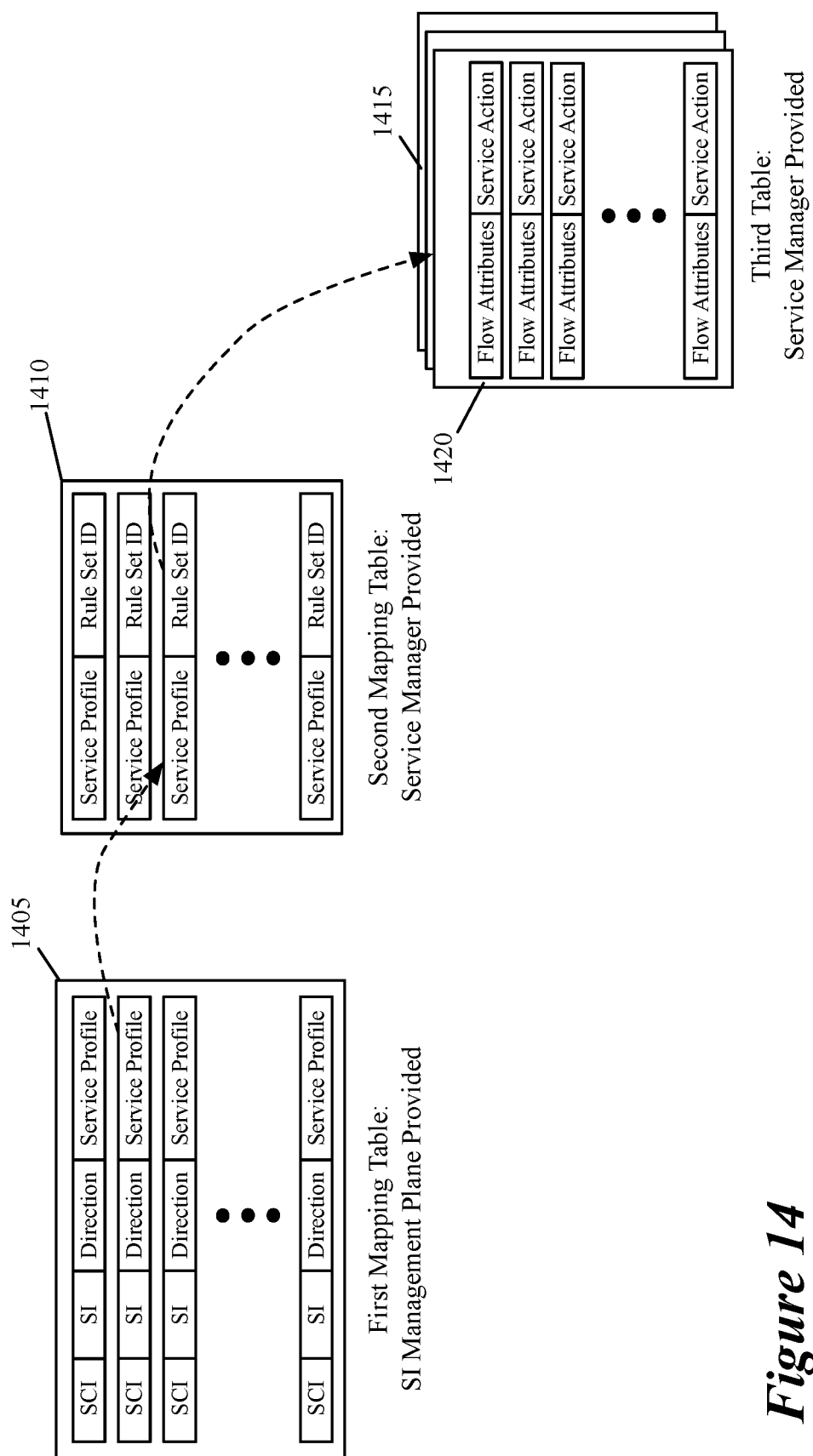
FIG. 14 illustrates a first mapping table of an SVM of some embodiments.

FIG. 14 shows a first mapping table 1405 of the SVM. As shown, each record in this table maps the SCI, SI and direction values to a service profile. This figure also shows a second mapping table 1410 of the SVM, and this table maps a service profile to a rule set identifier that identifies several rules in a service rule table 1415. As indicated in FIG. 14, a service insertion manager in some embodiments provides the records of the first table 1405 (e.g., an SI network manager provides these records to a service manager of the SVM, which then provides them to the SVM), while the service manager of the SVM provides the records for the second and third tables 1410 and 1415. In some embodiments, these two service managers are two different management planes administered by two different entities, e.g., a datacenter administrator and a third-party administrator, or a tenant administrator and a datacenter administrator.

In some embodiments, each service rule 1420 in the service rule table 145 has a rule identifier that is defined in terms of data message attributes (e.g., five tuple attributes). The SVM compares (at 1320) a rule's identifier to the attributes of the data message to identify a matching rule. Upon identifying one or more matching rules, the SVM in some embodiments performs (at 1325) an action specified by the highest priority matching rule. For instance, a firewall SVM might specify that the data message should be allowed to pass, should be dropped and/or should be redirected.

Once the SVM has completed its service operation, the SVM encapsulates (at 1330) the data message with an encapsulating header, assuming that the service operation does not result in the dropping of the data message. This encapsulating header has the same format (e.g., is an NSH header, GRE header, or QinQ header) as the data message that the SVM received. In this encapsulating header, the SVM in some embodiments sets (1) a liveness value to respond to the service proxy's liveness value and (2) the appropriate sequence number (e.g., unadjusted or incremented sequence number) for the liveness value.

In some embodiments, some service nodes are configured to decrement the SI values that they receive, while other service nodes are not configured to decrement the SI values. If the service node is configured to decrement the SI value, it decrements the SI value before inserting the decremented SI value in the encapsulating header at 1330. The SVM in some embodiments also sets the SMD attributes (SCI, SI and service direction) in the encapsulating header, while in other embodiments, the service proxy in the egress path retrieves these values from an earlier record that the service proxy created before passing the data message to the SVM.

Figure 15:
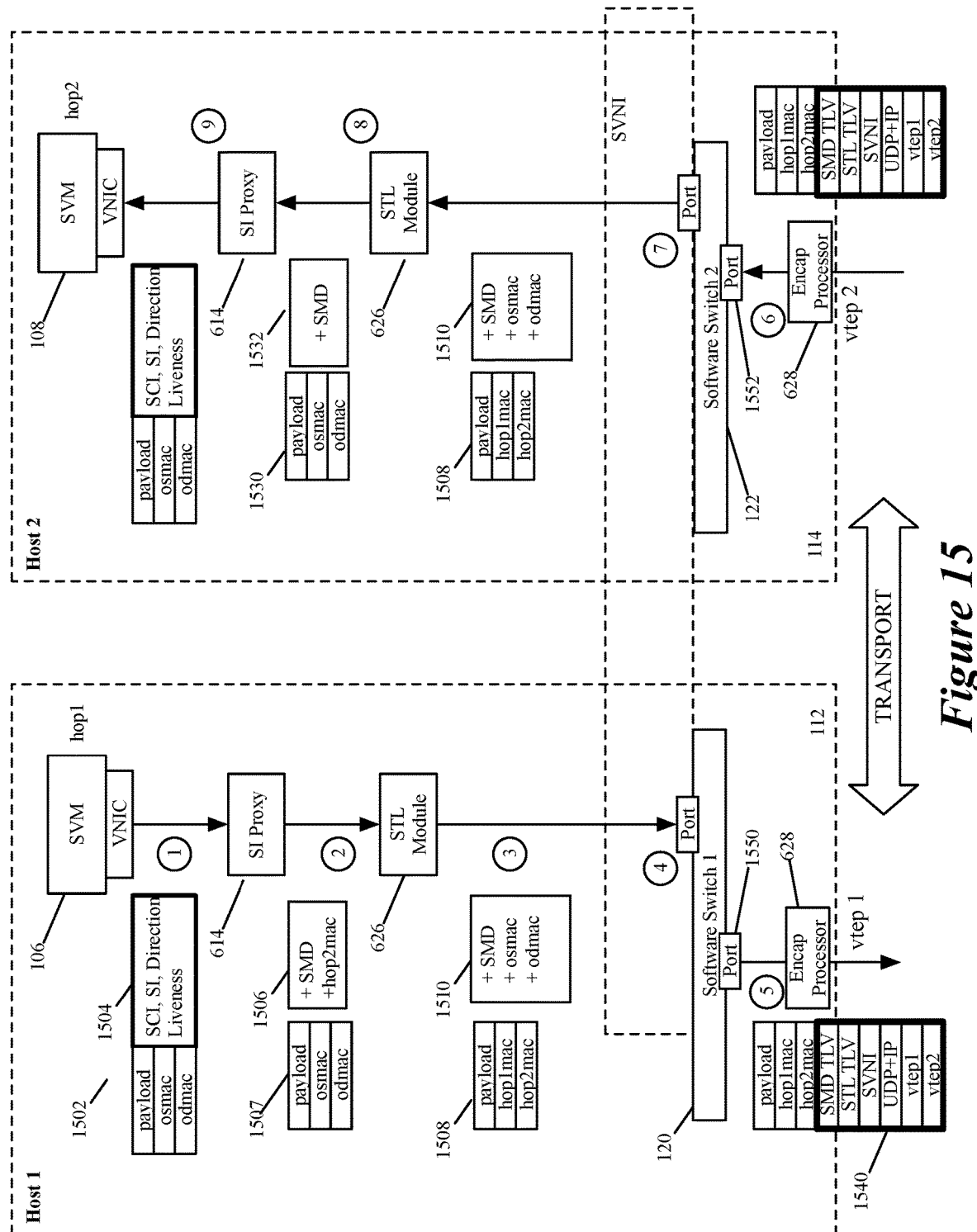
FIG. 15 illustrates an example of a data message in some embodiments being forwarded from a first hop service node to a second hop service node.

In some embodiments, the SVM can also set flow programming attribute(s) in the encapsulating header to direct the service proxy to modify the service processing of the data message's flow. This flow programming will be further described below. After encapsulating the data message, the SVM forwards the data message along its egress path. FIG. 15 illustrates an example of SVM 106 returning the encapsulated data message 1502 with the SMD and liveness attributes in its encapsulating header 1504.

Figure 16:
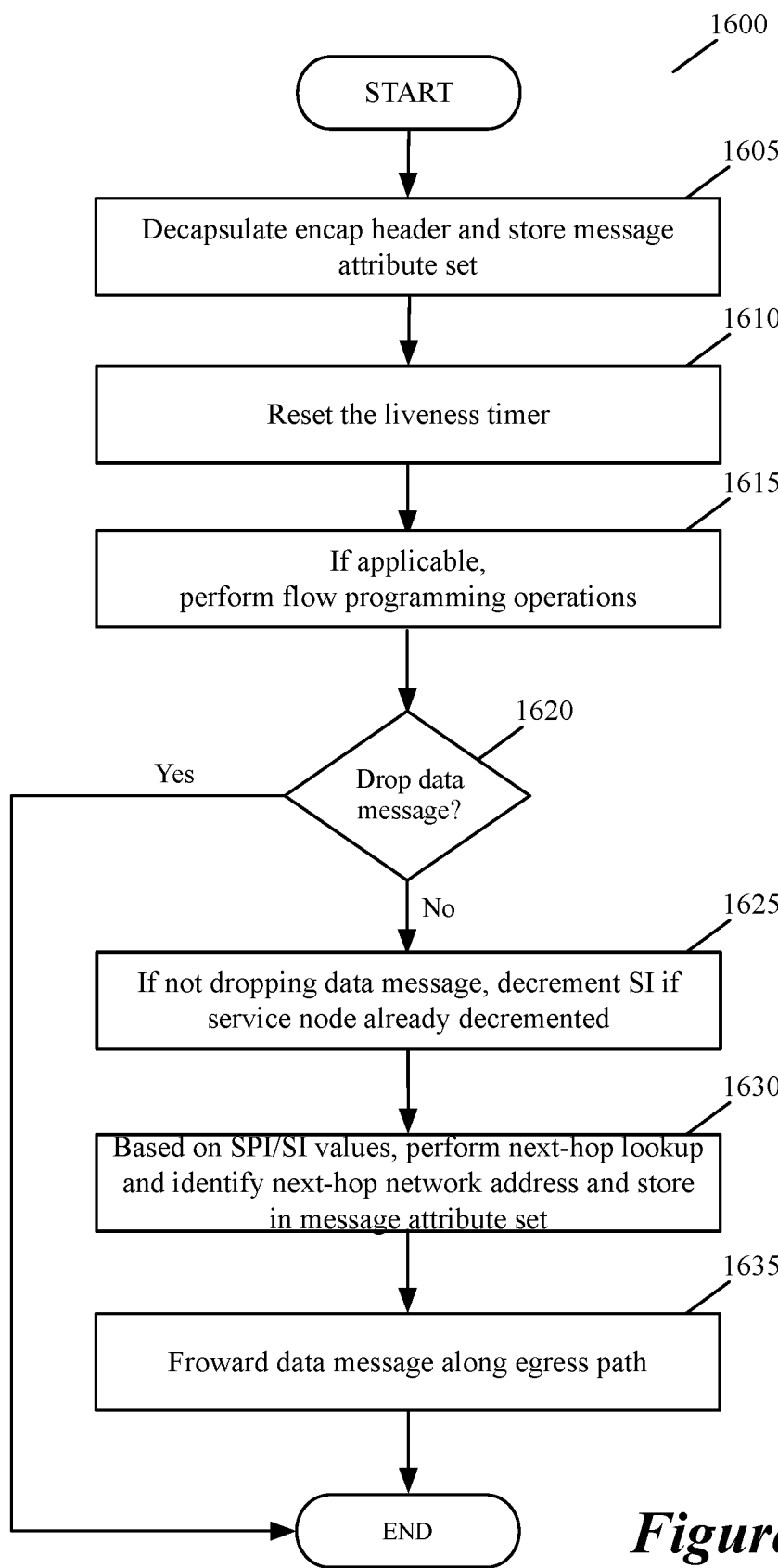
FIG. 16 conceptually illustrates a process that a service proxy performs in some embodiments each time it receives a data message traversing along an egress path of its service node.

FIG. 16 illustrates a process 1600 that the service proxy 614 performs in some embodiments each time it receives a data message traversing along the egress path of its service node. As shown, the service proxy in some embodiments initially (at 1605) removes the encapsulation header from the data message, removes the SMD attributes from this header, and stores these attributes in an attribute set that it creates for the data message. In some embodiments, the service proxy retrieves (at 1605) some or all of the SMD attributes (e.g., the SPI value, the service plane MAC address of the source GVM) for the data message from a previous record that the service proxy created before giving the data message to the service node along the ingress path. FIG. 15 illustrates an example of the attribute set 1506 that the service proxy 614 creates for the decapsulated data message 1507.

Next, 1610, the process resets the liveness timer (e.g., a timer that expires every 0.25 seconds) that it maintains to account for the liveness value that it has received from the service node, which signifies that this node is still operational. With this liveness value, the service proxy receives from the service node a sequence number, which the process validates to ensure that it is the next liveness value that needs to be received.

At 1615, the process determines whether the SVM specified any flow programming attribute(s), which require the service proxy to direct the SI post processor 612 for the source GVM to perform flow programming by sending to the post processor 612 in-band data messages. In some embodiments, the service proxy sends an in-band flow programming control signal with another data message that it generates to send back to the source GVM, where it will be intercepted by its post processor 612.

When the source GVM receives the data message with the flow programming control signal, its post processor can uniquely identify the data message flow to which it applies by using a flow identifier that is unique to this flow. As further described below, this flow identifier is derived partially based on a unique identifier of the source GVM. The unique flow identifier also allows other service plane modules, such as the service nodes, service proxies and STL modules, to uniquely identify each data message flow. This unique flow identifier in some embodiments is part of the SMD attributes that are passed between the service hops of a service path and passed back to the source GVM.

In some embodiments, however, the service proxy sends the in-band flow programming control signal with the current data message that it is processing. In some of these embodiments, the service proxy does this only when its associated service node is the last hop service node of the service path, while in other embodiments it does this even when its service node is not the last hop service node. When its service node is not the last hop service node of the service path, the service proxy embeds the flow programming in the SMD attributes of the data message, which in some embodiments eventually get forwarded to the source GVM's SI post processor as part of the data message encapsulation header when the last hop service is performed. Even in this situation, the service proxy of the last hop in other embodiments sends the flow programming signal as a separate message.

Figure 20:
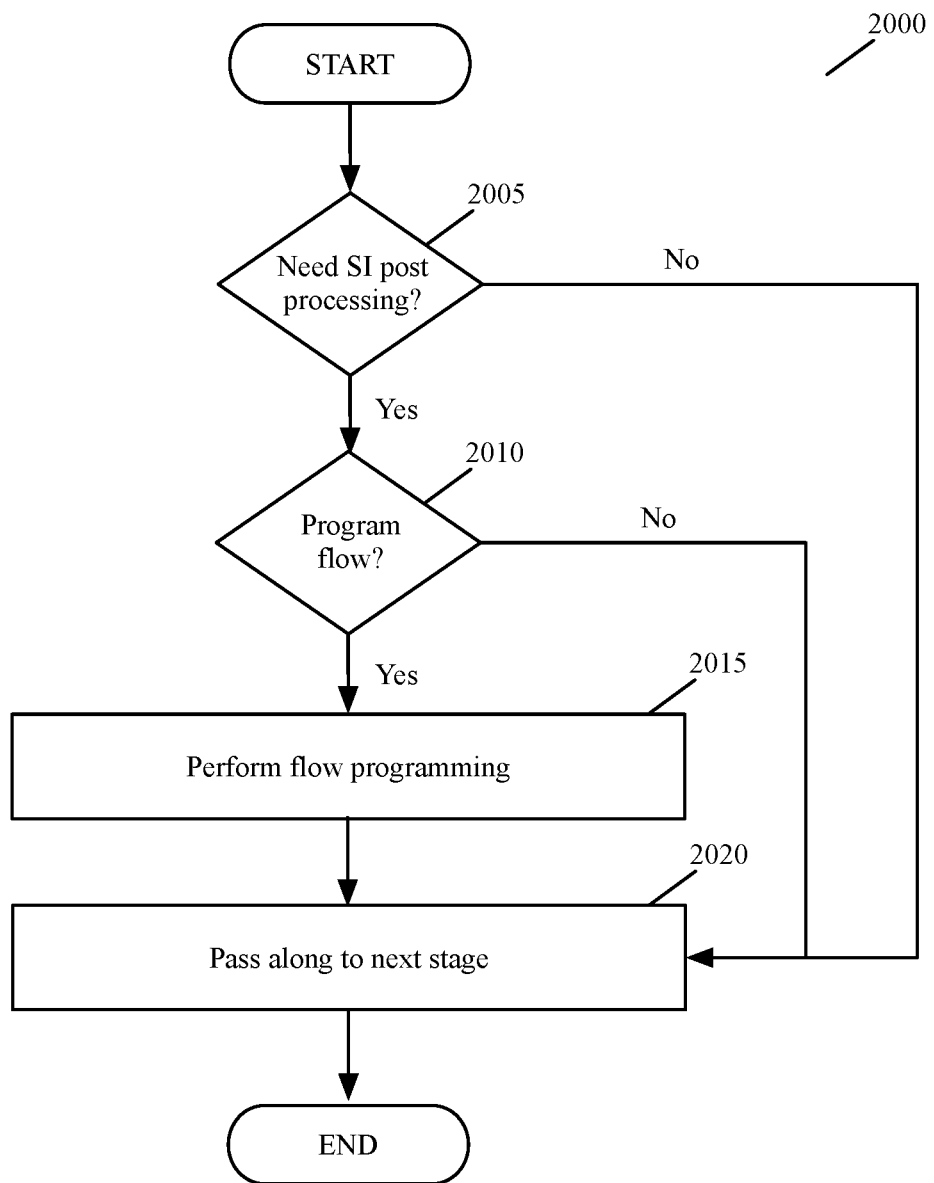
FIG. 20 conceptually illustrates a process that a service index post-processor performs in some embodiments.

The flow programming signals will be further described below by reference to FIG. 20. Also, as further described below, the service proxy also sends flow programming signals back to the source GVM when it detects that its service node has failed so that the classifier at the source GVM can select another service path for the current data message flow, as well as other data message flows. In such a situation, the service proxy also notifies the LCP on its host computer, so that the LCP can notify the CCP and the CCP, in turn, can modify the service paths specified for service chains that use the failed service node.

At 1620, the process 1600 determines whether its service node specified that the data message should be dropped. If so, the process drops the data message and then ends. Otherwise, assuming the data message should not be dropped and should continue along its service path, the service proxy in some embodiments decrements (at 1625) the SI value in case the service node has not decremented the SI value, and then uses (at 1630) this decremented value along with the SPI value in the data message's stored attribute set to identify an exact match forwarding rule that identifies a next hop network address. When the proxy's service node is on multiple service paths, the proxy's forwarding rule storage stores multiple exact match forwarding rules that can specify different next hop network addresses for different SPI/SI values.

When the decremented SI value is zero, the service proxy in some embodiments that matches the decremented SI value and the embedded SPI value with a rule that directs the service proxy to identify the next hop as the service plane MAC address of the source GVM. This rule in some embodiments does not provide a MAC address, but rather refers to the service plane MAC address that is part of the SMD attribute set stored for the data message. In some embodiments, this instructions for returning the data message to the service plane MAC address of the source GVM when the SI value is zero is not specified by a forwarding entry of a forwarding table, but rather is hard coded into the logic of the service proxy.

At 1630, the service proxy stores the next hop network address (e.g., MAC address) in the attribute set that is stored for the data message. FIG. 15 illustrates an example of the service proxy 614 storing the next hop MAC address associated with the next service node in the attribute set 1506 of the decapsulated data message 1507. After identifying the next hop network address, the service proxy returns (at 1635) the data message to the egress path of its service node, and the process 1600 ends.

Figure 10:
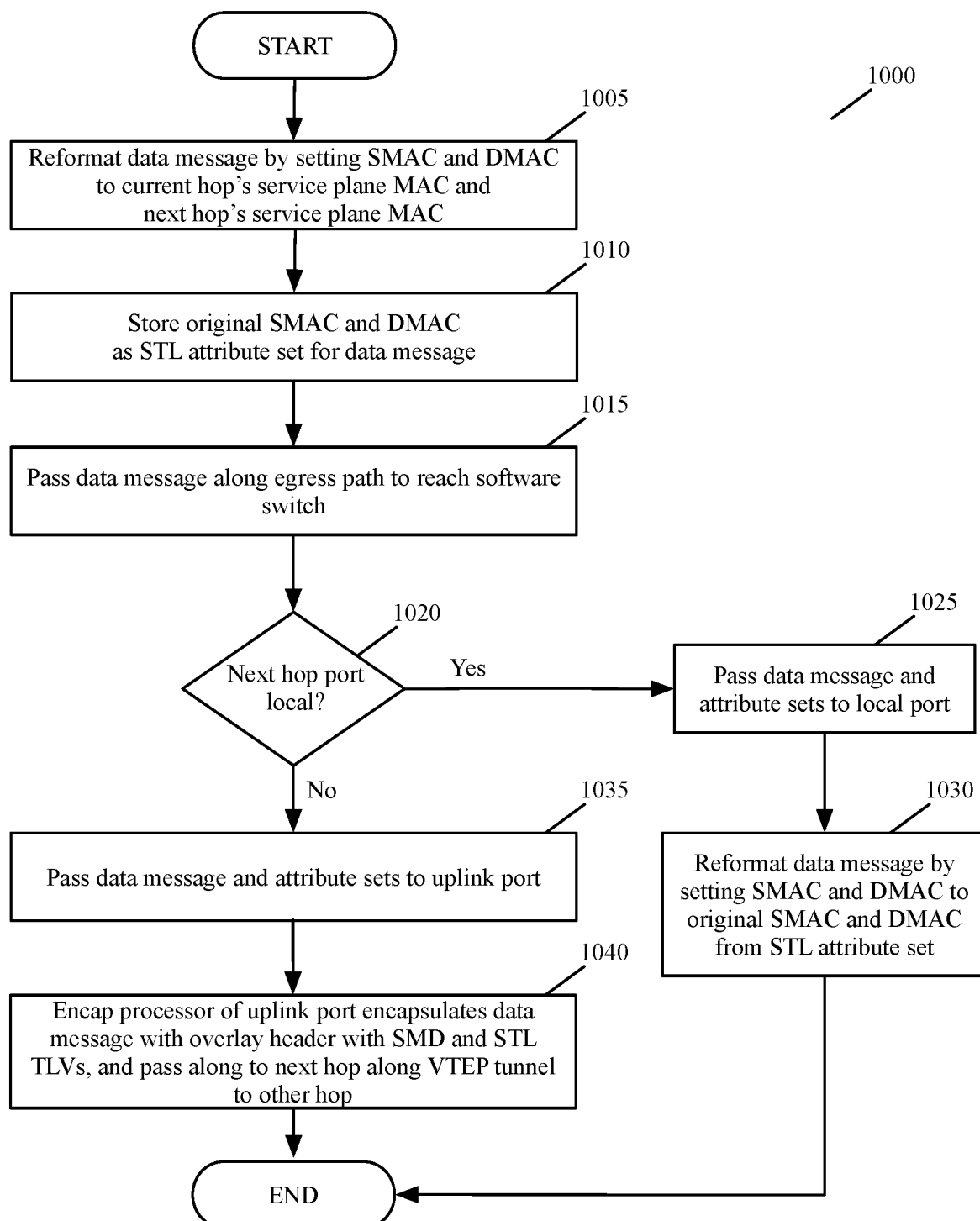
FIG. 10 conceptually illustrates a process of some embodiments for passing a data message in a service path to a next hop.

Once the service proxy returns the data message to the service node's egress path, the STL module 626 receives this data message and commences the process 1000 of FIG. 10. The STL module 626 performs the first three operations 1005-1015 of this process each time it receives a data message from a service insertion layer. Specifically, the STL module formats (at 1005) the data message for forwarding to the next hop service node, by replacing the original source and destination MAC addresses in the data message with a service plane MAC addresses of the current service hop and the next service hop (i.e., the hop1mac and hop2mac addresses in the example illustrated in FIG. 15).

At 1010, the STL module also adds the original source and destination MAC addresses of the data message to the set of attributes for the data message that should be processed by other service transport layer modules (e.g., the vswitch, the encap processor, etc.) on the same host computer. The reformatted data message 1508 and the augmented attributed set 1510 are depicted in FIG. 15. After reformatting the data message and augmenting its attribute set, the STL module 626 passes (at 1015) the formatted data message along the egress path, where it next reaches the software switch 120.

Based on the destination MAC address (i.e., the next hop MAC address) of the formatted data message, the software switch determines (at 1020) that the next hop's port is not local. Hence, the software switch provides (at 1035) the data message to the uplink port 1550 that connects to a VTEP1 that communicates through an overlay network tunnel with a VTEP2 on host 114, as illustrated in the example of FIG. 15. As shown, an STL encap processor 628 along the egress path of this uplink port (at 1040) receives this data message (e.g., is called as one of the hooks specified for the uplink port), defines an encapsulating overlay header 1540 for this data message and encapsulates the data message with this overlay header.

In some embodiments, the overlay header is a Geneve header that stores the SMD and STL attributes in one or more of its TLVs. As mentioned above, the SMD attributes in some embodiments include the SCI value, the SPI value, the SI value, and the service direction. Also, in some embodiments, the STL attributes includes the original L2 source MAC address and the original L2 destination MAC address. FIG. 15 illustrates an example of this encapsulating header, which will be further described below by reference to FIG. 28.

Figure 17:
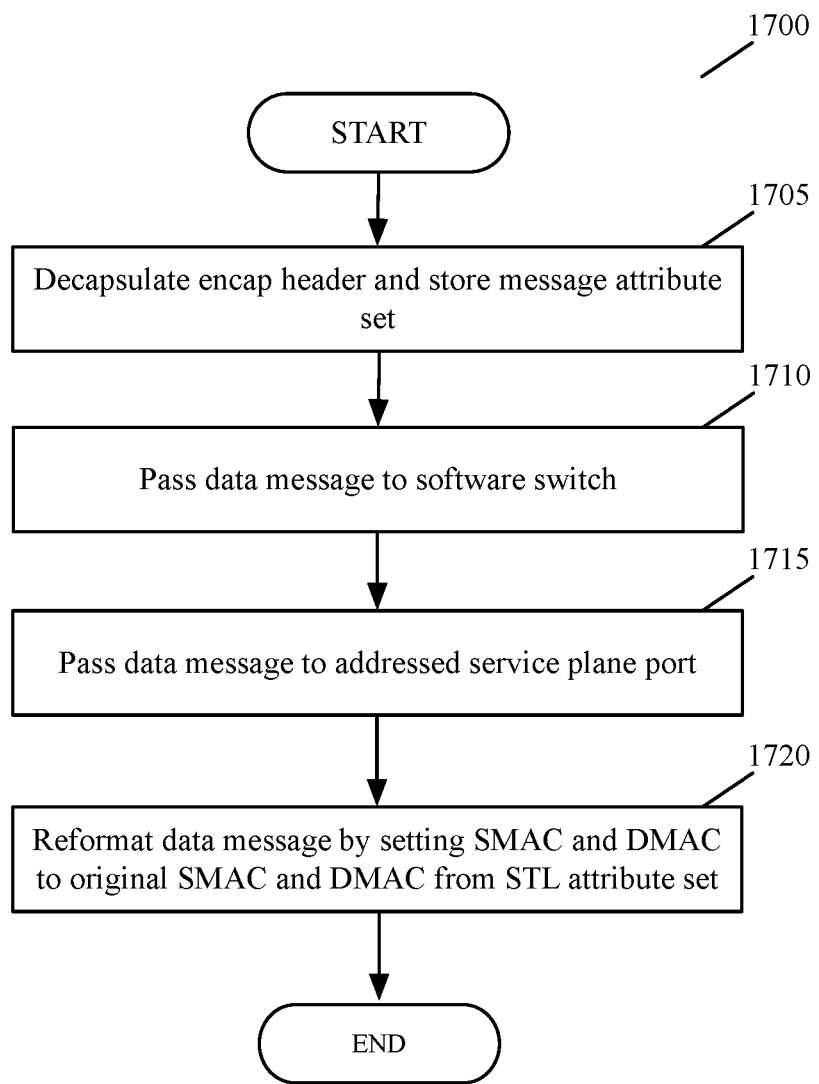
FIG. 17 conceptually illustrates a process started by an encap processor on a next hop computer that receives an encapsulated data message that needs to be processed by an SVM executing on its computer.

When the encapsulated data message is received at the next hop's host computer 114, the data message is captured by the STL encap processor 628 of (e.g., defined as a hook for) a downlink port 1552 that connects to the VTEP connecting through the overlay network tunnel to the prior hop's VTEP. FIG. 17 illustrates a process 1700 started by an encap processor 628 on a next hop computer that receives an encapsulated data message that needs to be processed by an SVM executing on its computer.

As shown, this encap processor removes (at 1705) the encapsulation header from the data message, and stores (at 1705) the STL and SMD attributes as the associated set of attributes of the data message. It then passes (at 1710) the decapsulated message to the downlink port, which then passes it to the software switch to forward (at 1715) to its port that is connected to the next hop SVM (i.e., that is associated with the destination MAC address). This port then passes the data message 1508 and the attribute set 1510 to the ingress path of the next hop SVM, as shown in the example of FIG. 15 for the SVM 108.

The STL module 626 on this ingress path then re-formats (at 1720) the data message by replacing the previous and current hop service plane MAC address (i.e., the hop1mac and hop2mac) with the original source and destination MAC addresses of the data message, which it retrieves from the data message attribute set. In retrieving the original SMAC and DMAC addresses, the STL module 626 modifies the data message's attribute set. The reformatted data message 1530 and the modified attributed set 1532 are depicted in FIG. 15. The STL module then passes this re-formatted data message with its accompanying SMD attributes along the SVM's ingress path, where it is next processed by this hop's ingress service proxy 614.

The operation of this service proxy is as described above by reference to FIGS. 9 and 11. FIG. 15 shows the service proxy of SVM 108 on host 114 passing an encapsulated data message to the SVM. The encapsulating header of this data message is supported by the SVM 108 and stores the SCI, SI, service direction and liveness values. In some embodiments, the SVMs that are part of the same service path support different encapsulating headers. In some of these embodiments, the service proxies along a service path can encapsulate the data message with different encapsulating headers before passing the data message to their associated SVMs. For instance, in one case, the first hop service proxy passes to the SVM 106 the data message with an NSH encapsulating header, while the second hop service proxy passes to the SVM 108 the data message with a QinQ encapsulating header.

Figure 18:
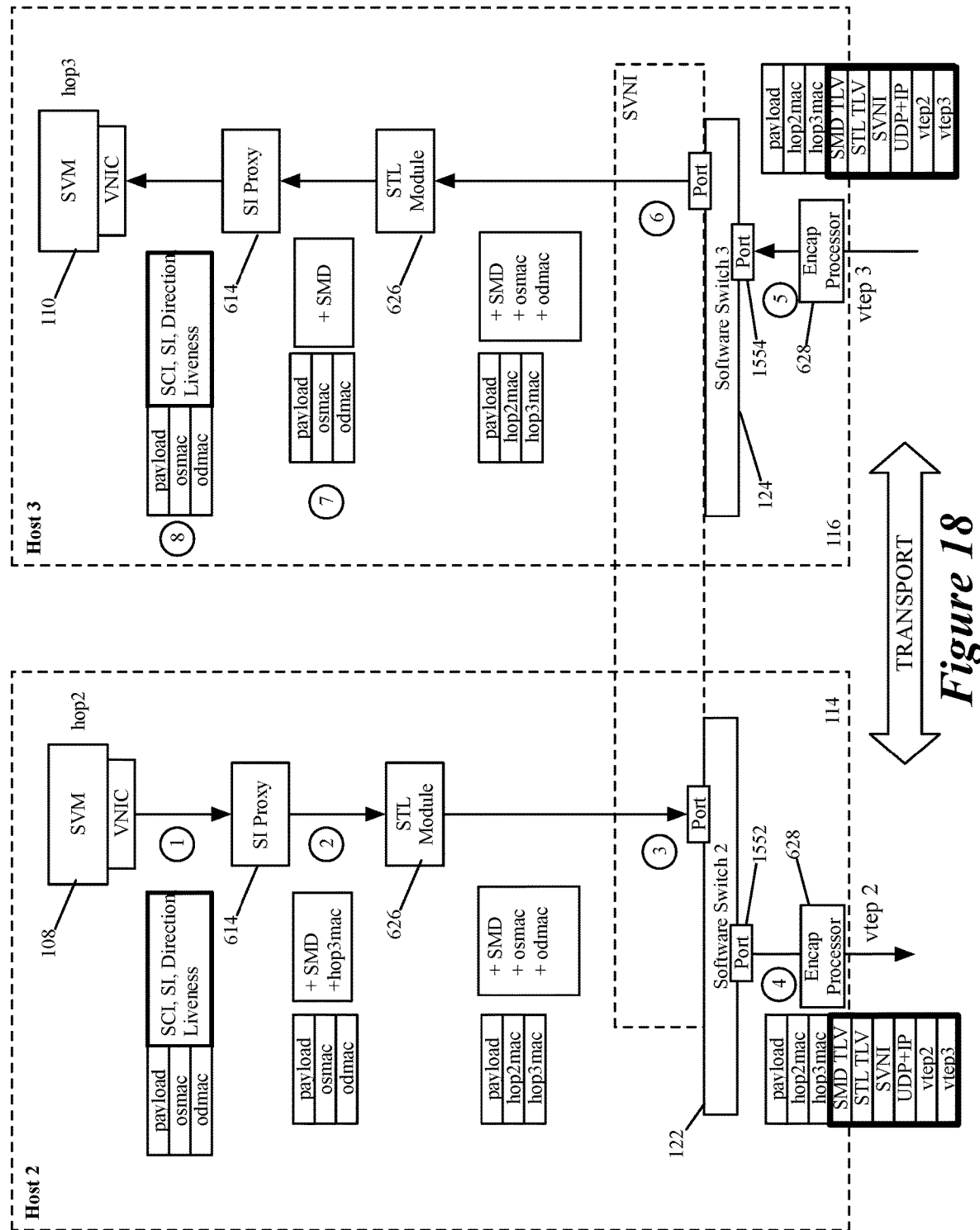
FIG. 18 illustrates an example of a data message in some embodiments being forwarded from a second hop service node to a third hop service node.

Once the SVM 108 performs its service operation on the data message (e.g., per the process 1300 of FIG. 13), the SVM sends the processed data message along its egress data path, as shown in FIG. 18. As shown, the service proxy then identifies the MAC address of the next service hop and adds this MAC address to the stored attribute set for the data message. At this point, the next hop is the third service hop, which corresponds to the SVM 110. This proxy identifies this MAC by decrementing the SI value (when the SVM 108 did not decrement the SI value) and then using the embedded SPI value and decremented SI value to lookup a forwarding rule that provides the next hop's MAC address. The STL module in this egress path then replaces the original SMAC and DMAC in the data message with the current hop and next hop MAC addresses (i.e., the hop2mac and the hop3mac in the example of FIG. 18), stores the original SMAC and DMAC in the stored attribute set of the data message, and then passes the data message along the egress path where it is received by the software switch 122.

The software switch then determines that the next hop is associated with its uplink port 1552, and hence passes the data message to this port. As shown in FIG. 18, the encap processor 628 on the egress path of this port (e.g., specified as a hook on this egress path) then encapsulates the data message with a Geneve header that stores the SMD and STL attributes in one or more of TLVs and specifies that the data message is traversing from this port's associated VTEP2 to VTEP3 that is associated with port 1554 of host 116.

The STL encap processor 628 in the ingress path of port 1554 then removes the encapsulation header from the data message and stores the STL and SMD attributes as the associated set of attributes of the data message. It then passes the decapsulated message to the port 1554, which then passes it to the software switch 124 to forward to its port connected to the next hop SVM 110 (i.e., to its port associated with the service plane DMAC). This port then passes the data message and attribute set to the ingress path of this SVM, as shown in FIG. 18.

The STL module 626 in this ingress path replaces the previous and current hop service plane MAC address (i.e., the hop2mac and hop3mac) with the original source and destination MAC addresses of the data message, which it retrieves from the data message attribute set. The STL module 626 also modifies the data message's attribute set by removing the original SMAC and DMAC addresses, and then passes the re-formatted data message with its accompanying SMD attributes along the SVM's ingress path for this hop's ingress service proxy 614 to process. This service proxy passes to the SVM 110 an encapsulated data message with an encapsulating header supported by the SVM 110 and storing the SCI, SI, service direction and liveness values.

Figure 19:
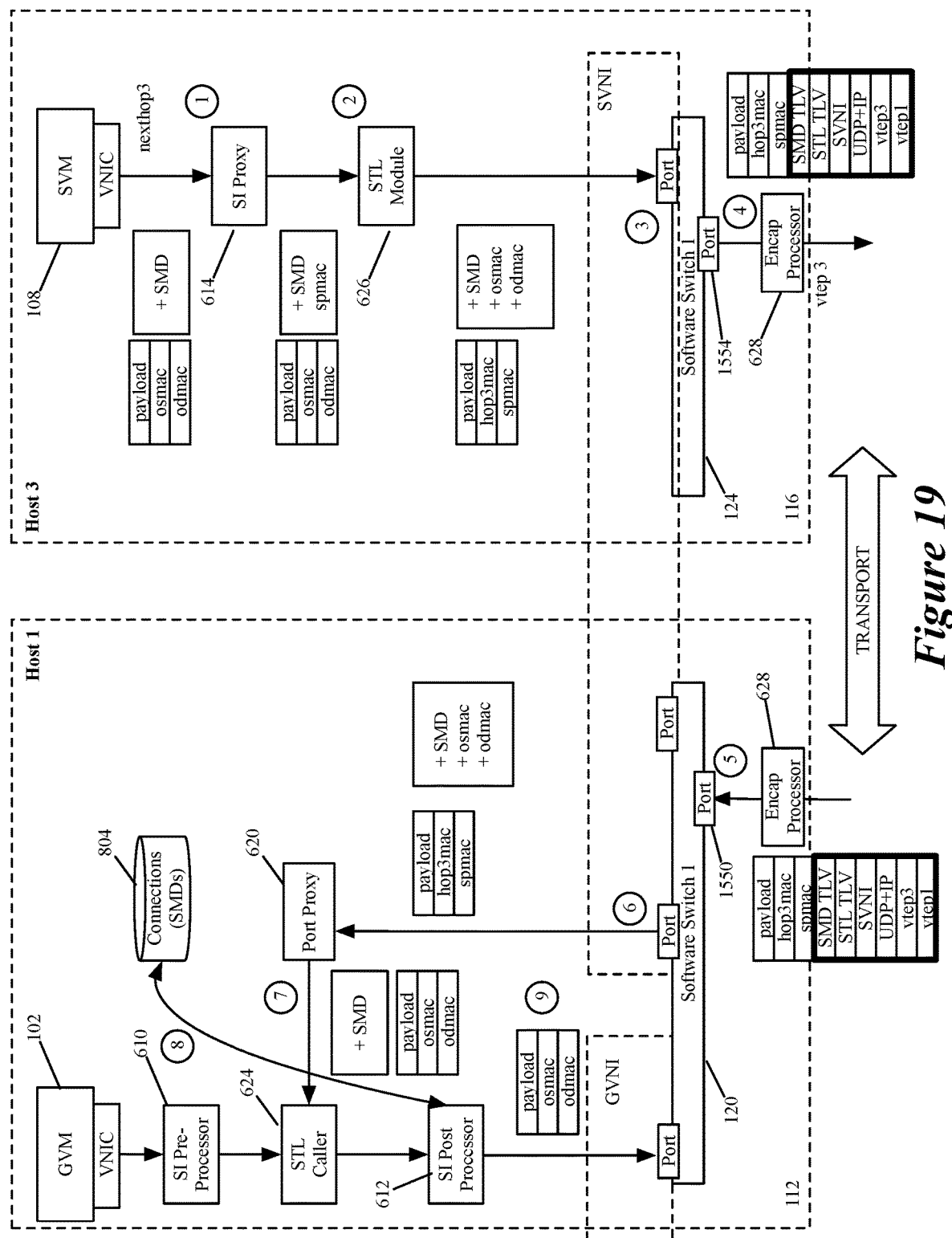
FIG. 19 illustrates an example of a data message in some embodiments being forwarded from a third hop service node to a back to a first hop service node.

Once the SVM 110 performs its service operation on this data message (e.g., per the process 1300 of FIG. 13), the SVM sends the processed data message along its egress data path, as shown in FIG. 19. The service proxy decrements the SI value when assuming that the SVM 110 has not done so already. In this example, the decremented SI value is now zero. In some embodiments, the service proxy then matches this SI value and the SPI value to a rule identifier of a forwarding rule that specifies that it should select the service plane MAC (spmac) of the source GVM as the next hop MAC address. In other embodiments, the hardcoded logic of the service proxy directs it to identify the service plane MAC of the source GVM as the next hop MAC. In either case, the service proxy adds the source GVM's service plane MAC to the attribute set of the data message.

The STL module next replaces the original SMAC and DMAC in the data message with the third hop MAC address and the source GVM's service plane MAC, stores the original SMAC and DMAC in the stored attribute set of the data message, and then passes the data message to its software switch 124. The software switch then determines that the next hop is associated with its port 1554, and hence passes the data message to this port. As shown in FIG. 19, the encap processor 628 on the egress path of this port then encapsulates the data message with a Geneve header that stores the SMD and STL attributes in one or more TLVs and specifies that the data message is traversing from this port's associated VTEP3 to VTEP1 that is associated with port 1550 of host 112.

The STL encap processor 628 in the ingress path of port 1550 then removes the encapsulation header from the data message and stores the STL and SMD attributes as the associated set of attributes of the data message. It then passes the decapsulated message to the port 1550, which then passes it to the software switch 120 to forward to its port connected to the port proxy 620. This port then passes the data message and attribute set to the port proxy 620, as shown in FIG. 19.

The port proxy 620 then replaces the previous and current hop service plane MAC address (i.e., the hop3mac and spmac) with the original source and destination MAC addresses of the data message, which it retrieves from the data message attribute set. The port proxy 620 also modifies the data message's attribute set to remove the original SMAC and DMAC, and then passes this re-formatted data message with its accompanying SMD attributes back to the STL caller 624 that called it in the first place. In some embodiments, the port proxy uses a connection record that it created when the STL caller originally called it, to identify the STL caller to call back. In other embodiments, the port proxy uses a mapping table that maps each service plane MAC with a GVM's STL caller. The mapping table in some embodiments has records that associate service plane MACs and service directions with guest forwarding plane port identifiers associated with the GVMs.

Once called, the STL caller passes the data message along the egress path of GVM 102, where it will next be forwarded to the SI post-processor 612. FIG. 20 illustrates a process 2000 that the SI post-processor 612 performs in some embodiments. The post-processor performs this process 2000 each time it receives a data message that is passed to it along a GVM's IO chain. As shown, the post processor 612 in some embodiments initially determines (at 2005) whether it needs to examine the received data message for SI post processing. This is because as a module along a GVM's IO chain, the post processor will get called for all data message flows that pass along this IO chain and some of these data message might not match an SI rule that requires service insertion operations to be performed on them. In some embodiments, the process 2000 determines (at 2005) whether it needs to process the data message by determining whether the data message has associated service metadata. If not, the process transitions to 2020, which will be described below.

When the SI post processor 612 determines that it needs to process the data message, the process determines (at 2010) whether the SMD metadata associated with the data message specifies a flow programming tag that requires the post processor to perform a flow programming operation. In some embodiments, such a flow programming tag would be specified in the data message's SMD attributes by a service node to change the service path processing at the source GVM, or by a service proxy for the same reason when it detects failure of its service node. When the flow programming tag does not specify any flow programming, the process transitions to 2020, which will be described below.

Otherwise, when the flow programming tag specifies a flow programming operation, the process 2000 performs this operation, and then transitions to 2020. The flow programming operation entails in some embodiments modifying the connection record in the connection tracking storage 804 to specify the desired operation and/or SMD attributes (e.g., allow, drop, etc.) for the data message's flow. The post processor's writing to the connection tracker 804 is depicted in FIG. 19. As mentioned above and further described below, the SMD metadata for the processed data message includes a flow identifier that uniquely identifies the data message's flow by being at least partially derived from the unique service plane identifier of the source GVM. The post processor 612 uses this flow identifier to match the data message's flow in the connection tracker in some embodiments.

In some embodiments, the flow programming tag can specify the following operations (1) NONE when no action is required (which causes no flow programming operation to be performed), (2) DROP when no further data messages of this flow should be forwarded along the service chain and instead should be dropped at the source GVM, (3) ACCEPT when no further data messages of this flow should be forwarded along the service chain and instead the flow should be accepted at the source GVM. In some embodiments, the flow programming tag can also specify DROP MESSAGE. The DROP MESSAGE is used when the service node needs to communicate with the proxy (e.g. to respond to a ping request) and wants the user data message (if any) to be dropped, even though no flow programming at the source is desired.

In some embodiments, an additional action is available for the service proxies to internally communicate failure of their SVMs. This action would direct the SI post processor in some embodiments to select another service path (e.g., another SPI) for the data message's flow. This action in some embodiments is carried in-band with a user data message by setting an appropriate metadata field in some embodiments. For instance, as further described below, the service proxies communicate with the post processor of the source GVM through OAM (Operation, Administration, and Maintenance) metadata of the NSH attributes through in-band data message traffic over the data plane. Given that by design flow programming actions are affected by signaling delays and are subject to loss, an SVM or service proxy might still see data messages belonging to a flow that was expected to be dropped, accepted or re-directed at the source for some time after communicating the flow programming action to the proxy. In this case, the service plane should continue set action to drop, allow or redirect at the source.

The process 2000 transitions to 2020 after completing the flow programming operation. It also transitions to 2020 when it determines (at 2005) that no SI post processing needs to be performed on the data message or determines that no flow programming needs to be performed for this data message. At 2020, the process 2000 lets the data message through the egress path of GVM 102, and then ends.

The examples described above by reference to FIGS. 8, 9, 15, 18, and 19 show service plane operations that are performed on a data message that is identified along the egress path of a source GVM. These service plane operations (described by reference to FIGS. 7, 10-14, 16, 17 and 20) are equally applicable to data messages that are identified as they traverse along the ingress path of a source GVM. To perform these ingress side operations, the SI pre and post processors 610 and 612 on the ingress path are flipped as compared to the locations of these two processors on the egress path. Specifically, as shown in FIG. 6, the preprocessor 610 receives a data message that enters the GVM's ingress path from the software switch port that is associated with this GVM's VNIC, while the post processor 612 passes the processed data message along the ingress IO chain to the GVM's VNIC.

However, the service insertion and service transport operations for the ingress side processing are similar to the egress side processing of data messages to and from a particular GVM. In some cases, this GVM exchanges data messages with another GVM. As described above by reference to FIGS. 4 and 5, the service plane can be directed to perform the same service chain on the data messages in each direction, but in the opposite order. In such cases, the service nodes for the service path on the ingress side perform a series of service operations for a first direction of the service chain for data messages that the other GVM sends to the particular GVM, while the service nodes for the service path on the egress side perform the same series of service operations but in a second, opposite direction through the service chain. Also, as mentioned above, the two sets of service nodes for the forward and reverse directions include the same service nodes in some embodiments.

Figure 21:
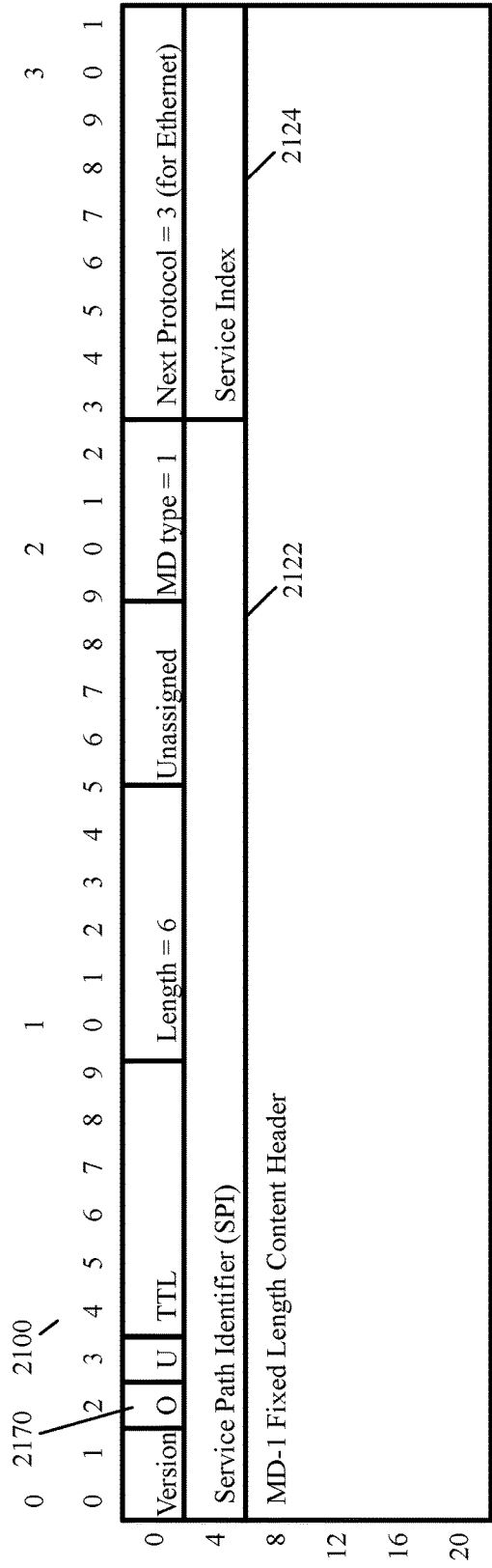
FIG. 21 illustrates a network service header of some embodiments.

The header formats used in some embodiments will now be described by reference to FIGS. 21, 22, and 25-28. FIG. 21 illustrates an NSH header 2100 that some of the service proxies in some embodiments use to encapsulate data messages before providing the data messages to their associated service nodes. In some of these embodiments, the service nodes return the processed data messages encapsulated with such NSH headers. In some embodiments, the NSH header is also used by the service plane modules of host computers to forward double encapsulated data messages to other host computers, with the first encapsulating header being the NSH header and the second encapsulating header being a service transport header. In other embodiments, however, the service insertion and service transport attributes are placed in one encapsulating header, as further described below. Also, as described above and further described below, the service proxies and service nodes in some embodiments do not use NSH headers to encapsulate the data messages that they exchange.

As shown, all the fields of the first 8 bytes of the NSH header are used in compliance with RFC 8300. This header includes in some embodiments a fixed length metadata (MD) content header 2110. It also includes in some embodiments (1) a MD type, which is set to 1, (2) a next protocol value, which is 3 to signify Ethernet communications, and (3) a length value, which is 6 because the MD content header 2110 has a fixed length. Also, in some embodiments, the SPI and SI fields 2122 and 2124 are filled in with the service path identifier for the selected path and the current service index value, which is the initial SI value (i.e., the initial number of service hops) when the pre-processor 610 of the source GVM defines it.

In some embodiments, the service insertion modules do not store or cache metadata except in the NSH header carried along with data messages. In this model, service nodes preserve the metadata field that they do not intend to change. In some embodiments, certain metadata fields are used as a communication mechanism for data plane mediated signaling between the service proxies/nodes and the source GVM's service modules. In some embodiments, the data message metadata is encoded over the wire in NSH fixed length context header 2110. In some embodiments, this fixed-sized header provides sixteen bytes of information in total. In some embodiments, each service insertion deployment is free to define its own MD content format.

Figure 22:
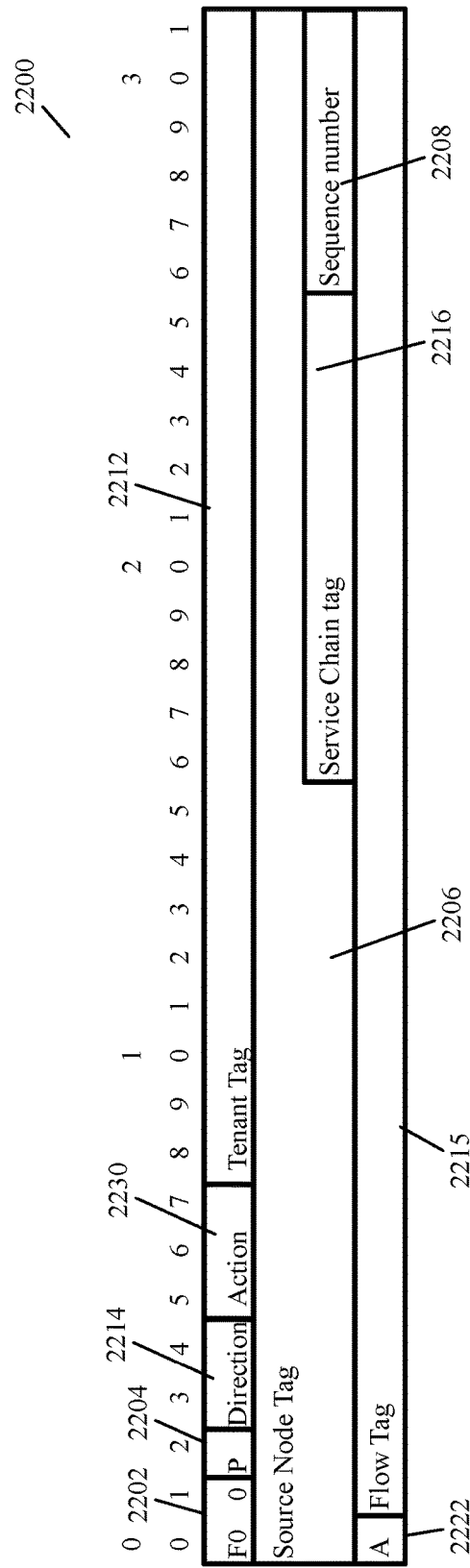
FIG. 22 illustrates an example of metadata content that is stored in a metadata content header of some embodiments.

FIG. 22 illustrates an example of metadata content that is stored in the MD content header 2110 in some embodiments to send service metadata to successive service hops, to service nodes and/or to service proxies. As shown, this header has sixteen bytes that include a number of fields. One field 2202 contains the F bits, which are used to distinguish the type of content in the MD content header, e.g., service metadata content, flow programming content, etc. In some embodiments, the F bits for the service metadata content are b00. Another field 2204 stores a P bit, which can be set to 1 to force a response to the data message by the service node. In some embodiments, the response must come with an NSH header containing the same sequence number as that of the request with the P bit also set to 1.

The source node identifier (ID) field 2206 unequivocally, for the service plane, identifies a data compute node (e.g., a GVM) that is the source or sink of the data message. In some embodiments, the source node ID includes the service plane MAC address of this source data compute node (DCN) for which the data message was inserted into the service plane. The MD content header also includes a sequence number 2208 that is an opaque 6-bit value that identifies the data message for the purpose of liveness detection. This value is typically zero unless a service proxy fills before forwarding the data message to its service node as part of its liveness detection.

The MD content header also includes a tenant ID 2212 that identifies a tenant uniquely for a multi-tenant datacenter. The tenant ID in some embodiments is a VNI associated with the tenant. The MD content header 2200 further includes flow ID 2215 and flow ID validity bit 2222. In some embodiments, the flow ID validity bit is set to 1 when the rest of the flow ID (also called flow tag) is present. The flow ID 2215 is a unique identifier per flow and source DCN (i.e., per flow and source node ID 2206). In some embodiments, the flow ID is set by the source DCN's classifier (e.g., the SI pre-processor 610 that performs the classification operation).

In some embodiments, the flow ID may be discarded when the data message traverses a service which is not in native mode (i.e., the service is not aware of the service plane). In this case, the flow ID is discarded when there are not enough bits to carry the flow ID in compatibility mode headers, which are described below. The flow ID may also be discarded when a native service (i.e., a service plane aware service node) modifies the data message in a way that makes the flow ID meaningless, for example when a service encrypts traffic from multiple flows into a single IPsec tunnel. In this case preserving the flow tag of the inner data message would be meaningless. In some embodiments, the service node sets the A bit to zero in this case.

The MD content header 2200 also includes an action field 2230 that is used for flow programming by the service proxies. In some embodiments, the action specifies the action that the source DCN's post-processor 612 should perform on a flow. For flow programming, the action fields have to be non-zero in some embodiments. In addition, for flow programming, the F bits 2202 are also set to 10 and the P bit 2204 is set to 0 at the proxy and ignored by the classifier, and the flow validity bit 2222 and flow tag 2215 have to be valid.

The following are one exemplary set of values for the action field 2230, but one of ordinary skill will realize that other values are specified in other embodiments. A value of 0 for the action bit specifies that no flow-programming action is specified. A value of 1 indicates that all messages of the data message's flow should be dropped at the source, and no further data message of this flow should be forwarded to the service plane. Instead, data messages should be dropped at the source after classification.

A value of 2 in the action field specifies that the data message should be accepted at the source, and that no further data messages of the same flow should be forwarded to the service function in some embodiments. Instead, the service function should be skipped and the next service in the chain invoked directly. A value of 3 in the action field specifies that only this data message should be dropped and does not indicate an action that should be taken on other data messages of the same flow. In some embodiments, this action is used when the service node communicates with the service proxy (e.g. to respond to a ping request) and wants a data message to be dropped, even though no flow programming should happen.

The MD content header 2200 also includes a direction field 2214 that specifies the direction of the data message from the source DCN to network perspective (e.g., from the DCN to the network is the egress direction and from the network to the DCN is the ingress direction). A value of 0 in the direction field indicates no direction or unknown direction when the direction is not unknown. In some embodiments, a value of 1 indicates that the data message is moving in the ingress direction (i.e., the data message is being processed for source DCN that is the destination of the data message), for example, the data message is on its way from a VTEP to its corresponding DCN. A value of 2 in some embodiments indicates an egress direction (e.g., the data message is being processed for source DCN that is the source of the data message).

In some embodiments, a value of 3 indicates the data message is merely in transit and applies to both ingress and egress. When used to define a rule, this indicates that the rule should match data messages in one direction or in any direction in some embodiments. From the service perspective, a value of 3 in the direction field indicates that this traffic was forwarded to the service plane by a transit device that is neither sourcing nor sinking this traffic in some embodiments. In some embodiments, the transit indication is used for traffic that is transiting through a router.

The MD content header 2200 further includes a service chain ID 2216 that specifies the service chain along which the data message should flow. Some embodiments do not embed the SCI in the NSH header, and instead just store the SPI value. However, other embodiments store the SCI in the filed 2216 because many SPIs can correspond to the same service chain and SPIs are also not persistent. In other words, some embodiments embed the service chain ID because the SCI provides a more stable identifier for the service nodes to use to identifying service rule that match the data messages that they process.

In some embodiments, other metadata content formats are used internally by the service plane without being exposed to service nodes, in order to perform data plane signaling between service proxies and service post-processor of the source DCN. In some of these embodiments, when the other metadata content formats are used, the OAM bit (the O bit 2170 in FIG. 21) of the NSH header is set and no user payload is carried (or, if any is required by NSH, it is ignored at the destination). In some embodiments, the NSH next protocol field is set to 0 in this case.

In some embodiments, service plane unaware service nodes receive only a subset of the metadata, dependent on the type of non-NSH header used by the service proxies to communicate with the service nodes. As mentioned above, the service nodes in some embodiments can receive service metadata in GRE headers or in QinQ headers, when the service nodes cannot process NSH headers. The GRE and QinQ headers are referred to below as compatibility mode headers as they are headers that some existing service nodes support. Such compatibility mode encapsulation headers are needed in some embodiments in order to distinguish data message flows that are subject to different service processing and to isolate flows with conflicting L3 addresses (in case a single service node performs services on data messages of multiple networks, such as multiple tenant networks).

In some embodiments, a service node in a GRE compatibility mode connects to its service proxy through two VNICs and is configured in bump-in-the-wire mode. Also, in some embodiments, the VNICs are vmxnet3 devices, their MAC addresses do not change, and the MTU size that is used for them is set to a fixed size (e.g., 2048 bytes). One VNIC of the service node is defined as the unprotected side for receiving egress side traffic and supplying ingress side traffic of the source DCN, while the other VNIC is defined as the protected side for receiving ingress side traffic and supplying egress side traffic of the source DCN. In some embodiments, this information is communicated to a service manager or service node through OVF (Open Virtual Format) parameters, where OVF is a file format that supports exchange of virtual appliances across products and platforms.

Figure 23:
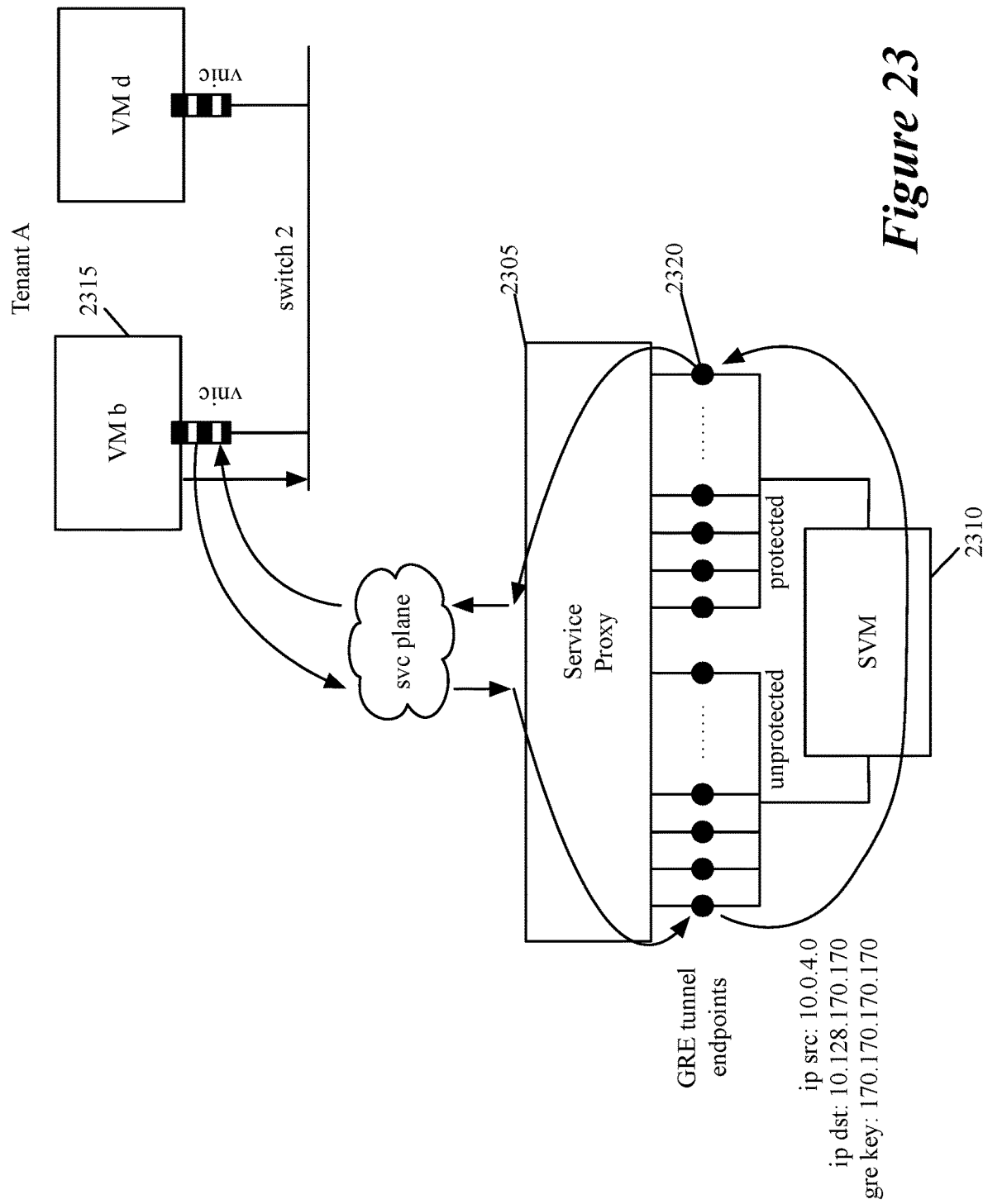
FIG. 23-24 illustrate an example of a service proxy forwarding to an SVM egress-side and ingress-side data messages of a GVM with encapsulating GRE headers.
Figure 24:
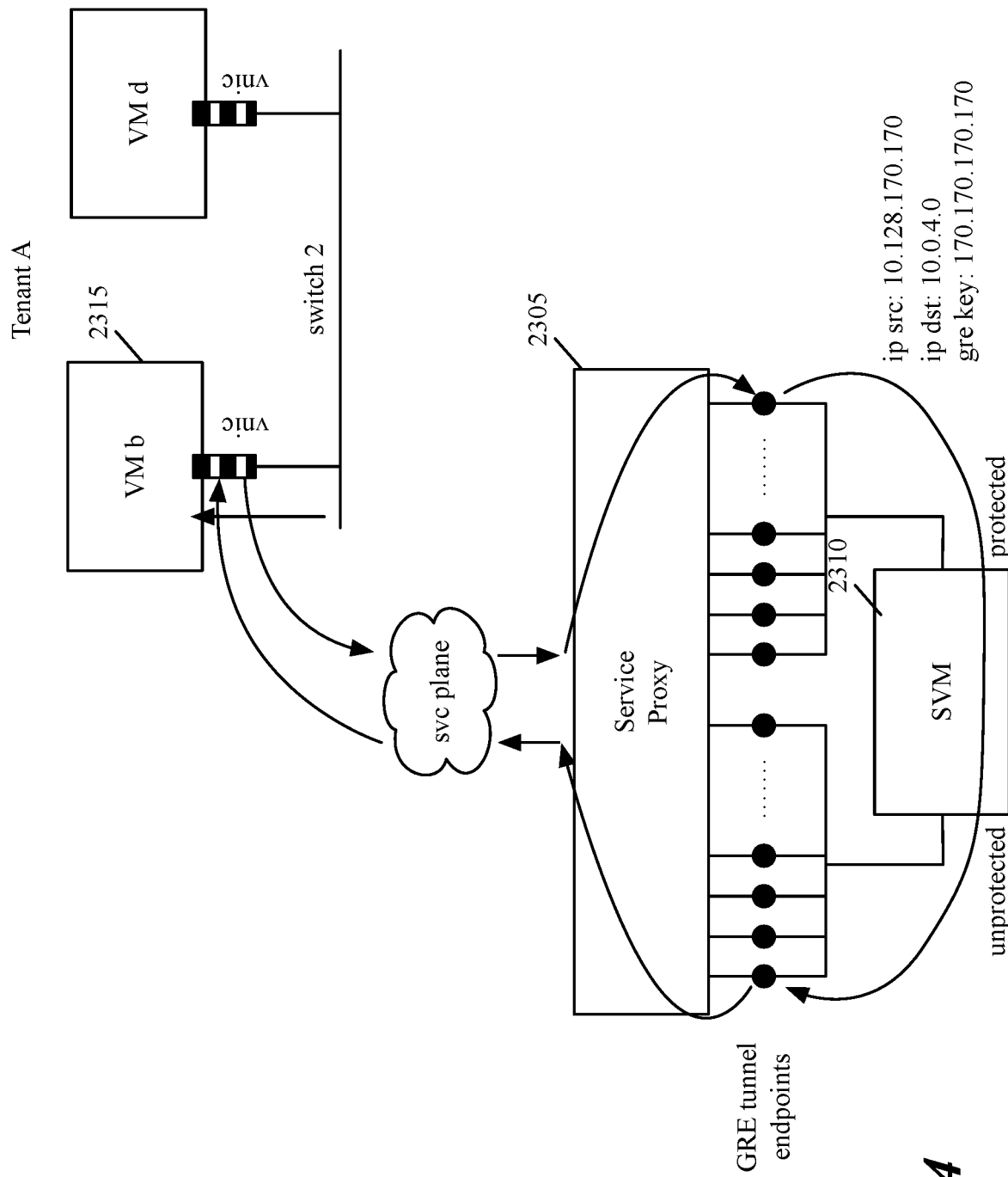

Even though two VNICs are present to support bump-in-the-wire mode, some embodiments use only one service proxy instance per pair of compatibility-mode VNICs and use only one endpoint on the service plane to refer to the pair of interfaces. FIGS. 23 and 24 illustrate an example of a service proxy 2305 forwarding to an SVM 2310 egress-side and ingress-side data messages of a GVM 2315 with encapsulating GRE headers. To do this, the service proxy creates several virtual GRE tunnel endpoints 2320 for the protected and unprotected VNICs of the SVM 2310.

Each protected virtual tunnel endpoint has a corresponding unprotected virtual tunnel endpoint. Each virtual tunnel endpoint is associated with a virtual IP address, a virtual MAC address and GRE parameters. The service proxy encapsulates data messages with GRE headers to traverse between corresponding pairs of endpoints through the service node, with this node operating in bump-in-wire mode that does not modify the GRE headers. As further described below, the service proxy embeds service metadata in the GRE headers to provide the service node with service metadata that it needs to process the data messages. Also, different tunnel endpoint pairs are used for different flows in some embodiments.

In some embodiments, the service insertion platform supports GRE encapsulation as defined in RFC 2784 with the key extension defined in RFC 2890. In some embodiments, GRE tunneling uses IPv4 addresses and the GRE protocol type is set to Transparent Ethernet Bridging as per RFC 1701. In the GRE compatibility mode, the service insertion layer (e.g., the service proxy) generates a tuple (e.g., source IP, destination IP, GRE key) per flow. In some embodiments, this process is deterministic and is based on the contents of the SMD header, which may then be stripped and replaced with the IP and GRE stack. In some embodiments, the IP addresses generated by this process are virtual and are not configured on any network entity other than the service proxy and its associated SVM, and as a result their scope is limited to the local link between a service proxy and its service node.

The IP address pair and the GRE key are generated in order to carry metadata along with the data message even when the service node does not support GRE. Both the service node and the service proxy in some embodiments consume that metadata. The service node, moreover, is expected to preserve the outer headers as-is without modifications in some embodiments. In some embodiments, each flow is consistently encapsulated in the same GRE tunnel and there can be no IP address conflicts inside a tunnel. Also, data messages differing only by their direction (ingress vs. egress) are encapsulated with the same GRE key with swapped source and destination IPs and traversing through the GRE tunnel endpoints in the proper (protected to unprotected, or unprotected to protected) direction.

Figure 25:
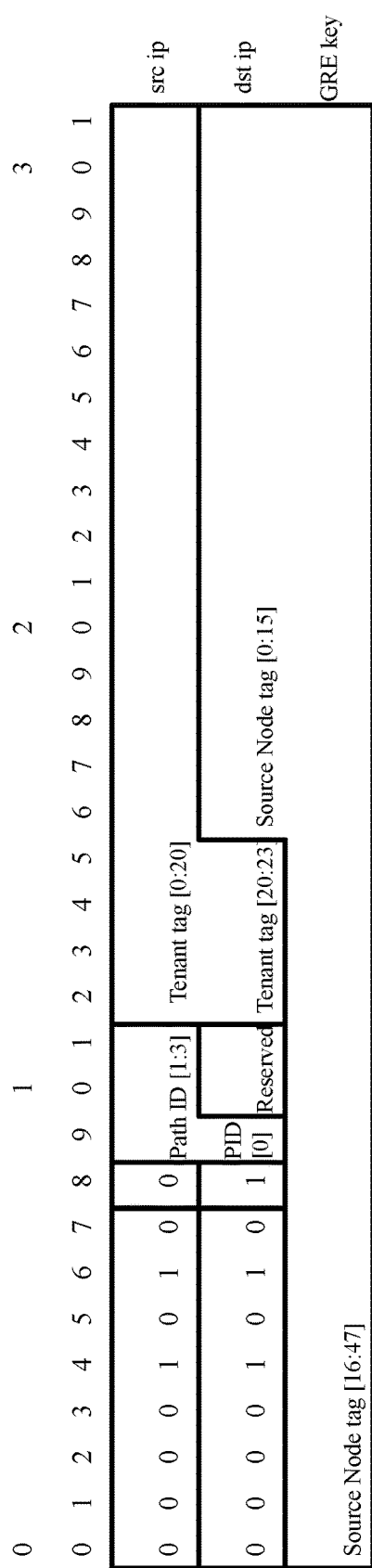
FIG. 25 illustrates a GRE header format that is used in some embodiments to store service data for egress direction.
Figure 26:
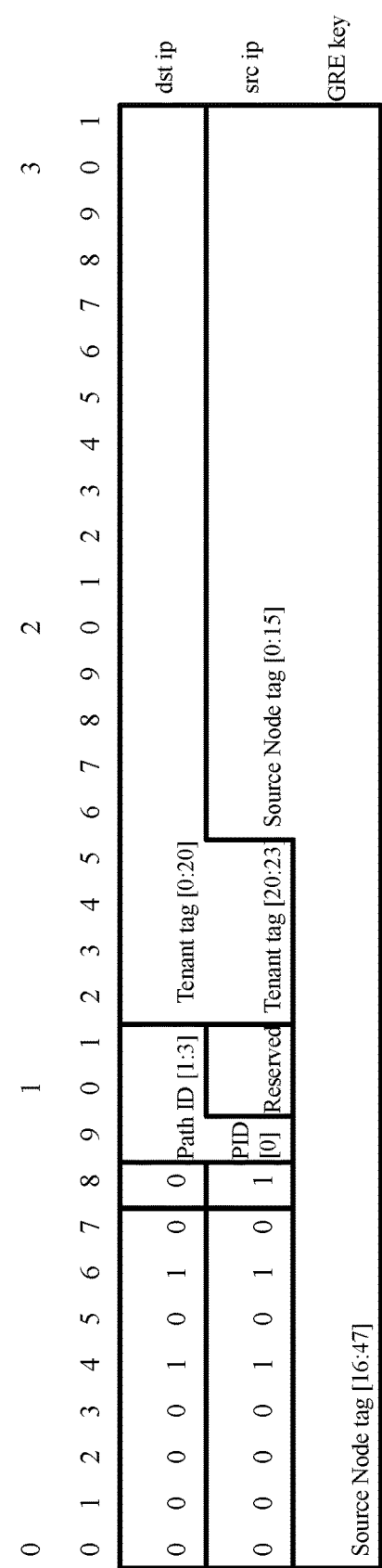
FIG. 26 illustrates a GRE header format that is used in some embodiments to store service data for ingress direction.

In some embodiments, the IP source/destination addresses, and GRE key can be inspected by the service node as required to perform the proper data message processing. FIGS. 25 and 26 illustrate how the service metadata is encoded in the GRE encapsulation headers in place of the source and destination IP addresses and GRE key fields. FIG. 25 illustrates the GRE header format that is used in some embodiments to store the service data for the egress direction (e.g., from GVM to switch), while FIG. 26 illustrates the GRE header format that is used in some embodiments to store the service data for the ingress direction (e.g., from the software switch to the source GVM).

In these figures, all fields are in network byte order. Path IDs are generated alongside service paths in some embodiments and have a global per-service value. As shown in FIGS. 25 and 26, the IP address fields are reversed for the egress and ingress side data messages in some embodiments. As with native mode, the service plane in GRE compatibility mode can modify or generate any traffic as long as it has a valid encapsulation when it reaches the service proxy. In some embodiments, this means re-using one of the IP and GRE stacks that the service node has received for a related flow.

In some embodiments, the flow tag information along a service chain is discarded when entering the first GRE compatibility mode service and is not restored downstream. This can prevent subsequent services from being able to declare flow actions. As such, flow programming is not provided to service nodes in GRE compatibility mode of some embodiments. Liveness detection, moreover, is supported in some embodiments by passing BFD (bidirectional forwarding detection) messages between the trusted and untrusted interfaces. In some embodiments, these data messages are injected from the trusted and untrusted sides by the service proxy. The service node can recognize this traffic because it is not encapsulated in GRE. In some embodiments, the service node is expected to forward this traffic (and indeed any non-GRE encapsulated traffic) unmodified by bridging it to the other side of the virtual wire. Also, in some embodiments, the data messages can be hard-coded if a real instance of BFD is not available.

Due to space constrains in some embodiments, certain header fields are encoded in a summarized version. In some embodiments, the service chain tag, SPI and SI are summarized in a single 4-bit field. Each compatibility mode service node can therefore be present on at most 16 service chain hops in some embodiments. Each time a service is present inside a service chain, this consumes one service path ID. If the service is present on multiple chains, multiple service path IDs are consumed. In addition, each time a service is present on two directions of a service chain, two service path IDs are consumed.

In some embodiments, locally-generated traffic is supported in compatibility mode as long as a related outer header stack (up to and including GRE) is used. In some embodiments, no modification to the outer header stack is allowed, except (1) optionally replacing the outer Ethernet destination address with broadcast, (2) updating the IP total size field and IP checksum, and (3) the GRE checksum is ignored but the GRE key must be present.

Figure 27:
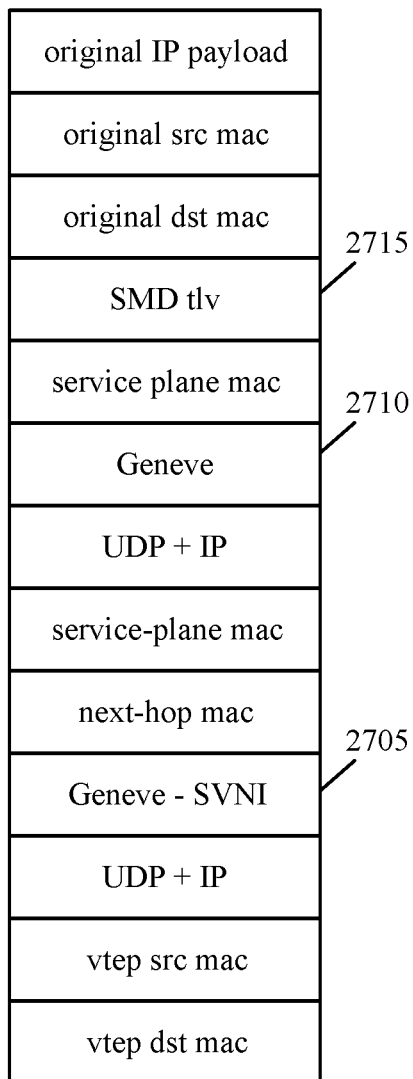
FIG. 27 illustrate the use of two Geneve encapsulation headers, an outer Geneve header for carrying service transport layer data and an inner Geneve header for carrying service insertion layer metadata.
Figure 28:
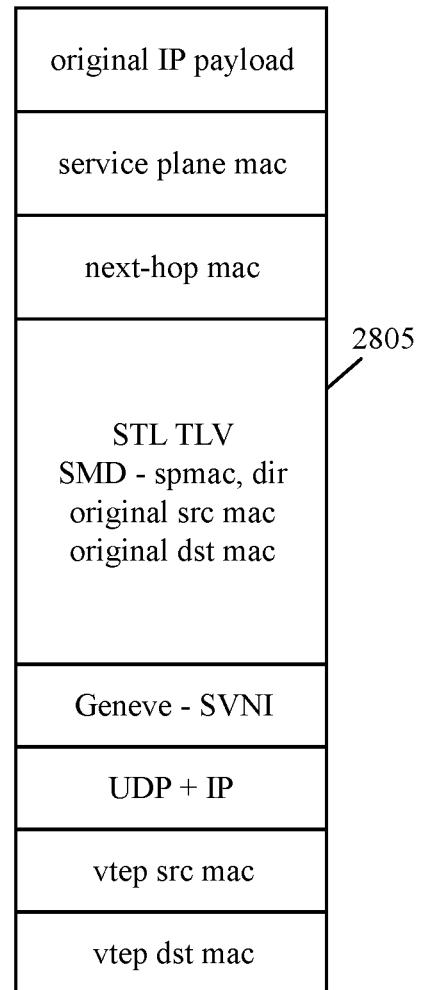
FIG. 28 illustrates the two Genece encapsulation headers of FIG. 27 combined into a single Geneve encapsulation header.

FIGS. 27 and 28 illustrate examples of the encapsulation headers that are used in some embodiments to send data messages from one VTEP associated with at least one service node (e.g., from one host computer) to another VTEP associated with another service node (e.g., to another host computer). Both of these examples are Geneve encapsulation headers, and carry the service metadata (e.g., the SMD metadata) in one or more Geneve TLVs. The Geneve header supports logical L2 overlay transport, and it has a variable TLV space for carrying service-metadata. Hence, different service insertion platforms can specify different amount of service metadata to be carried between successive hops.

FIG. 27 illustrate the use of two Geneve encap headers, an outer Geneve header 2705 for carrying service transport layer data and an inner Geneve header 2710 for carrying service insertion layer metadata. As shown, the service metadata is stored in an SMD TLV 2715. In some embodiments, this TLV 2715 has the NSH header format of FIG. 21. Hence, this TLV stores the service metadata in the fixed length header 2110 as described above, and stores the SPI and SI values in the SPI and SI fields 2122 and 2124 of the header 2100.

For sake of efficiency, some embodiments combine these two headers into a single Geneve header 2805 of FIG. 28. To do this, these embodiments replace the original source and destination MAC addresses of the data message with the service plane MACs of the current and next hops and store the original source and destination MACs in a new Geneve TLV, along with the service direction, service plane MAC of the source GVM, and other SMD metadata (such as service chain identifier, SPI value, SI value, flow programming values, tenant tag, flow tag, etc.). This new Geneve TLV in some embodiments has a 24-byte SMD metadata field, and 12-bytes to store STL data, such as the original source and destination MAC addresses. In some embodiments, the 12-bytes STL data precedes the 24-byte SMD metadata, which includes the metadata illustrated in FIGS. 21 and 22 in some embodiments.

As shown, in both implementations of FIGS. 27 and 28, the Geneve encapsulating headers store the SVNI of the service plane, which allows multiple service planes to be defined. For instance, as described above, some embodiments use the different SVNIs to define different service planes for different entities or tenants in a multi-entity or multi-tenant datacenter. The different service planes for the different entities or tenants can be associated with the same or different QoS and/or SLA guarantees for the data message types of the entities or tenants. Other embodiments use multiple SVNIs to different service planes for the same entity or tenant, e.g., different service planes associated with different QoS and/or SLA guarantees for different data message types for the same entity or tenant. Also, both headers store the MAC addresses of the source and destination VTEPs along with the UDP and IP source and destination addresses.

Figure 29:
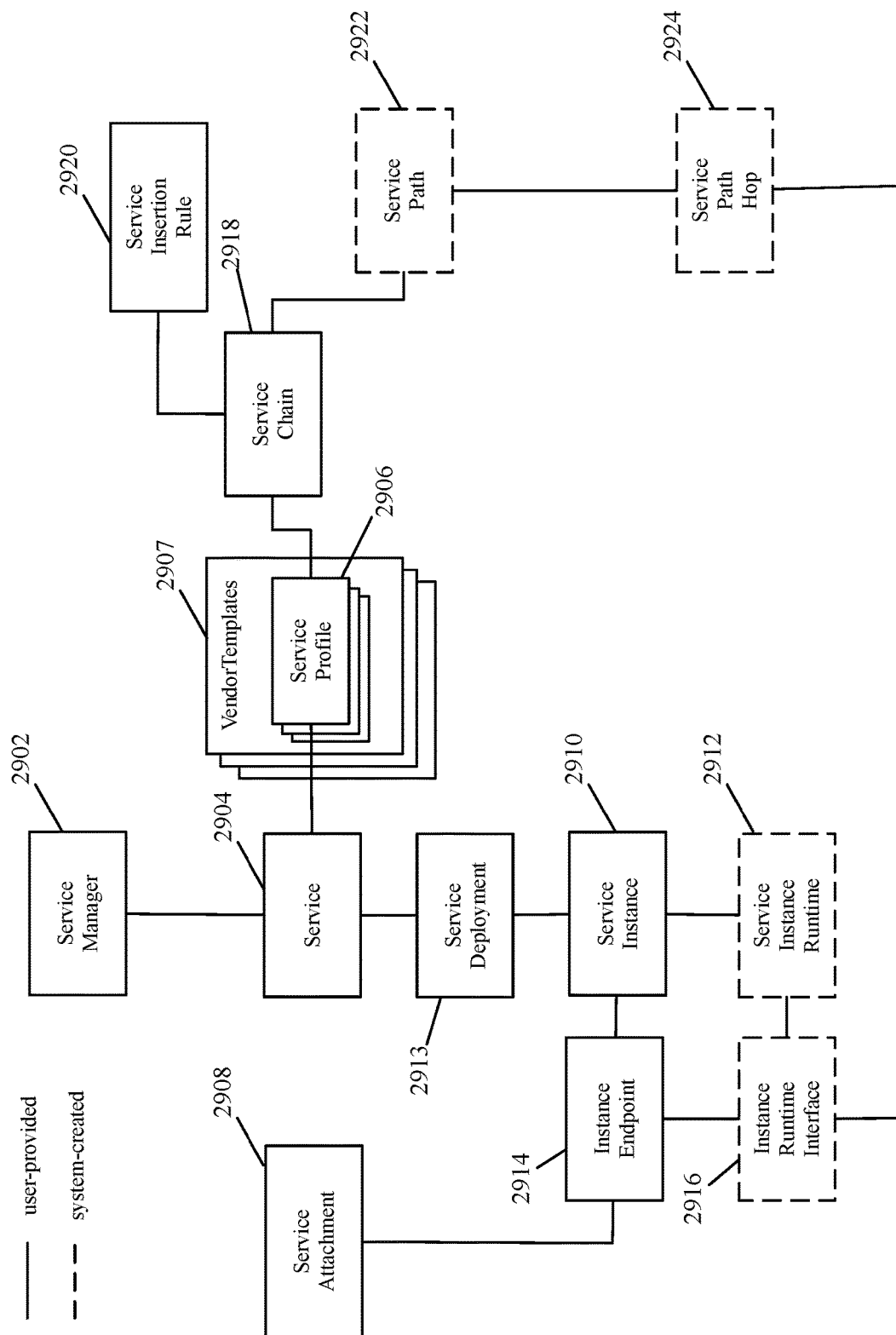
FIG. 29 illustrates an object data model of some embodiments.

FIG. 29 illustrates an object data model 2900 of some embodiments. In this model, objects shown in solid lines are provided by the user, while objects shown in dashed lines are generated by the service plane managers and controllers. As shown, these objects include service managers 2902, services 2904, service profiles 2906, vendor templates 2907, a service attachment 2908, service instances 2910, service deployment 2913, service instance runtime (SIR) 2912, instance endpoint 2914, instance runtime port 2916, service chains 2918, service insertion rules 2920, service paths 2922, and service path hops 2924.

In some embodiments, a service manager object 2902 can be created before or after the creation of a service object 2904. An administrator or a service management system can invoke service manager APIs to create a service manager. A service manager 2902 can be associated with a service at any point of time. In some embodiments, the service manager 2902 includes service manager information, such as the vendor name, vendor identifier, restUrl (for callbacks) and authentication/certificate information.

As mentioned above, the service plane does not require the presence or use of a service manager as service nodes can operate in zero-awareness mode (i.e., have zero awareness of the service plane). In some embodiments, zero-awareness mode only allows basic operations (e.g., redirecting traffic towards the service's SVMs). In some such embodiments, no integration is provided to distribute object information (such as service chain information, service profiles, etc.) to the service manager servers. Instead, these servers can poll the network manager for objects of interest.

A service object 2904 represents a type of service that is provided by a service node. The service object has a transport type attribute, which specifies its mechanism (e.g., NSH, GRE, QinQ, etc.) for receiving service metadata. Each service object also has a state attribute (which can be enabled or disabled) as returned by service manager, and a reference to a service manager that may be used for exposing REST API endpoints to communicate events and perform API calls. It also includes a reference to an OVA/OVF attribute used to deploy instances of the service.

Vendor template objects 2907 include one or more service profile objects 2906. In some embodiments, service managers can register vendor templates, and the service profiles can be defined on a per service basis and based on a vendor template with potentially specialized parameters. A service chain can be defined by reference to one or more service profiles. In some embodiments, service profiles are not assigned tags and are not identified explicitly on the wire. In order to determine which function to apply to traffic, service nodes perform a look up (e.g., based on service chain identifier, service index and the service direction, as mentioned above) in order to identify the applicable service profile. The mapping for this lookup is provided by the management plane to service managers whenever a service chain is created of modified.

A service profile object 2906 in some embodiments includes (1) a vendor template attribute to identify its associated vendor template, (2) one or more custom attributes when the template exposes configurable values through the service profile, and (3) an action attribute, such as a forward action, or a copy-and-redirect, which respectively direct the service proxies to either forward the received data messages to their service nodes, or to forward a copy of the received data messages to their service nodes while forwarding the received data message to the next service hop or back to the original source GVM when their service node is the last hop.

The service attachment object 2908 represents the service plane (i.e., is a representation of the service plane of a perspective of a user, such as tenant's network administrator in a multi-tenant datacenter, or the network administrator in a private datacenter). This service attachment object is an abstraction that support any number of different implementations of the service plane (e.g., logical L2 overlay, logical L3 overlay, logical network overlay etc.). In some embodiments, each endpoint (on an SIR or a GVM) that communicates over the service plane specifies a service attachment. The service attachment is a communication domain. As such, services or GVMs outside a service attachment may not be able to communicate with one another.

In some embodiments, service attachments can be used to create multiple service planes with hard isolation between them. A service attachment has the following attributes (1) logical identifier (e.g., SVNI for a logical switch) that identifies a logical network or logical forwarding element that carries traffic for the service attachment, (2) a type of service attachment (e.g., L2 attachment, L3 attachment, etc.), and (3) an applied_To identifier that specifies a scope of the service attachment (e.g., Transport node 0 and Transport node 1 for north-south operations and a cluster or set of hosts for East-West operations). In some embodiments, the control plane (e.g., a central control plane) converts the service attachment representation that it receives from the management plane to a particular LFE or logical network deployment based on parameters specified by a network administrator (e.g., a datacenter administrator of a private or public cloud, or network virtualization provider in a public cloud).

A service instance object 2910 represents an actual deployed instance for a service. Hence, each such object is associated with one service object 2904 through a service deployment object 2913 that specifies the relationship between the service object 2904 and the service instance object 2910. The deployed service instance can be a standalone service node (e.g., standalone SVM) or it can be a high availability (HA) service node cluster. In some embodiments, the service deployment object 2913 describes the service instance type, e.g., standalone or HA. As described below, the service deployment object's API can be used in some embodiments to deploy several service instances for a service.

The service instance runtime (SIR) object 2912 represents an actual runtime service node that operates in a standalone mode, or an actual runtime service node of an HA cluster. The service instance object in some embodiments includes the following attributes (1) a deployment mode attribute that specifies whether the service instance is operating in a standalone mode, an active/standby mode, or an active/active model, (2) a state attribute that specifies whether the instance is enabled or disabled, and (3) a deployed to attribute that in the case of north-south operations includes a reference to a service attachment identifier.

In some embodiments, SVMs provisioning is initiated manually. To this end, the management plane provides, in some embodiments, APIs for (1) creating a service instance of an existing service, (2) deleting a service instance, (3) growing a service instance that is already configured as a high availability cluster by adding additional SIRs, and (4) shrinking a service instance by removing one of its SIRs. When creating a service instance of an existing service, the service instance may be created in some embodiments on the basis of a template contained in the service. The caller can pick between a stand-alone instance or an HA cluster, in which case all the VMs in the HA cluster are provisioned. Again, in some embodiments, the API for the service instance deployment allows multiple service instances (e.g., for an HA cluster) to be deployed through just one API call.

In some embodiments, an API that creates one or more SVMs specifies one or more logical locations (e.g. clusters, host, resource pool) in which the SVMs should be placed. In some embodiments, the management plane tries to place SVMs belonging to the same service instance on different hosts whenever possible. Anti-affinity rules may also be configured as appropriate to maintain the distribution of SVMs across migration events (such as VMotion events supported by Dynamic Resource Scheduler of VMware, Inc.). Similarly, the management plane may configure affinity rules with specific hosts (or groups of hosts) when available or the user provisioning the service instance may explicitly pick a host or a cluster.

As mentioned above, a service instance runtime object 2912 represents an actual SVM running on a host to implement a service. An SIR is part of a service instance. Each SIR can have one or more traffic interfaces completely dedicated to service plane traffic. In some embodiments, at least one service proxy instance runs per SIR to handle data plane signaling and data message format conversion for the SIR as needed. When a service instance is deployed, the SIRs are created for every SVM associated with the service instance in some embodiments. The network manager also creates an instance endpoint for every service instance in an east-west service insertion. Each SIR object 2912 has the following attributes in some embodiments (1) a state attribute which is active for SVMs that can process traffic and inactive for all others, regardless of reason, and (2) a runtime state that specifies whether the data plane liveness detection detects that the SIR is up or down.

The instance runtime interface 2916 is the per-endpoint version of the service instance endpoint 2914. In some embodiments, the instance runtime interface 2916 is used to identify an interface for an SIR or GVM that can be the source or sink service plane traffic. In East-West service insertion, the lifecycle of an instance runtime interface in some embodiments is linked to the lifecycle of the service instance runtime. In some embodiments, no user action is required to configure an instance runtime interface.

In some embodiments, the instance runtime interface 2916 has the following attributes: an endpoint identifier, a type, a reference to a service attachment, and a location. The endpoint identifier is a data plane identifier for the SIR VNIC. The endpoint identifier is generated when the SIR or GVM is registered with the service transport layer, and may be a MAC address or part of a MAC address. The type attribute can be shared or dedicated. SIR VNICs are dedicated, meaning that only service plane traffic is able to reach them, while GVM VNICs are shared, meaning they will receive and transmit both service plane and regular traffic. The service-attachment reference is a reference to the service attachment that implements the service plane used to transmit and receive service plane traffic. This reference in some embodiments is to the SVNI of the service plane. The location attribute in some embodiments specifies the location of the instance runtime interface, which is the UUID of the host on which the instance runtime interface is currently located.

In some embodiments, a user defines a service chain object 2918 in terms of an ordered list of service profiles 2906. In some embodiments, each service chain conceptually provides separate paths for forward and reverse traffic directions, but if only one direction is provided at creation time, the other one is generated automatically by reversing service profile order. Either direction of the service chain (and even both directions) can be empty, meaning no services will process traffic in that direction. In some embodiments, the data plane will perform a lookup even for an empty service chain.

Service chains are abstract concepts. They do not point to a specific set of service nodes. Rather, the network controllers that are part of the service plane platform automatically generate service paths that point to sequences of service nodes for the service chain and direct messages/flows along the generated service paths. In some embodiments, a service chain is identified in the management plane or control plane by its UUID, a unique identifier of the service chain. Service nodes are provided with the meaning of service chain IDs through management plane APIs received through their service managers. One example of this was described above by reference to FIG. 14.

A service chain tag in some embodiments may be used to identify a service chain in the dataplane because UUIDs are too long to be carried in encapsulating headers. A service chain ID in some embodiments is an unsigned integer like rule ID. Each data message redirected to a service carries the service chain tag for the service chain it is traversing. The management plane advertises UUID to service chain tag mappings when a service chain is created or modified. Service chain tags have a 1 to 1 mapping with service chain UUIDs, whereas a single service chain can have 0 to many service path indexes.

In addition to a service chain ID, a service chain in some embodiments has the following attributes: (1) references to all computed service paths, (2) failure policies, and (3) references to service profiles. References to computed service paths were described above. The failure policy is applied when a service path selected for a service chain cannot be traversed. In some embodiments, the failure policies may be PASS (forward traffic) and FAIL (drop traffic). The references to service profiles of the service chain may include an egress list of service profiles that egress traffic (e.g., data messages traveling from a GVM to a switch) must traverse, and an ingress list of service profiles that ingress traffic (e.g., data messages traveling from the switch to a GVM) must traverse. In some embodiments, the ingress list is initialized by default as the reverse of the egress list.

Different techniques can be used in some embodiments to define the service paths for the service chain. For instance, in some embodiments, a service chain can have an associated load balancing strategy, which can be one of the following strategies. The load balancing strategy is responsible for load balancing traffic across different service paths of a service chain. According to an ANY strategy, the service framework is free to redirect the traffic to any service path regardless of any load balancing consideration or flow pinning. Another strategy is a LOCAL strategy, which specifies that local service instances (e.g., SVMs executing on the same host computer as the source GVM) are to be preferred over remote service instances (e.g., SVMs executing on other host computers or external service appliances).

Some embodiments generate scores for service paths based on how many SIRs are local and the highest score is selected regardless of load. Another strategy is the cluster strategy, which specifies that service instances implemented by VMs that are co-located on the same host are preferred, whether that host is the local one or a different one. A ROUND ROBIN strategy directs that all active service paths are hit with equal probability or based on probabilities that are specified by a set of weight values.

An SI rule object 2920 associates a set of data message attributes with a service chain represented by the service chain object 2918. The service chain is implemented by one or more service paths, each of which is defined by a service path object 2922. Each service path has one or more service hops, which are represented by one or more service path hop objects 2924 with each hop being associated with one instance runtime interface 2916. Each service hop also refers to an associated service profile, an associated service path, and a next hop SIR endpoint identifier in some embodiments.

In some embodiments, a service path object has several attributes, some of which may be updated by the management or control plane when underlying conditions change. These properties include a service path index, a state (e.g., enabled or disabled), an administrative mode (e.g., enabled or disabled) used when a service path must be manually disabled (e.g., for debugging reasons), a host crossing count (indicating how many times a data message traversing the service path crosses hosts), a locality count (indicating how many of the SIRs along this path are located on the local host), a list of backup service paths, a length of the service path, a reverse path (listing the same set of SIRs in the reverse order), and a maintenance mode indicator (in some embodiments a bit indicating true if any hop in the service path is in maintenance mode).

The host crossing count is an integer and indicates how many times a data message going through the service path must be sent out of a PNIC. In some embodiments, a local or central control plane uses this metric to determine preferred paths when multiple available alternatives exist. This value is populated by the management plane or control plane and is the same for each host using the service path. The locality count in some embodiments is not initialized by the management plane or the control plane but rather computed by the local control plane when a service path is created or updated. Each LCP may potentially compute a different number. This value is used by the local control plane to identify preferred paths when multiple available alternatives exist. The service path length is one parameter that is used by the service plane to set the initial service index.

In some embodiments, the list of backup service paths is a pointer to a sorted list of all service paths for the same service chain. It lists all possible alternatives to be tried when a specific SIR along the path is down. This list may contain a service path for all possible permutations of SVMs in each HA cluster traversed by the service path. In some embodiments, the list will not contain SIRs belonging to different HA clusters.

In some embodiments a service path is disabled when at least one service hop is inactive. Such a condition is temporary and is triggered by service liveness detection failures. A service path can be disabled in this manner at any time. In some embodiments, a service path is also disabled when at least one service hop has no matching SIR. The service hop enters this condition when an SIR it is referring to disappears, but the service path still exists in the object model.

The service plane must be able to uniquely identify each SPI. In some embodiments, the control plane generated UUIDs are sent for each service path. Due to data message header limitations in the service plane, a large ID is not sent with each data message in some embodiments. In some embodiments, when the control plane generates a UUID for each service path, it also generates a small unique ID for it and this ID is sent with each data message in these embodiments.

Figure 30:
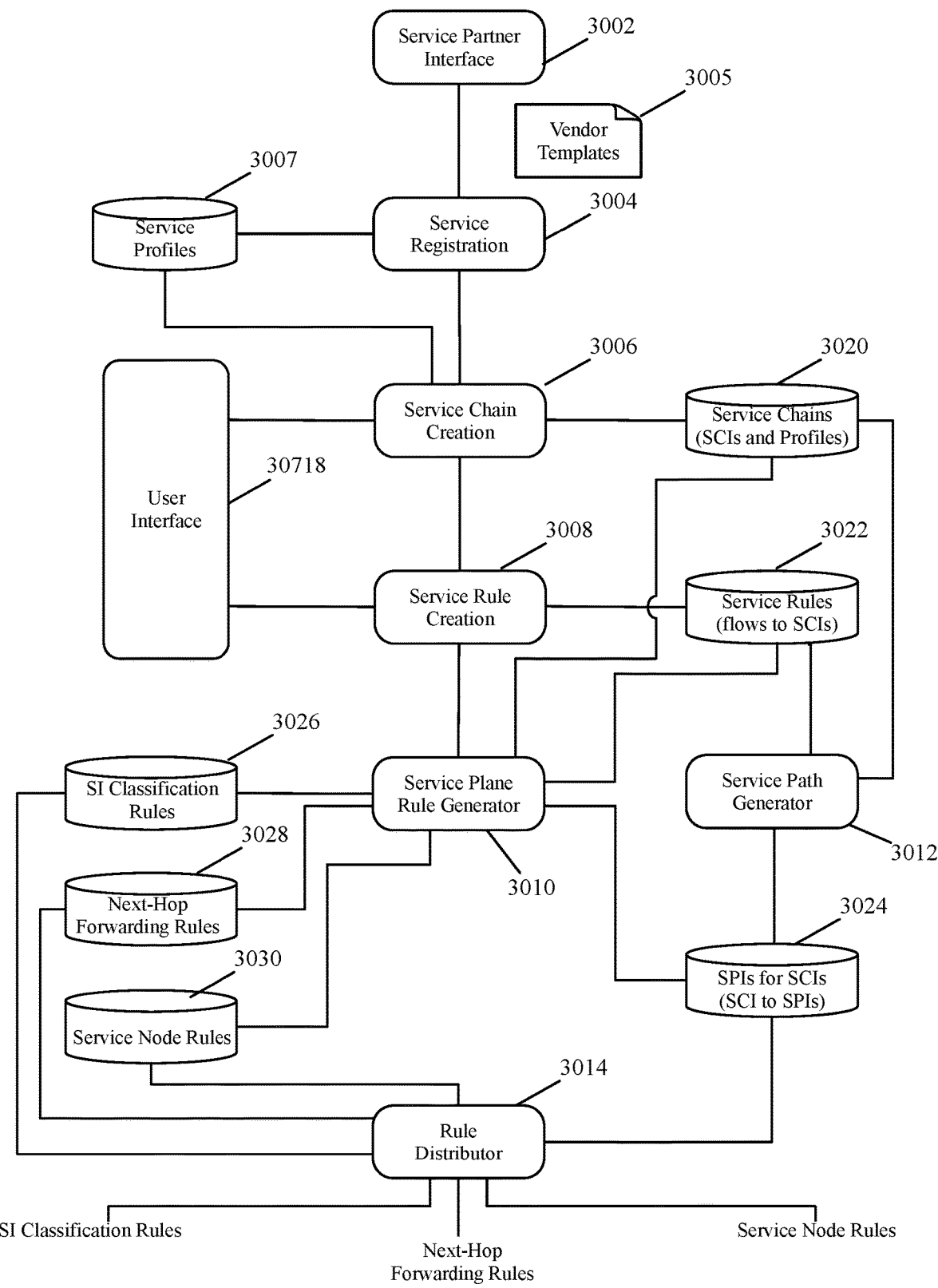
FIG. 30 conceptually illustrates several operations that network managers and controllers perform in some embodiments to define rules for service insertion, next service hop forwarding, and service processing.

FIG. 30 conceptually illustrates several operations that the network managers and controllers perform in some embodiments to define rules for service insertion, next service hop forwarding, and service processing. As shown, these operations are performed by a service registrator 3004, a service chain creator 3006, a service rule creator 3008, a service path generator 3010, a service plane rule generator 3012, and a rule distributor 3014. In some embodiments, each of these operators can be implemented by one or more modules of a network manager or controller and/or can be implemented by one or more standalone servers.

Through a service partner interface 3002 (e.g., a set of APIs or a partner user interface (UI) portal), the service registrator 3004 receives vendor templates 3005 that specify services that different service partners perform. These templates define the partner services in terms of one or more service descriptors, including service profiles. The registrator 3004 stores the service profiles in a profile storage 3007 for the service chain creator 3006 to use to define service chains.

Specifically, through a user interface 3018 (e.g., a set of APIs or a UI portal), the service chain creator 3006 receives from a network administrator (e.g., a datacenter administrator, a tenant administrator, etc.) one or more service chain definitions. In some embodiments, each service chain definition associates a service chain identifier, which identified the service chain, with an ordered sequence of one or more service profiles. Each service profile in a defined service chain is associated with a service operation that needs to be performed by a service node. The service chain creator 3006 stores the definition of each service chain in the service chain storage 3020.

Through the user interface 3018 (e.g., a set of APIs or a UI portal), the service rule creator 3008 receives from a network administrator (e.g., a datacenter administrator, a tenant administrator, etc.) one or more service insertion rules. In some embodiments, each service insertion rule associates a set of data message flow attributes with a service chain identifier. The flow attributes in some embodiments are flow header attributes, like L2 attributes or L3/L4 attributes (e.g., five tuple attributes). In these or other embodiments, the flow attributes are contextual attributes (e.g., AppID, process ID, active directory ID, etc.). Numerous techniques for capturing and using contextual attributes for performing forwarding and service operations are described in U.S. patent application Ser. No. 15/650,251, filed Jul. 14, 2017, now issued as U.S. Pat. No. 10,802,857, which is incorporated herein. Any of these techniques can be used in conjunction with the embodiments described herein.

The service rule creator 3008 generates one or more service insertion rules and stores these rules in the SI rule storage 3022. In some embodiments, each service insertion rule has a rule identifier and a service chain identifier. The rule identifier in some embodiments can be defined in terms of flow identifiers (e.g., header attributes, contextual attributes, etc.) that identify data message flow(s) to which the SI rule is applicable. The service chain identifier of each SI rule, on the other hand, identifies the service chain that has to be performed by the service plane for any data message flow that matches the rule identifier of the SI rule.

For each service chain that is part of a service rule, the service path generator 3012 generates one or more service paths, with each path identifying one or more service instance endpoints for one or more service nodes to perform the service operations specified by the chain's sequence of service profiles. In some embodiments, the process that generates the service paths for a service chain accounts for one or more criteria, such as (1) the data message processing load on the service nodes (e.g., SVMs) that are candidate service nodes for the service paths, (2) the number of host computers crossed by the data messages of a flow as they traverse each candidate service path, etc.

The generation of these service paths is further described in U.S. patent application Ser. No. 16/282,802, filed Feb. 22, 2019, now published as U.S. Patent Publication 2020/0274801, which is incorporated herein by reference. As described in this patent application, some embodiments identify the service paths to use for a particular GVM on a particular host based on one or more metrics, such as host crossing count (indicating how many times a data message traversing the service path crosses hosts), a locality count (indicating how many of the SIRs along this path are located on the local host), etc. Other embodiments identify service paths (i.e., select service nodes for service paths) based on other metrics, such as financial and licensing metrics.

The service path generator 3012 stores the identity of the generated service paths in the service path storage 3024. This storage in some embodiments associates each service chain identifier to one or more service path identifiers, and for each service path (i.e., each SPI) it provides a list of service instance endpoints that define the service path. Some embodiments store the service path definitions in one data storage, while storing the association between the service chain and its service paths in another data storage.

The service rule generator 3010 then generates rules for service insertion, next service hop forwarding, and service processing from the rules stored in storages 3020, 3022 and 3024, and stores these rules in rule storages 3026, 3028 and 3030, from where the rule distributor 3014 can retrieve these rules and distribute them to the SI pre-processors, service proxies and service nodes. The distributor 3014 also distributes in some embodiments the path definitions from the service path storage 3024. The path definitions in some embodiments includes the first hop network address (e.g., MAC address) of the first hop along each path. In some embodiments, the service rule generator 3010 and/or the rule distributor 3014 specify and distribute different sets of service paths for the same service chain to different host computers, as different sets of service paths are optimal or preferred for different host computers.

In some embodiments, the SI classification rules that are stored in the rule storage 3026 associate flow identifiers with service chain identifiers. Hence, in some embodiments, the rule generator 3010 retrieves these rules form the storage 3022 and stores them in the classification rule storage 3026. In some embodiments, the rule distributor 3014 directly retrieves the classification rules from the SI rule storage 3022. For these embodiments, the depiction of the SI classification rule storage 3026 is more of a conceptual illustration to highlight the three type of the distributed rules, along with the next-hop forwarding rules and the service node rules.

In some embodiments, the service rule generator 3010 generates the next hop forwarding rules for each hop service proxy of each service path for each service chain. As mentioned above, each service proxy's forwarding table in some embodiments has a forwarding rule that identifies the next hop network address for each service path on which the proxy's associated service node resides. Each such forwarding rule maps the current SPI/SI values to the next hop network address. The service rule generator 3010 generates these rules. For the embodiments in which the SI pre-processor has to look-up the first hop network address, the service rule generator also generates the first hop look-up rule for the SI pre-processor.

Also, in some embodiments, the service rule generator 3010 generates for the service nodes service rules that map service chain identifier, service index values and service directions to service profiles of the service nodes. To do this, the service rule generator uses the service chain and service path definitions from the storages 3020 and 3024, as well as the service profile definitions from the service profile storage 3007. In some embodiments, the rule distributor forwards the service node rules to a service node through a service manager of the service node when such a service manager exists. The service profile definitions are also distributed by the distributor 3014 to the host computers (e.g., to their LCPs) in some embodiments, so that these host computers (e.g., the LCPs) can use these service profiles to configure their service proxies, e.g., to configure the service proxies to forward received data messages to their service nodes, or to copy the received data messages and forward the copies to their service nodes, while forwarding the original received data messages to their next service node hops or back to their source GVMs when they are the last hops.

Figure 31:
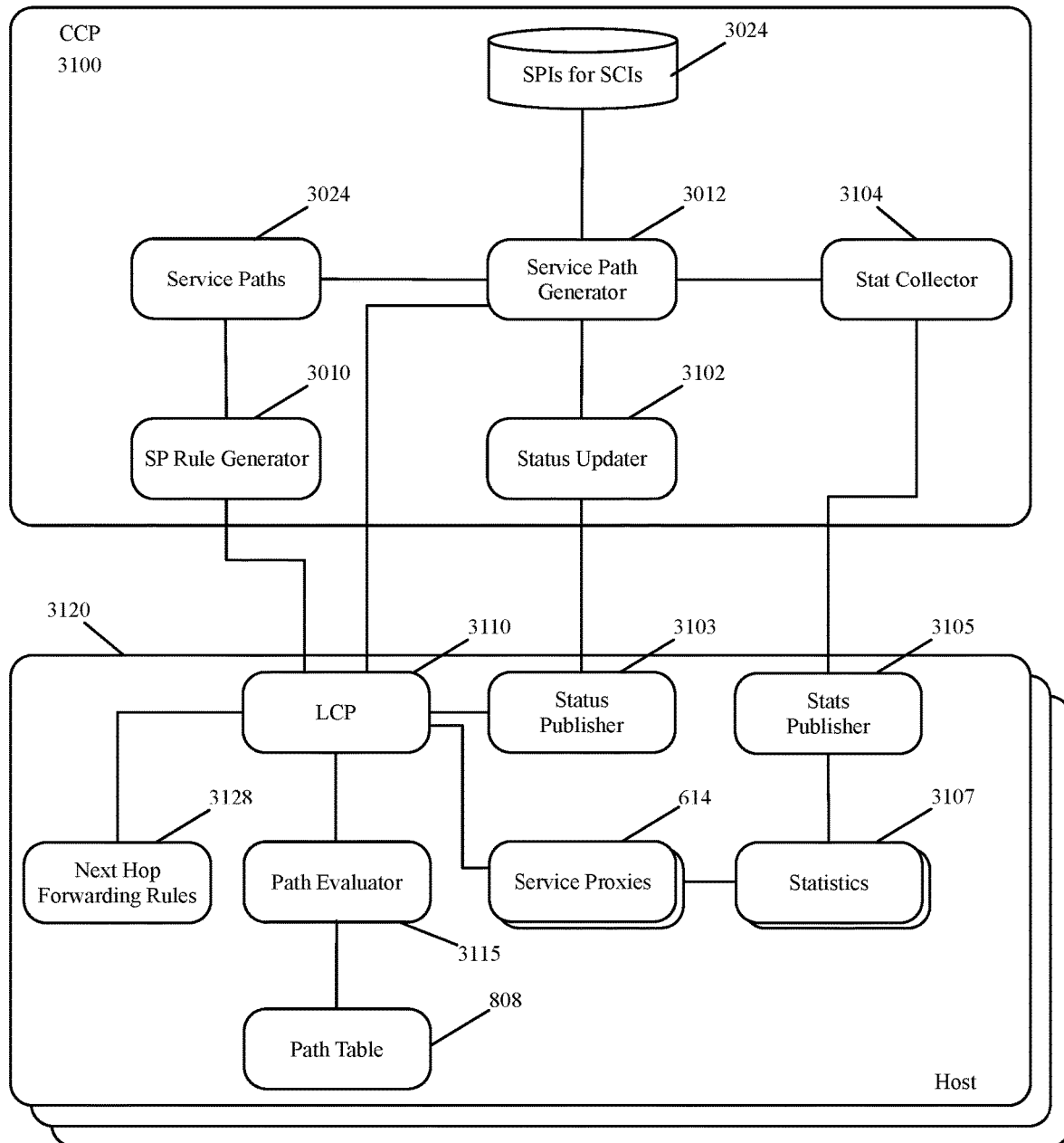
FIG. 31 illustrates how service paths are dynamically modified in some embodiments.

In some embodiments, the management and control plane dynamically modify the service paths for a service chain, based on the status of the service nodes of the service paths and the data message processing loads on these service nodes. FIG. 31 illustrates how service paths are dynamically modified in some embodiments. In these embodiments, a central control plane 3100 works with a local control plane 3110 on the host computers 3120 to define service paths for a service chain, and to modify these service paths. The CCP 3100 in some embodiments is a cluster of servers (e.g., three servers) that provide control plane operations for defining configurations based on service rules specified by network administrators through a cluster of management servers that provide management operations.

As shown, the CCP has a status updater 3102 that receives service node status data from status publishers 3103 on the host computers 3120. As mentioned above, each time that a service proxy determines that its associated service node has failed (e.g., each time a service node fails to respond to the service proxy's liveness signal twice in a row), the service proxy notifies the LCP 3110 of its host. The LCP then has its status publisher 3103 notify the CCP's status updater 3102 of the service node's failure.

The status updater 3102 relays any service node failures to the service path generator 3012, which in some embodiments is part of the CCP along with the SP rule generator 3010 and a statistic collector 3104. Each time a service node fails, the service path generator removes from the service path storage 3024 its previously defined service paths that use this service node. For each removed service path, the service path generator 3012 deletes or deactivates the removed path's SPI value for the service chain identifier of the corresponding service chain.

In some embodiments, each removed service path is removed (e.g., deleted or deactivated) from the records of all hosts that previously received forwarding rules or path definitions that were for this service path. In some embodiments, the CCP (e.g., the service path generator 3010 or the rule distributor 3014) directs these hosts to remove the service path from the forwarding and path definition rules of their forwarding rule storages 3128 and path definition storage 808. The LCP of the failed service node in some embodiments removes the service path from its forwarding and path definition rules, while in other embodiments even this LCP waits for instructions to do so from the CCP.

Each host 3120 also has a statistics publisher 3105 that publishes data message load statistics that the service proxies generate for their service nodes in some embodiments. Each time a service proxy receives a data message that has been processed by its service node, the service proxy in some embodiments increments statistics (e.g., data message count, byte count, etc.) that it maintains in a statistic storage 3107 for its service node. In some embodiments, the statistics publisher 3105 periodically or on-demand retrieves the collected statistics from the storage 3107 and forwards these statistics to a statistic collector 3104 of the CCP. In some embodiments, the statistics collector 3104 receives (through the management plane) statistics that the service managers of the service nodes receive from the service nodes.

The statistics collector 3104 relays the collected statistics to the service path generator 3012. As mentioned above, the service path generator in some embodiments defines the service paths through the service nodes based in part on the data message load on the service nodes. For instance, when the data message load on a service node exceeds a threshold value, the service path generator performs one or more actions in some embodiments to reduce the load on this service node. For instance, in some embodiments, it stops adding the service node to any new service paths that it might define. In these or other embodiments, it also directs the distributor 3014 to remove the service paths that use this service node from some or all of the hosts.

Conjunctively or alternatively, the service path generator directs a CCP module (e.g., the distributor 3014) to direct the LCPs of one or more host computers to adjust the selection criteria 820 used for selecting service paths that the LCPs generate in order to control how the SI pre-processor performs its path selections. In other embodiments, the service path generator or another CCP module aggregates the load statistics for each service node and distributes the aggregated load to host LCPs along with their associated SPI values so that the LCPs can analyze these statistics and adjust the path selection criteria that they generate. In some embodiments, each LCP uses or has a path evaluator 3115 to generate the path selection criteria to evaluate and select paths based on service node statistics, and/or based on other criteria, such as number of hosts traversed by each service path.

In some embodiments, the servers that implement the management plane, the control plane, the service managers are in the same datacenter as the host computers on which the guest and service machines and modules (e.g., GVMs, SVMs, service proxies, port proxies, STL modules, SFEs, etc.) execute. In these embodiments, the management plane servers, the control plane servers, the service managers and the host computer modules (e.g., the LCPs, SVMs, GVMs, hypervisor modules, etc.) communicate with each other through the shared network infrastructure (e.g., the switches, routers, wired and wireless links, etc.) of the datacenter.

In other embodiments, the management plane servers, the control plane servers, the service managers and/or the host computers operate in different datacenters (e.g., enterprise private datacenters and public cloud datacenters). In some such embodiments, management plane servers, the control plane servers, the service managers and/or the host computer modules (e.g., the LCPs, SVMs, GVMs, hypervisor modules, etc.) communicate with each other through network infrastructures outside of their respective datacenters. Also, some such embodiments implement the service transport layer as a distributed logical L3 routers and/or network that spans multiple datacenters (e.g., multiple private datacenters, multiple public datacenters, multiple private/public datacenters).

Figure 32:
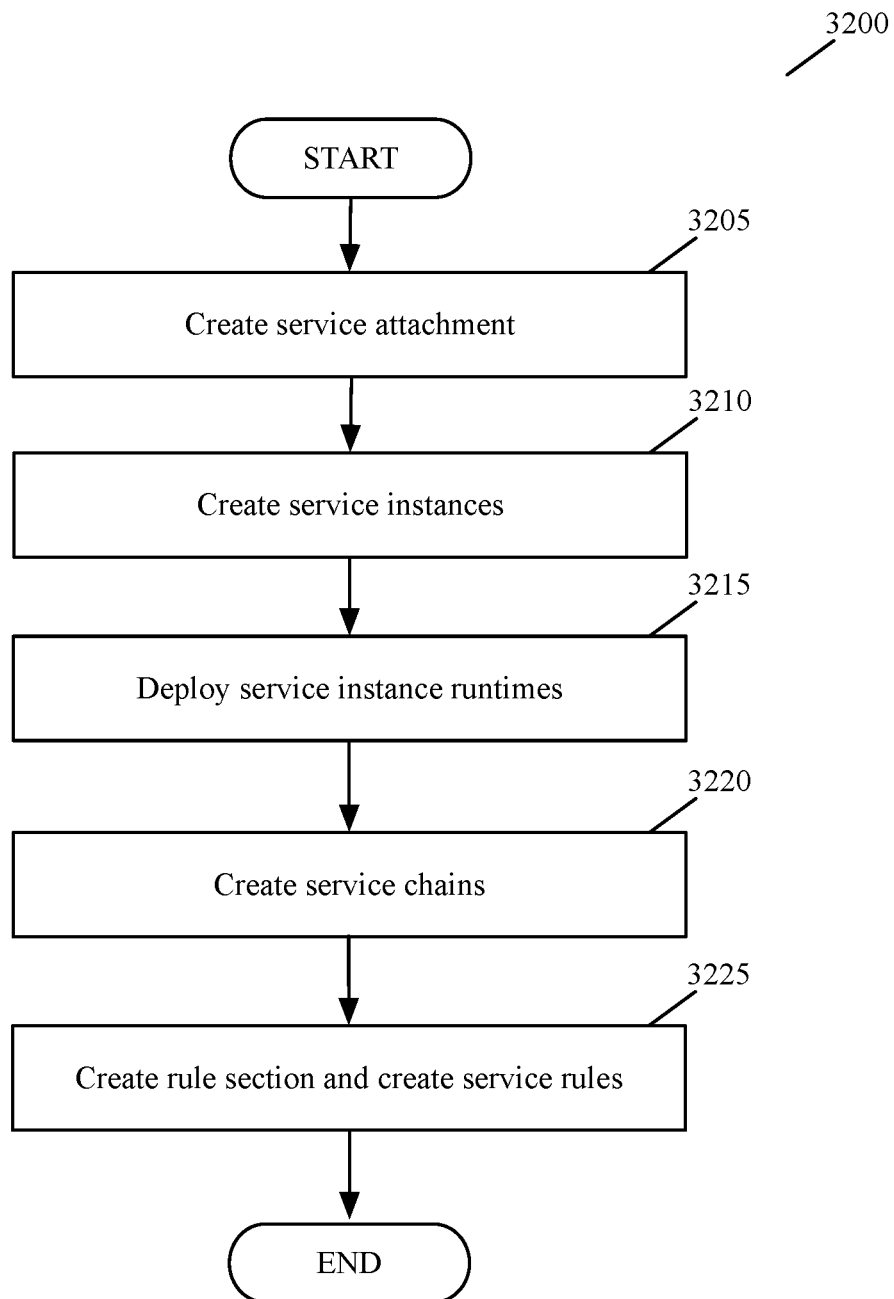
FIG. 32 illustrates a process that some embodiments perform to define a service plane and its associated service nodes for a tenant in a multi-tenant datacenter.

FIG. 32 illustrates a process 3200 that some embodiments perform to define a service plane and its associated service nodes for a tenant in a multi-tenant datacenter. This process presents just one exemplary sequence of operations and is not meant to convey any required ordering of operations. As shown, the process initially specifies (at 3205) a service attachment for establishing the service plane. The service attachment construct is agnostic to the implementation of the service plane. In some embodiments, the service attachment is implemented as a logical switch but, as mentioned above, the service attachment is implemented differently (e.g., logical router, logical network, etc.) in other embodiments.

Service planes are used in some embodiments to segregate the service processing for the data traffic of one tenant from the service processing for the data traffic of other tenants. In these or other embodiments, different service planes are used to provide different QoS or SLA guarantees for different types of traffic. For example, some embodiments use different service planes to provide different QoS or SLA guarantees for traffic between different data compute endpoints of different tenants, or different QoS or SLA guarantees for different type of content carried by different data message flows of the same tenant or different tenants.

After creating the service attachment, the process creates (at 3210) service instances for the services that are to be provided by the service plane. For each deployed service instance, the process specifies whether the service instance should be provided by a high availability cluster or by a standalone service node. It also provides a service attachment identifier that identifies the service attachment associated with the service instance. It also provides the deployment specification and the instance deployment configuration.

Next, at 3215, the process deploys each service instance runtime for each service instance created at 3210. For each service instance runtime, an instance endpoint has to be created on the service attachment. When the service attachment is a logical switch, the created instance endpoint is a logical port of the logical switch. In some embodiments, the logical switch port is auto created when an SVM (that serves as the service instance runtime) gets attached to the logical switch. In some embodiments, the service instance endpoints are created by the management plane each time a service instance is deployed. Also, in some embodiments, the service instances and service instance runtimes for a service can be deployed by invoking one service deployment object API. As mentioned above, the use of this single API greatly alleviates the need to repeatedly invoke one API multiple times to deploy multiple service instances and service instance runtimes.

At 3220, the process creates one or more service chains. Each service chain is created as an ordered list of service profiles. Each service chain has a forward processing direction and a reverse processing direction. For each service chain, a failure policy is defined as described above. Also, as described above, the load balancing criteria in some embodiments is defined for each service chain as one of the following types: any, local, service cluster or round robin. Finally, at 3225, a section of service rules is defined for the tenant, and one or more service rules are defined in these sections. Each service rule correlates a set of data message flow attributes with a service chain identifier, in order to specify the service chain that has to be executed for data messages that match the specified flow attribute set.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 33:
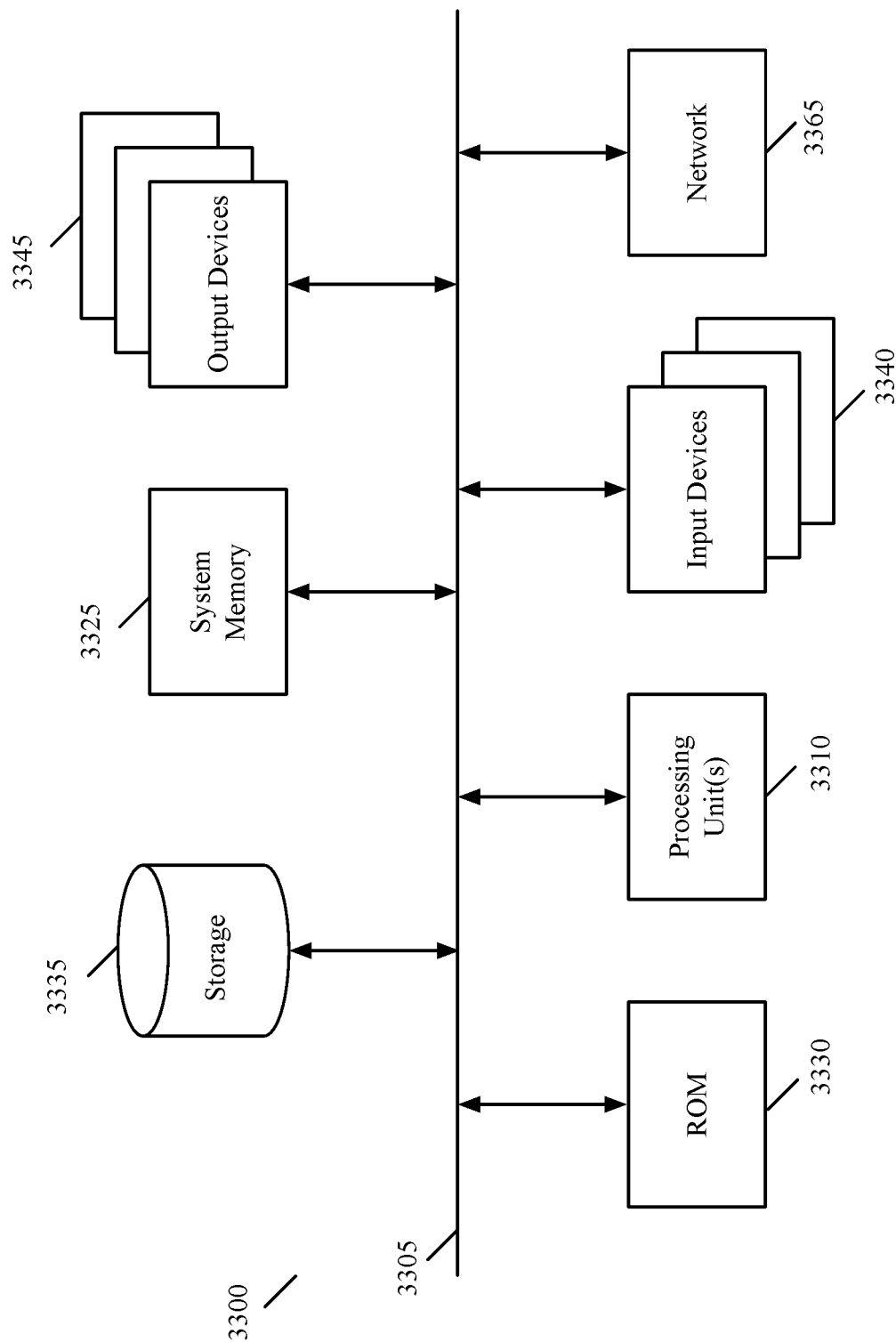
FIG. 33 conceptually illustrates an electronic system with which some embodiments of the invention are implemented.

FIG. 33 conceptually illustrates a computer system 3300 with which some embodiments of the invention are implemented. The computer system 3300 can be used to implement any of the above-described hosts, controllers, and managers. As such, it can be used to execute any of the above described processes. This computer system includes various types of non-transitory machine readable media and interfaces for various other types of machine readable media. Computer system 3300 includes a bus 3305, processing unit(s) 3310, a system memory 3325, a read-only memory 3330, a permanent storage device 3335, input devices 3340, and output devices 3345.

The bus 3305 collectively represents all system, peripheral, and chipset buses that communicatively connect the numerous internal devices of the computer system 3300. For instance, the bus 3305 communicatively connects the processing unit(s) 3310 with the read-only memory 3330, the system memory 3325, and the permanent storage device 3335.

From these various memory units, the processing unit(s) 3310 retrieve instructions to execute and data to process in order to execute the processes of the invention. The processing unit(s) may be a single processor or a multi-core processor in different embodiments. The read-only-memory (ROM) 3330 stores static data and instructions that are needed by the processing unit(s) 3310 and other modules of the computer system. The permanent storage device 3335, on the other hand, is a read-and-write memory device. This device is a non-volatile memory unit that stores instructions and data even when the computer system 3300 is off. Some embodiments of the invention use a mass-storage device (such as a magnetic or optical disk and its corresponding disk drive) as the permanent storage device 3335.

Other embodiments use a removable storage device (such as a flash drive, etc.) as the permanent storage device. Like the permanent storage device 3335, the system memory 3325 is a read-and-write memory device. However, unlike storage device 3335, the system memory is a volatile read-and-write memory, such a random access memory. The system memory stores some of the instructions and data that the processor needs at runtime. In some embodiments, the invention's processes are stored in the system memory 3325, the permanent storage device 3335, and/or the read-only memory 3330. From these various memory units, the processing unit(s) 3310 retrieve instructions to execute and data to process in order to execute the processes of some embodiments.

The bus 3305 also connects to the input and output devices 3340 and 3345. The input devices enable the user to communicate information and select commands to the computer system. The input devices 3340 include alphanumeric keyboards and pointing devices (also called "cursor control devices"). The output devices 3345 display images generated by the computer system. The output devices include printers and display devices, such as cathode ray tubes (CRT) or liquid crystal displays (LCD). Some embodiments include devices such as a touchscreen that function as both input and output devices.

Finally, as shown in FIG. 33, bus 3305 also couples computer system 3300 to a network 3365 through a network adapter (not shown). In this manner, the computer can be a part of a network of computers (such as a local area network ("LAN"), a wide area network ("WAN"), or an Intranet, or a network of networks, such as the Internet. Any or all components of computer system 3300 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, and any other optical or magnetic media. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral or transitory signals.

While the invention has been described with reference to numerous specific details, one of ordinary skill in the art will recognize that the invention can be embodied in other specific forms without departing from the spirit of the invention. For instance, several figures conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process.

Even though the service insertion rules in several of the above-described examples provide service chain identifiers, some of the inventions described herein can be implemented by having a service insertion rule provide the service identifiers (e.g., SPIs) of the different services specified by the service insertion rule. Similarly, several of the above-described embodiments perform distributed service routing that relies at each service hop identifying a next service hop by performing an exact match based on the SPI/SI values. However, some of the inventions described herein can be implemented by having the service insertion pre-processor embed all the service hop identifiers (e.g., service hop MAC addresses) as the data message's service attribute set and/or in the data message's encapsulating service header.

In addition, some embodiments decrement the SI value differently (e.g., at different times) than the approaches described above. Also, instead of performing the next hop lookup just based on the SPI and SI values, some embodiments perform this lookup based on the SPI, SI and service direction values as these embodiments use a common SPI value for both the forward and reverse directions of data messages flowing between two machines.

The above-described methodology is used in some embodiments to express path information in single tenant environments. Thus, one of ordinary skill will realize that some embodiments of the invention are equally applicable to single tenant datacenters. Conversely, in some embodiments, the above-described methodology is used to carry path information across different datacenters of different datacenter providers when one entity (e.g., one corporation) is a tenant in multiple different datacenters of different providers. In these embodiments, the tenant identifiers that are embedded in the tunnel headers have to be unique across the datacenters, or have to be translated when they traverse from one datacenter to the next. Thus, one of ordinary skill in the art would understand that the invention is not to be limited by the foregoing illustrative details, but rather is to be defined by the appended claims.

The invention claimed is:

1. A method of defining a plurality of services to perform on a data message flow, the method comprising:
through a user interface of a service deployment system:
receiving a request to create a service attachment to represent a service forwarding plane to forward data messages to a set of service nodes to perform the plurality of services on the data message flow, wherein the service attachment request is a request for the service forwarding plane without specifying any particular implementation for the service forwarding plane, said implementation of the service forwarding plane selected by the service deployment system;
receiving a definition of a service chain that includes the plurality of services associated with the service attachment;
receiving, for the service attachment, a definition of a service rule for the service forwarding plane that includes (i) a rule identifier defined by reference to a set of attributes of the data message flow and (ii) a service chain identifier that identifies the defined service chain;
deploying an implementation of the service forwarding plane comprising at least one logical forwarding element that spans a first device on which at least one machine operates and at least a second device that implements at least one service node;
deploying the service rule in a data path of the at least one machine, and a set of forwarding rules for forwarding data message flows along the service forwarding plane based on the service rule, to a plurality of service nodes to perform the plurality of services.

2. The method of claim 1, wherein the user interface includes at least one of an application programming interface or a graphical user interface.

3. The method of claim 1, wherein the user interface includes a plurality of user interfaces and different interfaces are used to receive the request and the definitions.

4. The method of claim 1, wherein the logical forwarding element is a logical switch.

5. The method of claim 1, wherein the logical forwarding element is a logical router.

6. The method of claim 1, wherein the plurality of services comprises a set of middlebox service operations.

7. The method of claim 6, wherein each middlebox service operation is performed by one service node in a set of one or more service nodes that perform the middlebox service operation.

8. The method of claim 7 further comprising selecting a service path from a plurality of candidate service paths to implement the service chain, each candidate service path comprising a group of service nodes with one service node from each set of service nodes that implements one of the middlebox service operations.

9. A non-transitory machine readable medium storing a service deployment program for execution by at least one processing unit and for defining a plurality of services to perform on a data message flow, the program comprising sets of instructions for:
receiving a request to create a service attachment to represent a service forwarding plane to forward data messages to a set of service nodes to perform the plurality of services on the data message flow, wherein the service attachment request is a request for the service forwarding plane without specifying any particular implementation for the service forwarding plane, said implementation of the service forwarding plane selected by the service deployment system;

receiving a definition of a service chain that includes the plurality of services associated with the service attachment;

receiving, for the service attachment, a definition of a service rule for the service forwarding plane that includes (i) a rule identifier defined by reference to a set of attributes of the data message flow and (ii) a service chain identifier that identifies the defined service chain;

deploying the service rule in a data path of at least one machine, and a set of forwarding rules for forwarding data message flows along the service forwarding plane based on the service rule, to a plurality of service nodes to perform the plurality of services;

wherein the implementation of the service forwarding plane comprises at least one logical forwarding element that spans a first device on which the machine operates and at least a second device that implements at least one service node.

10. The non-transitory machine readable medium of claim 9, wherein the set of instructions for receiving the definitions and service rule comprises a set of instructions for providing a user interface to receive the definitions and service rule.

11. The non-transitory machine readable medium of claim 10, wherein the user interface includes at least one of an application programming interface or a graphical user interface.

12. The non-transitory machine readable medium of claim 9, wherein the logical forwarding element is a logical switch.

13. The non-transitory machine readable medium of claim 9, wherein the logical forwarding element is a logical router.

14. The non-transitory machine readable medium of claim 9, wherein the plurality of services comprises a set of middlebox service operations.

15. The non-transitory machine readable medium of claim 14, wherein each middlebox service operation is performed by one service node in a set of one or more service nodes that perform the middlebox service operation.

16. The non-transitory machine readable medium of claim 15, wherein the program further comprises a set of instructions for selecting a service path from a plurality of candidate service paths to implement the service chain, each candidate service path comprising a group of service nodes with one service node from each set of service nodes that implements one of the middlebox service operations.

* * * * *